United States Patent [19]

Takashima et al.

[11] Patent Number: 5,189,528
[45] Date of Patent: Feb. 23, 1993

[54] IMAGE READING APPARATUS

[75] Inventors: Izumi Takashima; Yoshiya Imoto; Shinichiro Taga; Mitsuo Shimizu, all of Kanagawa, Japan

[73] Assignee: Fuji Xerox Co., Ltd., Tokyo, Japan

[21] Appl. No.: 408,390

[22] Filed: Sep. 18, 1989

[30] Foreign Application Priority Data

Sep. 21, 1988 [JP] Japan .................................. 63-238167

[51] Int. Cl.$^5$ .............................................. H04N 1/40
[52] U.S. Cl. ..................................... 358/448; 358/464; 358/461
[58] Field of Search ............... 358/448, 461, 464, 474, 358/475, 75, 466, 494, 443, 408

[56] References Cited

U.S. PATENT DOCUMENTS

| | | | |
|---|---|---|---|
| 4,128,830 | 12/1978 | Weythman | 358/461 |
| 4,129,853 | 12/1978 | Althauser et al. | 358/461 |
| 4,486,781 | 12/1984 | Wilmer et al. | 358/461 |
| 4,672,682 | 6/1987 | Naruse et al. | 358/464 |
| 4,853,793 | 8/1989 | Ishikawa et al. | 358/448 |
| 4,862,286 | 8/1989 | Suda et al. | 358/494 |
| 4,876,605 | 10/1989 | Ishikawa et al. | 358/464 |
| 4,954,914 | 9/1990 | Karita et al. | 358/475 |
| 4,974,072 | 11/1990 | Hasegawa | 358/75 |
| 4,980,778 | 12/1990 | Wittman | 358/475 |
| 5,038,225 | 8/1991 | Maeshima | 358/466 |

Primary Examiner—Stephen Brinich
Assistant Examiner—Thomas D. Lee
Attorney, Agent, or Firm—Finnegan, Henderson, Farabow, Garrett and Dunner

[57] ABSTRACT

An image reading apparatus with a plurality of line sensors comprises a reference level adjusting circuit for adjusting a level of a dark output outputted from one of the line sensors to a reference level, and a level difference adjusting circuit for progressively adjusting to a minimum a dark output level difference between the reference level adjusted line sensor and a second line sensor adjacent to the former sensor, a dark output level difference between the second line sensor and a third line sensor adjacent to the second line sensor, and so on. When three or more line sensors are used, a level of a dark output outputted from one of the three line sensors which is located at the center of a sensor array of the three sensors is adjusted to the reference level. Alternatively, a level of a dark output outputted from one of three line sensors which is located at one of the ends of a sensor array of the three line sensors is adjusted to the reference level. With such an arrangement, even when a linear array of a plurality of line sensors is used, the resultant image is free from lines and stripes or density irregularity, because the level differences at the channel boundary levels are adjusted to be zeroed.

9 Claims, 57 Drawing Sheets (REDUCTION)    (ENLARGEMENT)

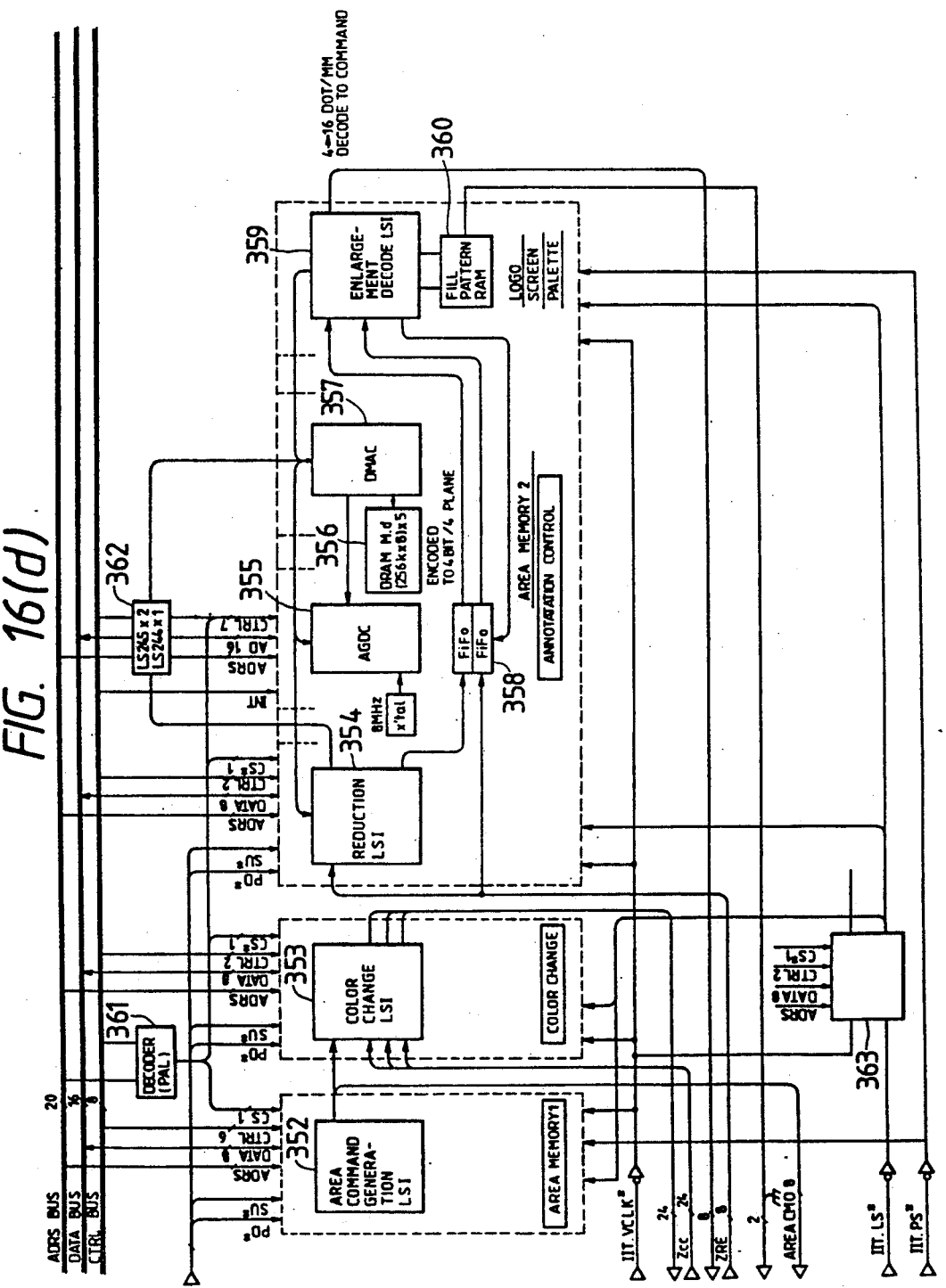

CURRENT FEED BACK

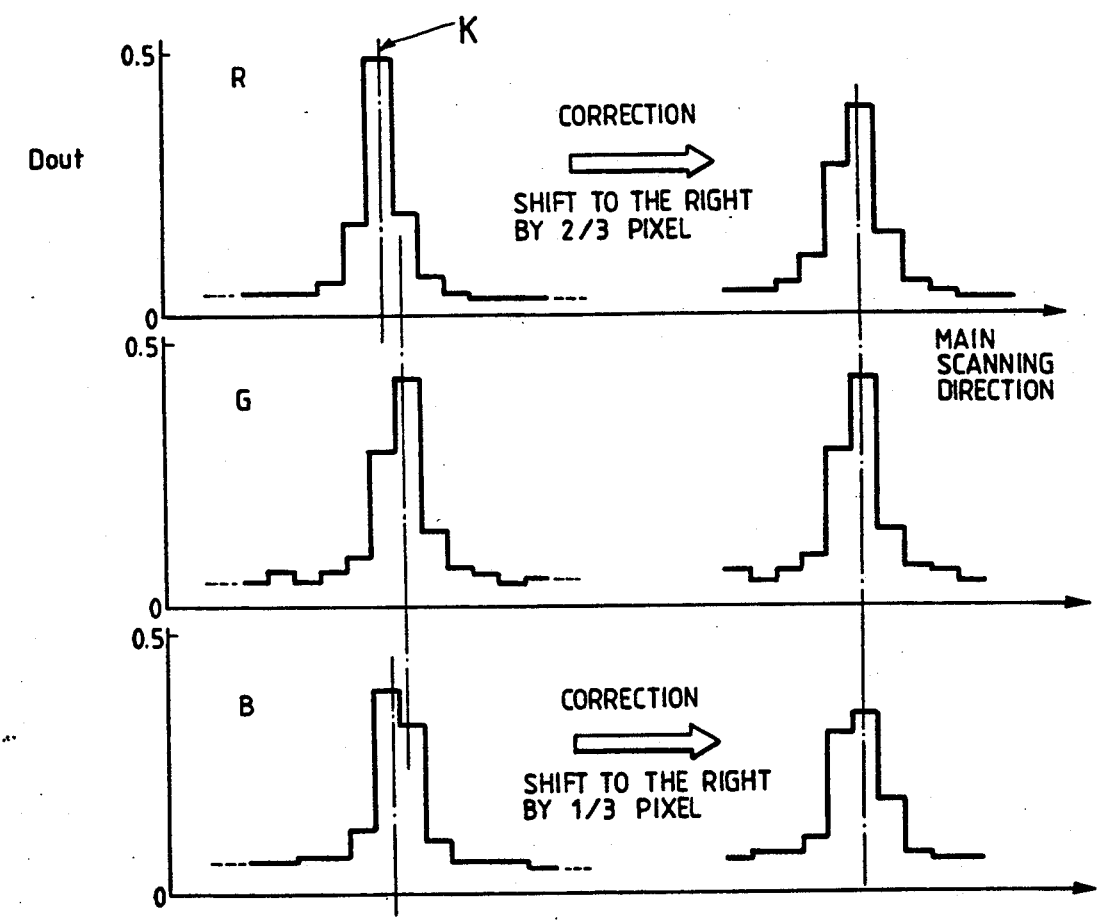

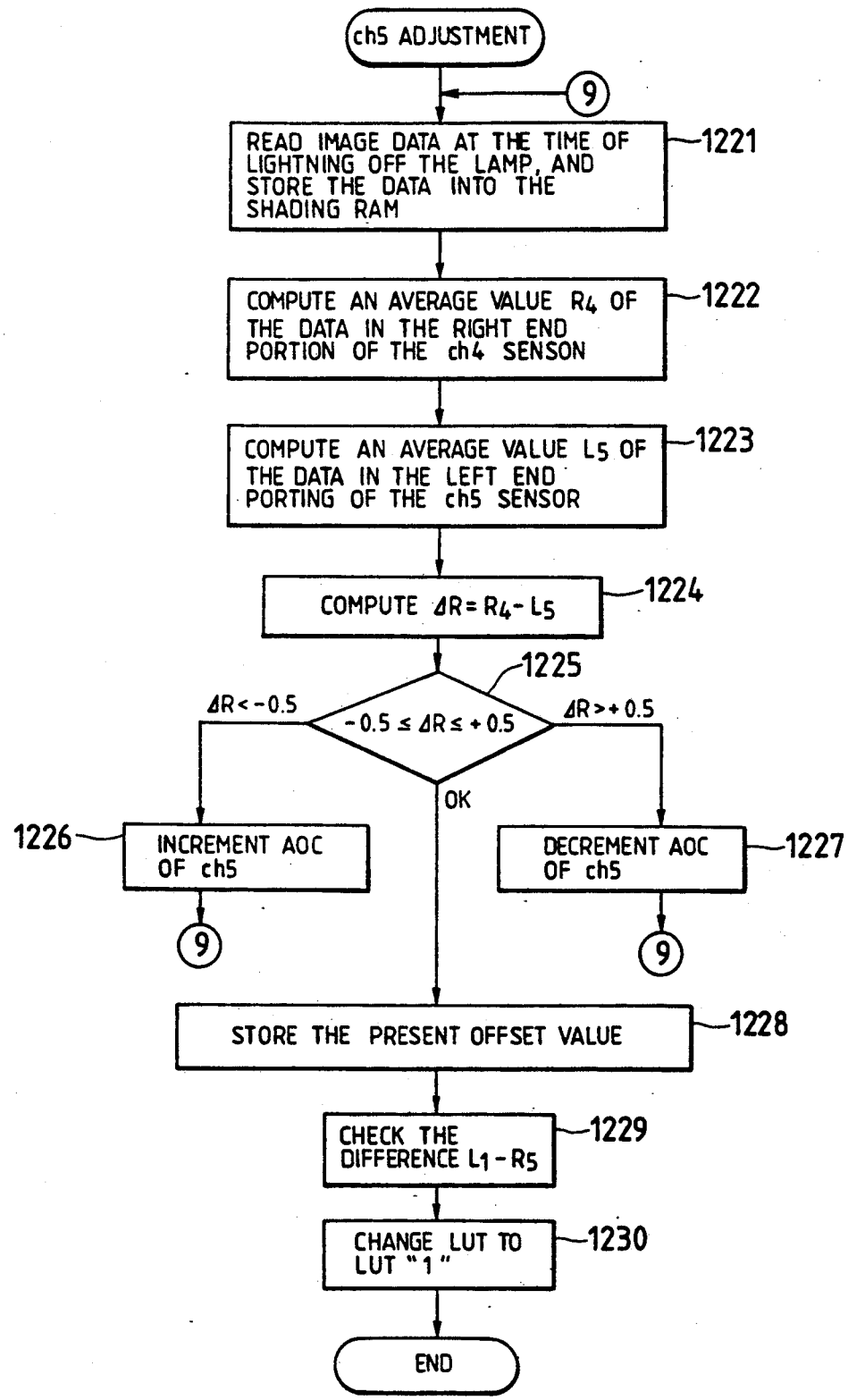

IMAGE READING APPARATUS

BACKGROUND OF THE INVENTION

1. Field of the Invention

The present invention relates to an image reading apparatus for supplying image data to a digital image processing system, such as a digital copying machine, facsimile, and printer, and more particularly to the adjustment of black levels in the output signals of the line sensors in an image reading apparatus having a plurality of line sensors.

2. Prior Art Description

A so-called close contact line sensor has been known as a device to optoelectronically read a distribution of densities on an image of an original. In such a line sensor, an array of a number of photo diodes picks up the density information on the image and converts the density information into electrical quantities that are expressed in the form of the amount of signal charges. The signal charges are temporarily stored, and transferred to a CCD shift register. Through the shift register, the signal charges are successively outputted in the form of video signals. In this case, it is unpractical to continuously form the line sensor as a single linear chip on the same substrate with a uniform sensitivity over its full length, when taking into account wafer size, production yield and cost to manufacture. A practical measure has been taken for this. In the measure, a plurality of chips are arrayed in line in the main scan direction, the image information along one line are dividedly read by the line sensors, and are transferred through channels. The read data are processed for each channel.

The photoelectric conversion characteristic of the line sensor differs for each picture element (pixel) and for each chip. Accordingly, a density obtained when one line sensor reads an image of an original is different from that when another line sensor reads the same image. The fact will be described using a case that the amount of light applied to the line sensor is zero, viz., the line sensor produces a dark output. As best illustrated in FIG. 48(a), the dark outputs outputted through five channels of a line sensor array consisting of five sensor chips are discontinuous in signal level among the sensor chips. If the original image is read by such a sensor array, viz. involving nonuniform signal levels, the resultant image suffers from stripes or density irregularity.

To cope with the problem, a measure conventionally taken is to average the dark voltages of all of the chips for each chip, and to adjust related circuit parameters so that each average value is equal to a target value $D_R$ shown in FIG. 48(b).

Actually, the data voltage outputted from the line sensor array in each channel gently increases as shown in FIG. 48(c). One of the causes for the incremental variation of the dark voltage is a nonuniformity of temperature in the chip. It has been known that the dark voltage is generally doubled every 8° C. rise of temperature. If the above adjustment is applied to the sensor array exhibiting such a characteristic, a level difference $\Delta D$ appears at each channel boundary as shown in FIG. 48(d). The level difference appears in the form of stripes or density irregularity on the reproduced image.

SUMMARY OF THE INVENTION

An object of the present invention is to prevent stripes or density irregularity from appearing in a reproduced image by a unique adjustment of the density differences at the channel boundaries even when a plurality of line sensors arrayed in line are used.

Another object of the present invention is to reduce a total number of the adjustments by automatically adjusting black levels in the output signals of a plurality of line sensors.

A yet another object of the present invention is to prevent increase of the cost to manufacture by simplifying the work to select lines sensors.

To achieve the above objects, as shown in FIG. 1, there is provided an image reading apparatus for outputting image read signals from a plurality of line sensors 901 to a signal processing circuit 902 comprising: reference level adjusting means 903 for adjusting a level of a dark output outputted from one of said line sensors to a reference level, and level difference adjusting means 904 for progressively adjusting to a minimum a difference of dark output level between said reference level adjusted line sensor and a second line sensor adjacent to said reference level adjusted line sensor, a difference of dark output level between said second line sensor and a third line sensor adjacent to said second line sensor, and so on. When three or more line sensors are used, a level of a dark output outputted from one of the three line sensors which is located at the center of a sensor array of said three sensors is adjusted to the reference level. Alternatively, a level of the dark output outputted from one of three line sensors which is located at the end of a sensor array of said three line sensors is adjusted to the reference level. In the present invention, an average of the dark outputs from one of the line sensors is computed and adjusted to the reference level. Then, the level of dark output at one end of a line sensor adjacent to the adjusted line sensor is adjusted so as to be equal to that of the adjusted line sensor.

BRIEF DESCRIPTION OF THE DRAWINGS

FIGS. 16(a) to 16(d) show a hardware configuration of the IPS;

FIGS. 47(a) and 47(b) are graphs showing the correction of color displacement;

FIGS. 53 to 55 are flowcharts showing the black level adjustment process.

DETAILED DESCRIPTION OF THE INVENTION

The present invention will be described in detail by using some specific embodiments in connection with the accompanying drawings.

In the description to follow, a color copying machine will be used as an example of the image recording apparatus. It should be understood, however, that the present invention is not limited to the color copying machine, but may be applied to other types of image recording apparatuses, such as printers and facsimile.

The embodiment description in this specification is divided into the following sections and subsections. Sections I and II describe an overall system of a color copying machine incorporating the present invention. Section III describes in detail the embodiments of the present invention which are realized in the color copying machine.

(I) INTRODUCTION (I - 1) System Configuration
(I - 2) Functions and Features
(I - 3) Electrical Control System

(II) SYSTEM DETAILS (II - 1) General
(II - 2) Image Processing System (IPS)
(II - 3) Image Output Terminal (IOT)
(II - 4) User Interface (U/I)
(II - 5) Film Image Reader

(III) IMAGE INPUT TERMINAL (IIT)

(III - 1) Imaging Unit Drive Mechanism
(III - 2) Control system for a Stepping Motor
(III - 3) Imaging Unit
(III - 4) Video Signal Processing Circuit

(I) INTRODUCTION (I - 1) System Configuration

Figure 1:
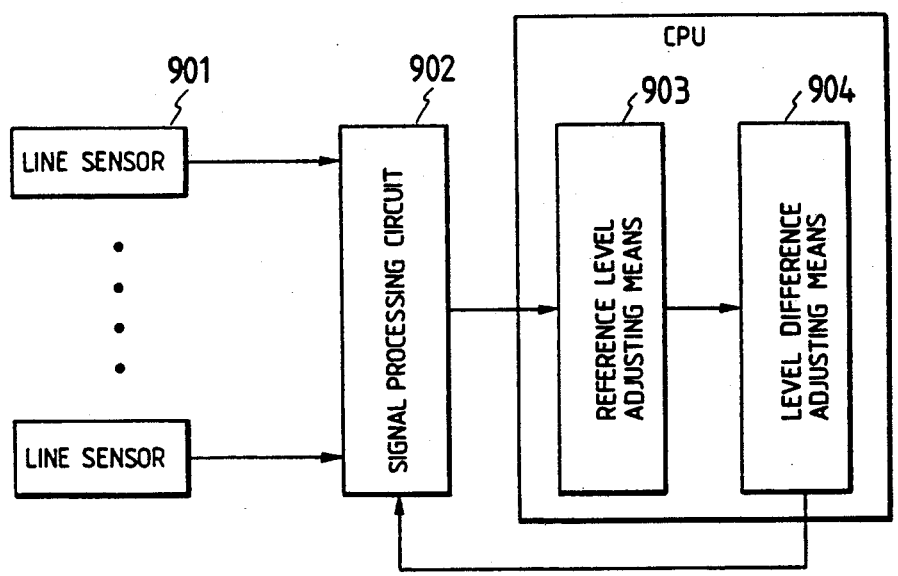
FIG. 1 shows a configuration of an image reading apparatus according to an embodiment of the present invention.
Figure 2:
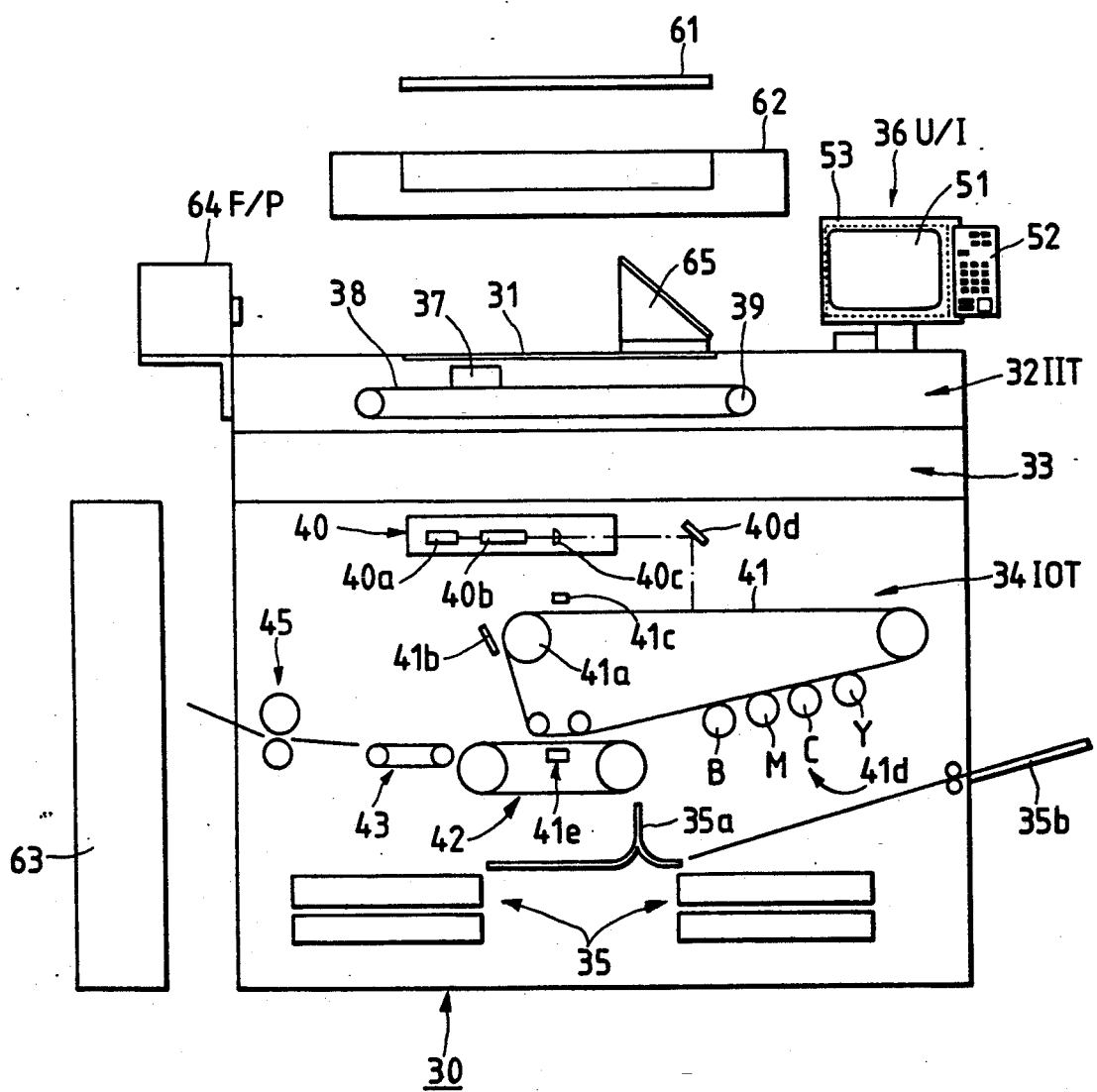
FIG. 2 is a longitudinal sectional view showing an overall structure of a color copying machine incorporating the present invention.

FIG. 2 shows a configuration of a color copying machine into which the present invention is incorporated.

In the color copying machine incorporating the present invention, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, automatic document feeder (ADF) 62, sorter 63, and film projector (F/P) 64.

An electrical hardware is required for controlling the IIT, IOT, U/I, etc. The electrical hardware is divided into a plurality of circuit sections with different signal/data processing functions, such as IIT, IPS for processing the output image signals of the IIT, U/I, and F/P. These circuit sections are assembled into circuit boards, respectively. Together with an SYS board for controlling the above circuit boards, and an MCB (machine control board) for controlling the IOT, ADF, sorter, etc., these circuit boards are housed in the electrical control housing 33.

The IIT 32 is made up of an imaging unit 37, and the combination of a wire 38 and a drive pulley 39, which is for driving the imaging unit 37. The imaging unit 37 reads a color image on an original in terms of image signals of the primary colors, blue (B), green (G) and red (R), by using a CCD sensor and color filters, and converts them into digital image signals, and sends the separated color image signals to an image processing system (IPS).

In the IPS, the B, G and R signals from the IIT 32 are converted into toner primary colors yellow (Y), cyan (C), magenta (M), and black (K). The Y, C, M and K signals are subjected to various processings for improving the reproducibility of color, gradation, definition, and the like. Further, the gradation toner signal of each process color is converted into an on/off or two-level toner signal, and the two-level signals are transferred to the IOT 34.

In the IOT 34 containing a scanner 40 and a photosensitive belt 41, a laser output unit 40a converts the image signals from the IPS into light signals. The light signals travel an optical path including a polygon mirror 40b, F/θ lens 40c and reflecting mirror 40d, and reaches the photosensitive belt 41, and forms a latent image corresponding to the original image on the surface of the belt. The photosensitive belt 41 is driven by a drive pulley 41a. A cleaner 41b, charger 41c, developing units 41d for the primary colors Y, M, C and K, and a transfer unit 41e are disposed around the belt 41. A tow roll loop 42 is disposed close to the transfer unit 41e, as shown. The tow roll transfer loop 42 picks up a sheet of paper as is transported along a paper transfer path 35a from a tray 35, and in cooperation with the transfer unit transfers color toners on the paper. In the case of the full color copy of the 4 pass color type, the tow roll loop is turned four times, and the color toners are transferred on the paper in the order of Y, M, C and K. The paper bearing the transferred color toner image is transported through a vacuum transfer belt 43 to a fixing or fusing unit 45, and then is ejected outside the base machine. If necessary, a single sheet inserter (SSI) 35b may feed a sheet of paper to the paper transfer path 35a.

The U/I 36 is used by a user when he selects a desired function and sets up the conditions to exercise the function. The U/I 36 is provided with a color display 51, and a hard control panel 52 located by the display. In combination with an infrared-ray touch board 53, it enables the user to directly designate necessary functions by soft buttons on the display screen.

The option units available for the base machine follows. The first optional unit is an edit pad 61 as a coordinates input device, which is placed on the platen glass 31. The edit pad enables a user to variously edit images with the aid of a pen or by a memory card. Further, the ADF62 and the sorter 63 may optionally be used.

A mirror unit (M/U) 65 may further be installed. In this instance, it is placed on the platen glass 31. In association with this, the F/P 64 is installed. A color image of a color film, for example, that is projected by the F/P 64, is read by the imaging unit 37 of the IIT 32. With the combination of the M/U 65 and F/P 64, the images of a color film can be copied directly from the color film. The object to be imaged may contain negative and positive films, and slides. Additionally, an automatic focusing device and a correction-filter automatic exchanging device are installed to the copying machine under discussion.

(I - 2) Functions and Features (A) Functions

The color copying machine according to the present invention has various types of functions meeting user's needs, and is operable in a complete automated manner, throughout the copying process. A display unit, for example, a CRT, that is used in the user interface, visually presents select of various functions, select of the conditions to exercise the selected functions, and other necessary menus. Any person including highly skilled persons and beginners may make an easy access to the copying machine.

One of the major functions of the color copying machine consists of hard control panel select operations of items that are out of operation flows, such as start, stop, all clear, ten keys., interrupt, information, and languages, and selective operations of the respective functions by touching soft buttons in a basic display. Touching a pathway tab of a pathway as a function select area allows an operator to select any of various types of edit functions, such as marker edit, business edit, and creative edit. With such functions, any operator can operate the color copying machine for copies of both the mono color and full color in a simple and easy way as operating the conventional copying machine.

The copying machine of the present invention is featured by the full color or 4-pass color copying function, but is operable in the 3-pass color or black copy mode, if necessary.

In respect to paper feed, an automatic paper size select and a paper size designation are possible.

Reduction/enlargement is possible in a broad range from 50% to 400% with steps of 1%. Additional functions are to independently set the magnification of the horizontal and vertical sides of an image and to automatically select the magnification.

An optimum copy density can be automatically set for the mono color original.

When a color original is copied, an automatic color balance mode may be used, in which a user may designate a subtractive color.

A memory card storing job programs is used for making an access to the job programs. A maximum of eight jobs can be stored in the memory card. The memory card has a memory capacity of 32 k bytes. Other jobs than that of the film projector mode can be programmed.

Additional functions are a copy output, copy sharpness, copy contrast, copy position, film projector, page programing, and margin.

In the case of the copying machine or copier coupled with a sorter optionally available, when an uncollated mode is selected, the copy output function operates and hence a maximum adjusting function operates to set a set number of copies within a maximum number of copies which a bin of the sorter can accommodate.

In regard with the copy sharpness to effect the edge emphasis, a manual sharpness adjustment mode of seven steps and a photo sharpness adjustment mode of photo, character, print, and photo/character are optionally provided. The default is a tool pathway and may be set appropriately.

The copy contrast may be set with seven steps by an operator. The default is the tool pathway, and may be set appropriately.

The copy position is for selecting a position on a sheet of paper where an image is to be copied. An automatic centering function to set the center of a copied image at the center of the sheet is optionally used. The default is the automatic centering.

The film projector enables images of various types of films to be copied. Any of the following modes can be selected; projections of 35 mm negative and positive films, 35 mm negative film platen placement, 6 cm×6 cm slide platen placement, and 4 in×4 in slide platen placement. In the film projector mode, paper of A4 size is automatically selected unless the paper size is designated. The film projector pop-up has a color balancer. When the color balancer is set to "Reddish", the projected image is tinged with red. When it is set to "Bluish", the image is tinged with blue. Particular automatic and manual density controls are used.

The page programming function comes in four varieties; a covering function to attach a front/back cover or a front cover to the copies, an insert function to insert a white sheet or a color sheet into a stack of copies, a color mode in which a color mode is set up every page, and a paper size select function in which a desired paper tray, together with the color mode, is selected every page.

The margin function is for setting a margin of the copy with the steps of 1 mm in the range of 0 to 30 mm. The margin can be set to only one side for one original.

The marker edit edits the image within an area enclosed by a marker. This function is directed to the edition of documents and treats the documents as black and white documents. In a black mode, a designated area on the document is painted color of the palette on the CRT, while the other area than the designated one is painted black. In a reddish black mode, an image on the document is painted red, while the remaining area is painted reddish black. The marker edit has the functions of trim, mask, color mesh, and black-to-color. The specific area may be designated by depicting a closed loop on the document, or by using ten keys or the edit pad. This is also applied to the area designation in the editing functions to be given later.

The trim functions to allow the image within a marked area to be copied in mono color, but to prevent the image outside the marked area from being copied, viz., to erase the image outside the marked area.

The mask functions to erase the image within a marked area, but to copy the image outside the marked area in mono color.

When the color mesh mode is exercised, a designated color mesh pattern is placed on a marked area and an image is copied in mono color. The color of the color mesh may be selected from among eight (8) standard colors (predetermined colors) and eight (8) registered colors (registered by a user, and up eight different colors can be selected from 16,700,000 colors and simultaneously be registered). A mesh pattern can be selected from among four patterns.

In the black-to-color mode, the image within the marked area can be copied with a color selected from the 8 standard colors and the 8 registered colors.

The business edit is mainly applied for business documents and quickly edits high quality originals. In this mode, the originals are treated as full color originals. The area or point designation is required for all the functions. A plurality of different functions can be simultaneously set for a single original. In a black/mono color mode, the image outside the specified area is black or mono color, while the black image within the specified area is changed to the palette color on the CRT display. In a reddish black mode, the image outside the specified area is colored in reddish black, while the image within that area is colored in red. The business edit, like the marker edit, is exercised in a variety of modes, such as trim, mask, color mesh, black-to-color, and further logotype, line, paint 1, correction, and function clear.

The logotype mode is exercised to insert a logotype such as a symbol mark at a specified point on an image. Two types of logotypes may be vertically or horizontally inserted. In this case, one logotype is allowed to be used for one original. The logo patterns are prepared in accordance with the client's request and stored into a ROM.

The line mode is provided to depict lines in two-dot expression vertically and horizontally with respect to the x-axis. The color of the line may be selected from the 8 standard colors and the 8 registered colors. The number of lines that can be designated is infinity. The number of colors that can be used simultaneously is seven colors.

In the paint 1 mode, one point within an area defined by a closed loop is designated, and that area is entirely painted with one color selected from among the 8 standard colors and the 8 registered colors. When a plurality of loops are used, the painting is carried out for each area.

The mesh can be selected from four patterns for each area. The number of loops that can be designated is infinite. Up to seven color mesh patterns can be used.

The correction function confirms, corrects, changes, and erases the matters concerning an area as specified, and executes these functions by using three operation modes, an area/point change mode, area/point correction, and area/point cancel mode. The area/point change mode confirms and changes the set functions for each area. The area/point correction mode changes the area size, and changes the point position with steps of 1 mm. The area/point cancel mode erases the specified area.

The creative edit is exercised by using many functions including an image composition, copy-on-copy, color composition, partial display change, multi-page enlargement, paint 1, color mesh, color change, negative/positive inversion, repeat, paint 2, density control, color balance, copy contrast, copy sharpness, color mode, trim, mask, mirror image, margin, line, shift, logotype, split scan, correction, function clear, and add function. In the creative edit mode, the original is treated as a color original. A plurality of functions can be set for one document. Different functions may be used for one area. The area may be specified in a rectangular by a two-point designation and in a point by a one-point designation.

In the image composition mode, a base original is color copied through the 4-cycle color copying operation. The resultant copied paper is left on the transfer belt. Then, a trimmed original is superposedly copied on the copied paper through the 4-cycle copying operation. Finally, the paper thus copied is delivered outside.

In the copy-on-copy mode, a first original is copied through the 4-cycle color copying operation. The resultant copied paper is left on the transfer belt. Then, a second original is superposedly copied on the copied paper through the 4-cycle copying operation. Finally, the paper thus copied is delivered outside.

In the color composition mode, a first original is copied using magenta toner, and the copied paper is left on the transfer belt. A second original is superposedly copied on the first copied paper, using cyan, and the copied paper is fixedly placed there. Finally, a third original is superposedly copied on the second copied paper, using yellow. In a 4-color composition mode, a fourth original is superposedly copied on the third copied paper, using black.

In the partial display shift, after a color copy is obtained through the 4-cycle color copying operation, the color copied paper is left on the transfer belt. Subsequently, another copy is superposed on the first paper through the 4-cycle copying operation. Finally, the paper thus copied is delivered outside.

Of those color modes, the full color mode is based on the 4-cycle copying operation. The 3-pass color mode is based on the 3-cycle copying operation in other modes than the editing mode. The black mode is based on the 1-cycle copying operation in other modes than the editing mode. The plus-one mode is based on the 1- to 3-cycle copying operations.

The tool pathway mode is exercised by using many functions including an auditron, machine setup, default selection, color registration, film type registration, color correction, preset, film projector scan area correction, audio tone, timer set, billing meter, diagnosis mode, max. adjustment, and a memory card formatting. In this pathway mode, a password is needed for making settings and changes. Accordingly, only key operators and customer engineers are permitted to make the settings/changes in this mode. Use of the diagnosis mode is permitted for customer engineers alone.

The color registration is used for registering colors in the register color button in the color palette. The CCD sensor reads the color to be registered from the color original.

The color correction is used for a fine correction of the colors registered in the register color button.

The film type registration is for registering a register film type used in a film projector mode. When it is not registered, a register button cannot be selected on the film projector mode display.

The preset mode is for presetting reduction/enlargement values, 7 steps of copy density, 7 steps of copy sharpness, and 7 steps of copy contrast.

The film projector scan area correction is for adjusting a scan area in the film projector mode.

The audio tone is for adjusting a volume of a select sound, for example.

The timer is for setting a timer releasable to key operators.

Some additional functions are provided for a trouble system. A first function is used when the subsystem is placed in a clashing state. In such a situation, this function operates and re-drives the subsystem to recover it from the clashing state. A second function is used when the subsystem is still in the clashing state even if the clash recovery is applied two times. In such a situation, this function operates to set up a fault mode in the subsystem. A third function operates when jamming occurs in the copying machine. In this case, the third function operates to stop the machine operation.

It is evident that the color copying machine of the present invention is operable with the combination of basic copying function and additional function, and the combination of the basic copying function/additional function and marker edit, business edit, creative edit, and the like.

A copying system including the color copying machine with the above functions offers advantageous and convenient features as described hereinafter.

(B) Features (a) High quality full color

A high quality full color providing a clear and distinctive color image of a color document is attained, with improvements of black image reproduction, light color reproduction, generation copy quality, OHP image quality, thin line reproduction, image quality reproduction of film copies, and copied image sustaining.

(b) Cost reduction

Cost of image forming materials and expendables such as a photosensitive drum, developing unit and toner is reduced. Service cost including UMR and parts cost is reduced. The color copying machine is operable as a mono color copying machine. The copying speed for mono color copies is increased about three times that of the conventional copying machine, and is 30 copies/A4. In this respect, the running cost is reduced.

(c) Improved reproducibility

Input/output devices such as an ADF and a sorter are optionally available, and hence a large number of documents can be copied. A magnification may be set in a broad range of 50% to 400%. A maximum size of document that can be copied is A3. Three stages of paper trays are used, the upper tray accommodating B5 to B4 size, the medium tray accommodating B5 to B4, and the lower tray accommodating B5 to A3 and SSIB5 to A3. The copy speed for the full color (4-pass color) copy is 4.8 CPM for A4, 4.8 CPM for B4, and 2.4 CPM for A3. The copy speed for the mono color copy is 19.2 CPM for A4, 19.2 CPM for B4, and 9.6 CPM for A3. A warm-up time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

(d) Improved operability

Two types of operation buttons are used, hard buttons on the hard control panel and soft buttons on the soft panel of the CRT display screen. Use of these buttons provides an easy operation for beginners and simple operation for experts, and further enables operators to directly select desired functions. As for the layout of controls including these buttons, the controls are concentrated at one location for ease of operations. Effective use of colors correctly sends necessary information to operators. A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. Such soft panel operations would smoothly be accepted by users accustomed to the mono color copying machine. To access the various edit functions, a pathway is opened by merely touching a pathway tab in a pathway area on the soft panel, and an operator may readily access the edit modes. Storage of copy modes and conditions for exercising them in a memory card realizes an automation of relation manual operations.

(e) Variety of functions

A variety of editing functions can be used by touching a pathway tab in the pathway area on the soft panel to open the pathway. In the marker edit, mono color documents can be edited by using a tool of a marker. In the business edit, mainly business documents can be prepared quickly and in high quality. In the creative edit, various editing functions are available. In the full color, black and mono color copy modes, many choices are used, meeting the needs by various expertized operators, such as designers, men engaging in copy service business, and professional key operators. The area specified when the editing functions are used is displayed in the form of bit map area, providing a visual confirmation of the specified area. With such various editing functions and color creation, a smart expression by sentences is secured.

(f) Power saving

A high performance color copying machine of the full color (4-pass color) realized by the present invention is operable at 1.5 kVA. A control system realizing the 1.5 kVA specification in the respective operation modes is decided. A power distribution to the circuit systems for different functions is also decided. An energy transmission system table for confirming energy transmission systems is prepared. The management and verification of power consumption are carried out by using the energy transmission system table.

(C) Use Distinction

The color copy machine of the present invention is operable as a full color copying machine and a mono color copying machine. The operations of the copying machine is easy for unexpertized operators and simple for expertized operators. The copying machine with a variety of useful functions is used not only as a mere copying machine, but also as a machine to aid the creative work. Accordingly, the copying machine satisfies the requirements by professional operators and artists as well. Use of the copying machine may be made distinctive. Some examples of the use of the color copying machine will be given.

Posters, calenders, cards or invitation cards, and New Year's cards with photograph that have been formed by a printing machine, may be formed at much lower cost than by the printing machine, if the number of each of these items is not so large. If the editing functions are well used, original calenders, for example, may be made according to your preference. Further, the calenders may be prepared for each division of a company, while those have uniformly printed for the whole company.

As seen from recent marketing of industrial products, for example, electric appliances, and interior, the coloring of the products and interior greatly influences the marketing figures. The color copying machine of the present invention can offer a necessary number of colored designs at the manufacturing stage of products. Accordingly, a plurality of persons including designers and persons relating to the manufacturing and selling the products can satisfactorily study and discuss the designs for producing products attractive to the market, while seeing the colored design copies. Particularly in apparel business, the present color copying machine is very useful. In this field of business, the order for manufacturing the products, i,e, dress and its garments, is sometimes given to remote markers concerned. In ordering this, the complete designs with necessary colors can be sent to the makers. Accordingly, the order is exact and the work of manufacturing the order products is smoothly and effectively carried out.

It is noted that the color copying machine of the present invention is operable as both the full color copying machine and the mono color copying machine. Therefore, it is possible to copy one original in necessary number of copies of the two types, color copies and mono color copies. This feature is very convenient for the students who are learning the chromatics in colleges and universities. When studying a graphic design, they can copy the design in both the color and mono color copies, and comparatively study the design. With the comparative study, the fact that in red, gray is in almost uniform level is clearly seen. Further, they know how a gray level and a saturation affect the visual sensation.

(I - 3) Electrical Control System

This section will handle hardware architecture, software architecture and state division in an electrical control system of the color copying machine according to the present invention.

(A) Hardware Architecture and Software Architecture

A color CRT as an U/I, although it is used as the U/I in the color copying machine of the present invention, needs a larger amount of the data for color display than a monochromatic CRT. Attempt to build a more friendly UI by creating layout of a display screen and display change also results in an increased amount of necessary data.

Use of a CPU with a large memory requires a large board. The large board creates additional problems. It is difficult to house it in the base machine. The large board makes it difficult to alter the design of the copying machine. Further, the large board increases the cost to manufacture.

To cope with the increase of data amount, the instant color copying machine is arranged such that the data processing function (CPU) is decentralised, with the remotes of the circuit functions, such as the CRT control, that may be made common with another apparatus or device.

Figure 3:
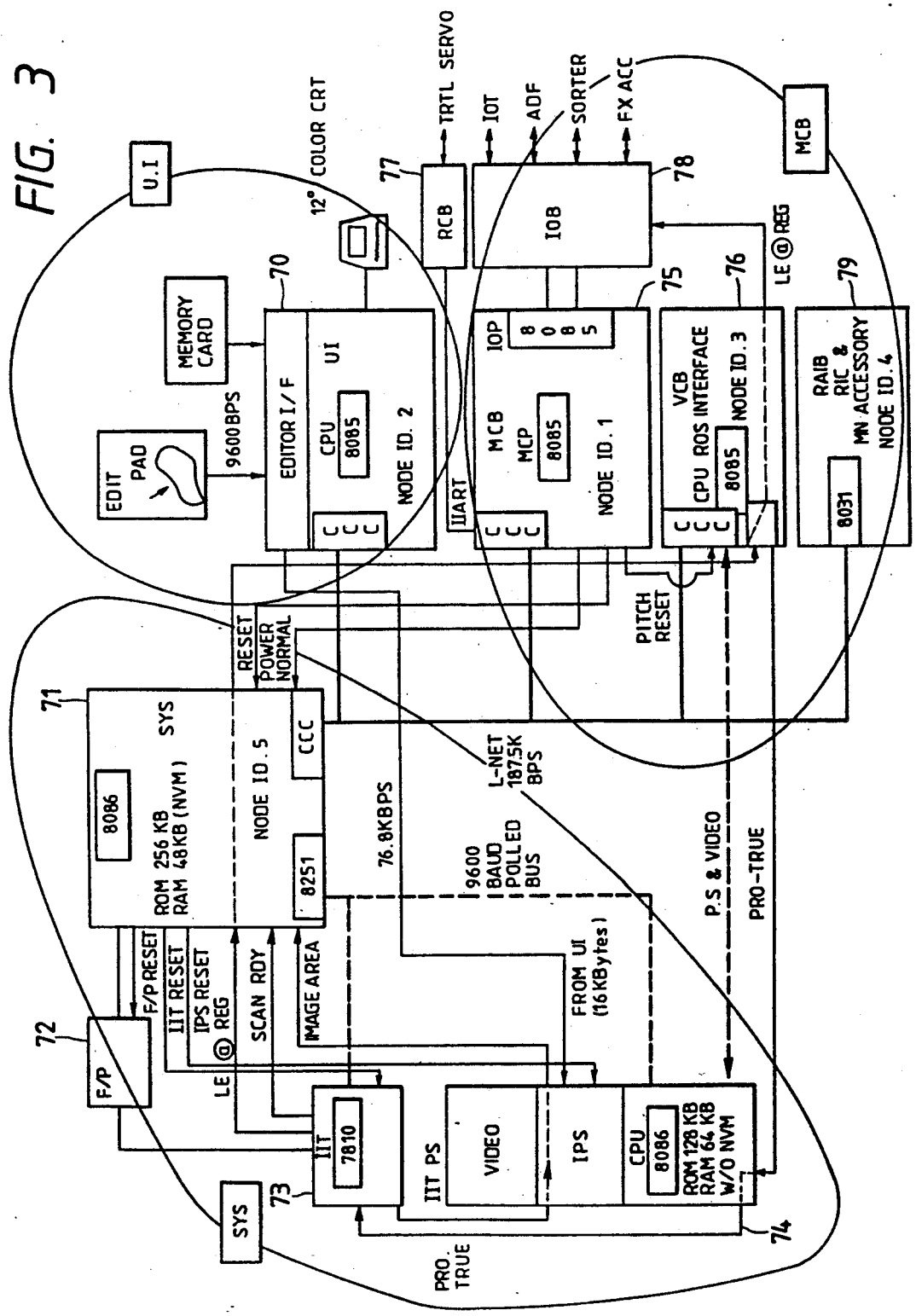
FIG. 3 shows a hardware architecture.

A hardware of the electrical system, as shown in FIG. 3, is composed of a UI system, SYS system and MCB system. The UI system contains a UI remote 70. In the SYS system, an F/P remote 72 for controlling the F/P, IIT remote 73 for reading an image of an original, and an IPS remote 74 for executing various image processings are contained and independently execute their data processings. An SYS (system) remote 71 is provided as a control unit to control the remotes as mentioned and to be given later. The SYS remote 71 requires a memory of a large memory capacity, because a program to control the display changes of the UI, and others must be stored. The 8086 16-bit microprocessor is used for the SYS remote 71. If required, the 68000 microprocessor may be used. The MCB system is composed of a VCB (video control board) remote 76, RCB remote 77, IOB remote 78, and an MCB (master control board) remote 75. The VCB remote 76, serving as a raster output scan (ROS) interface, receives from the IPS remote 74 a video signal to form a latent image on the photosensitive drum by a laser beam, and sends the video signal to the IOT. The RCB remote 77 is for the servo system of the transfer belt (turtle). The IOB remote 78 serves as an I/O port for the IOT, ADF, sorter, and accessory. The MCB remote 75 synthetically manages the decentralised accessory remote 79.

Each remote in the drawing of FIG. 3 is constructed with a single board. In the figure, a bold continuous line indicates a high speed communication network LNET of 187.5 kbps; a bold broken line, a master slave type serial communication network of 9600 bps; and thin continuous lines, hot lines as transmission lines for control signals. A line 76.8 kbps indicates a dedicated line for transmitting graphic data depicted on the edit pad, copy mode data entered from the memory card, and graphic data in the edit area from the UI remote 70 to the IPS remote 74. CCC (communication control chip) indicates an IC for supporting a protocol of the high speed communication line LNET.

As described above, the hardware architecture is composed of the UI system, SYS system, and MCB system. The processings shared by those systems will be described with reference to a software architecture of FIG. 4. Arrowheads indicate the directions of data transmission performed through the high speed communication network LNET of 187.5 kbps and the master/slave type serial communication network of 9600 bps, and the directions of control signals flowing through the hot lines.

The UI remote 70 is made up of an LLUI (low level UI) module 80 and a module (not shown) for processing the data of the edit pad and the memory card. The LLUI module 80, that is similar to a called CRT controller, is a software module for displaying an image on a color CRT screen. The displaying of images on the display screen is controlled by an SYSUI module 81 and an MCBUI module 86. This fact clearly indicates that the UI remote may be made common with another apparatus or device. The reason for this is that how to lay out the display screen and how to change the display depend on the type of the apparatus, but the CRT controller is used in combination with the CRT.

The SYS remote 71 is made up of three modules, SYSUI module 81, SYSTEM module 82, and SYS.-DIAG module 83. The SYSUI module 81 is a software module for controlling the display change. The SYSTEM module 82 contains a software for recognizing what coordinates is selected on the software panel and what display presents the softtware panel containing the selected coordinates, viz., what job is selected, a software for finally checking the job as to whether or not contradiction exists in the copy exercising conditions, and a software for controlling the transfer of various types of data, such as F/F select, job recovery, and machine state, with other modules. The SYS.DIAG module 83 operates in a customer simulation mode in which the copying operation is performed in a diagnostic state for self-test purposes. In the customer simulation mode, the color copying machine under discussion operates as it operates in a normal copying operation mode. Accordingly, the DIAG module 83 is substantially the same as the SYS.DIAG module 82. However, it is used in a special state, or the diagnostic state. For this reason, the DIAG module is depicted separately from the SYSTEM module 82, but they partially overlap. An IIT module 84 for controlling a stepping motor used in the imaging unit is stored in the IIT remote 73. An IPS module 85 for executing various processings is stored in the IPS remote 74. These modules are controlled by the SYSTEM module 82.

The MCB remote 75 stores software modules, such as an MCBUI module 86 as a software for controlling the display change when the color copying machine or color copier is paced in a fault state such as the diagnostic, auditron and jamming, an IOT module 90 for executing the processings necessary for the copying operation, such as photosensitive belt control, developing unit control, and fuser control, ADF module 91 for controlling the ADF, and SORTER module 92, and a copier executive module 87 for managing the software modules, dia. executive module 88 for executing a variety of diagnosis, and an auditron module 89 for processing charge calculation by accessing an electronic counter with a password. The RCB remote 77 stores a turtle servo module 93 controlling the operation of the turtle. The module 93 is under control of the IOT module 90, in order to control the transfer process of the Zerography cycle. In figure, the copier executive module 87 and the dia. executive module 88 are depicted partially overlapping with each other.

Figure 4:
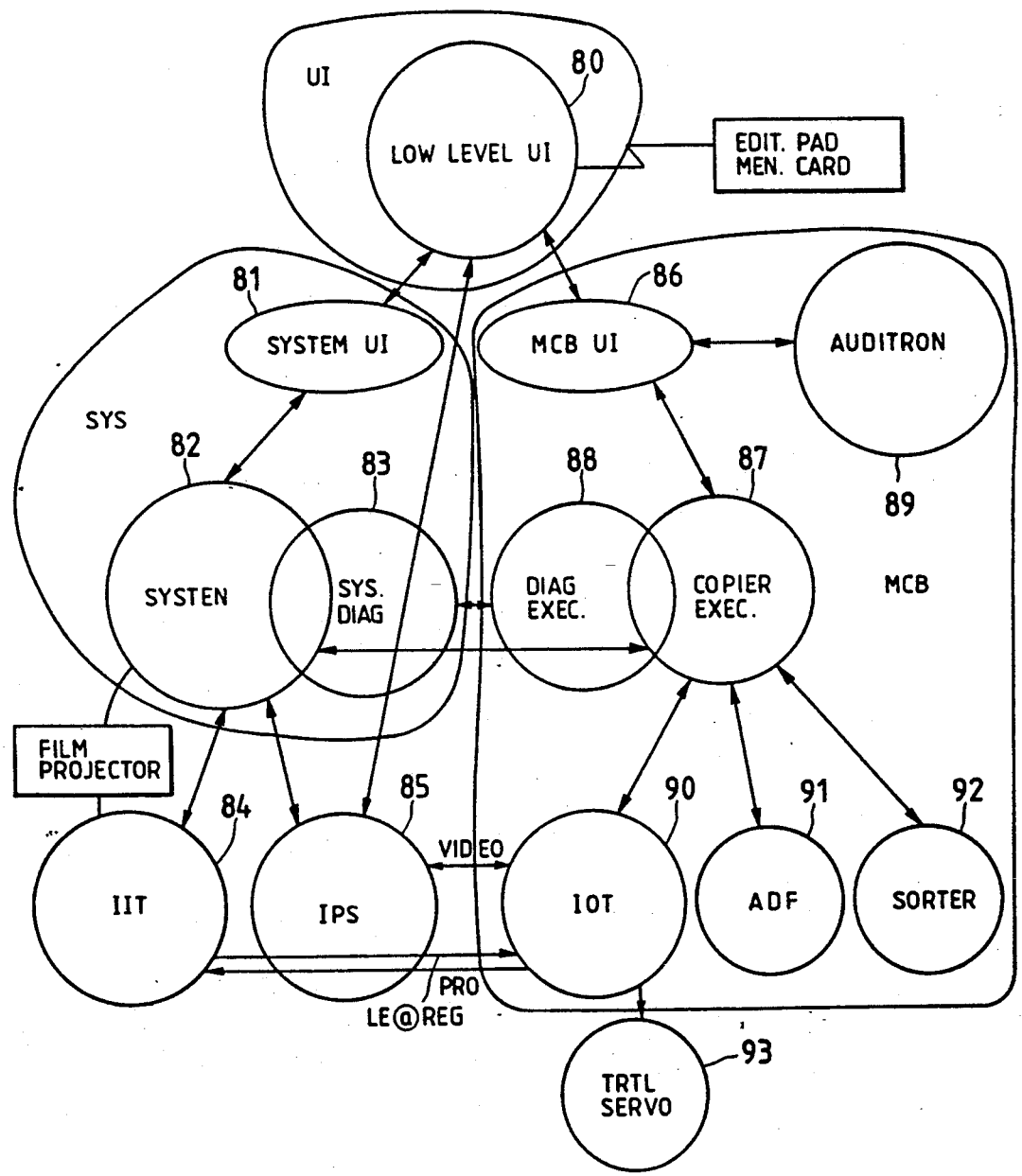
FIG. 4 shows a software architecture.
Figure 5:
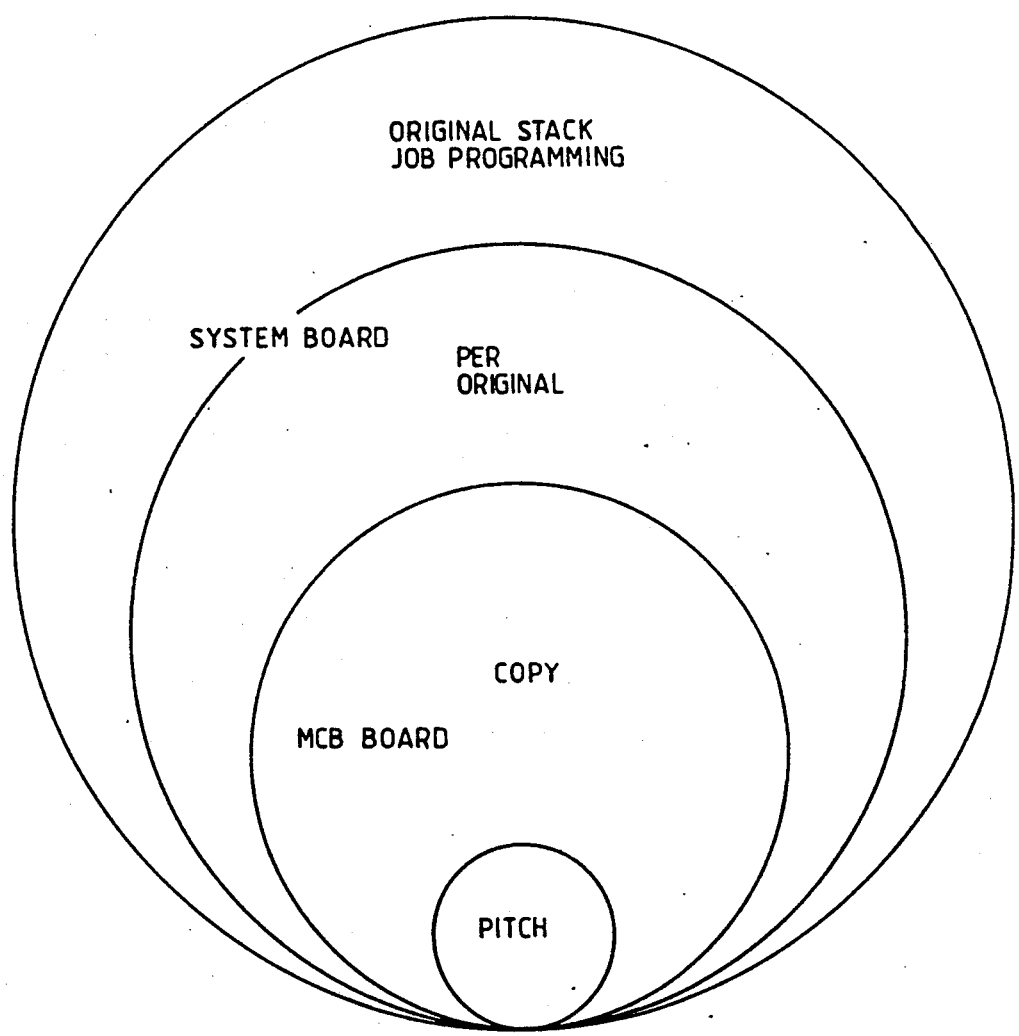
FIG. 5 shows copy layers.

The shared processings will be described while tracing a sequence flow copying operation. The copying operation, except the difference of colors, consists of repetitive similar operations, and hence it may be divided into some layers, as shown in FIG. 5. An operation unit, called pitch, is repeated to make a sheet of color copy. The operation for a single color copy consists of the processings how to move the imaging unit, how to transfer paper, how to operate the developing unit, turtle and the like, and how to detect jamming. The repetitive applications of a sequence of the pitch processings to three colors Y, M and C makes a three-pass color copy. When it is applied to four colors Y, M, C and K, a four-pass color copy is made. This sequence of copying operations forms a copy layer. In the copy layer, the toners of three colors are transferred to the paper, the transferred color toner image is fused, and the copy paper or the paper bearing the fused color image is delivered outside the base machine. The processing up to this point is managed by the copier executive module 87. The IIT module 84 and the IPS module 85 in the SYS system are also used in the stage of the pitch processings. To this end, the IOT module 90 communicates with the IIT module 84 by using two types of signals, a PR0 signal and a LE@REG signal as shown in FIGS. 3 and 4. More specifically, when a PR0 signal is outputted from the IOT module 90, it is sent from the MCB remote through the LNET to the VCB remote 76. Further, it is sent from the VCB remote 76 to the IPS remote 74 and IIT 73 by way of the hot line. Under this condition, the IIT remote 73 and the IPS remote 74 can perform the pitch processing in synchronism with the IOT. At this time, a video signal to modulate a laser beam, that is for forming a latent image on the photosensitive belt, is transferred between the IPS remote 4 and the VCB remote 76. The video signal received by the VCB remote 76 is transferred to the MCB remote through the LNET. It is further transferred through the IOB remote 78 to the laser output section 40a in the IOT.

After one cycle of the pitch processing is completed, the imaging unit reaches a preset regi. position. At this time, the IIT remote 73 outputs a LE@REG signal onto the hot line, and sends it to the SYS remote 71, VCB remote 76 and IOB remote 78, and then is further transferred from the remote 78 to the IOT.

The above sequence of pitch operations is repeated four times, to form a 4-pass color copy, and one cycle of copying operations is completed.

Following the processings described above that are categorized into the copy layer, another processing to set the number of jobs as copy units executed for a sheet of original, viz., to set the number of copies is executed. This is executed in a per original layer. An additional layer following the per original is a job programming layer to change parameters in jobs. More exactly, the job programming layer checks as to whether or not the ADF is used, a color of a part of an original is changed, and the one-side magnification function is operated. These layers of the per original and the job programming are managed by the SYSTEM module 82 in the SYS system. Accordingly, the SYSTEM module 82 checks and confirms the jobs transferred from the LLUI module 80, generates necessary data, and informs of the job the IIT module 84 and the IPS module 85 through the 9600 bps serial communication network, and also informs of the same the MCB system through the LNET.

As seen from the foregoing description, the controls that can be independently processed and can be made common with another apparatus or device are decentralized into the UI system, SYS system and the MCB system. The modules for managing the copying machine are determined in accordance with the layers of the copying processings. This approach brings about many advantageous features. The design work of the electrical control system the copying machine may be classified and itemized. The developing techniques, such as software, can be standardized. The time limit of delivery and the cost to manufacture can be exactly predicted. When some specifications are changed, it is only needed to replace the related modules with other new ones. Accordingly, the developing works can be effectively executed.

(B) State Division

In the previous subsection, the shared controls of the UI system, SYS system and MCB system were described. In this subsection, the controls by these systems in the respective stages of the machine operation will be described tracing a flow of the machine operation.

Figure 6:
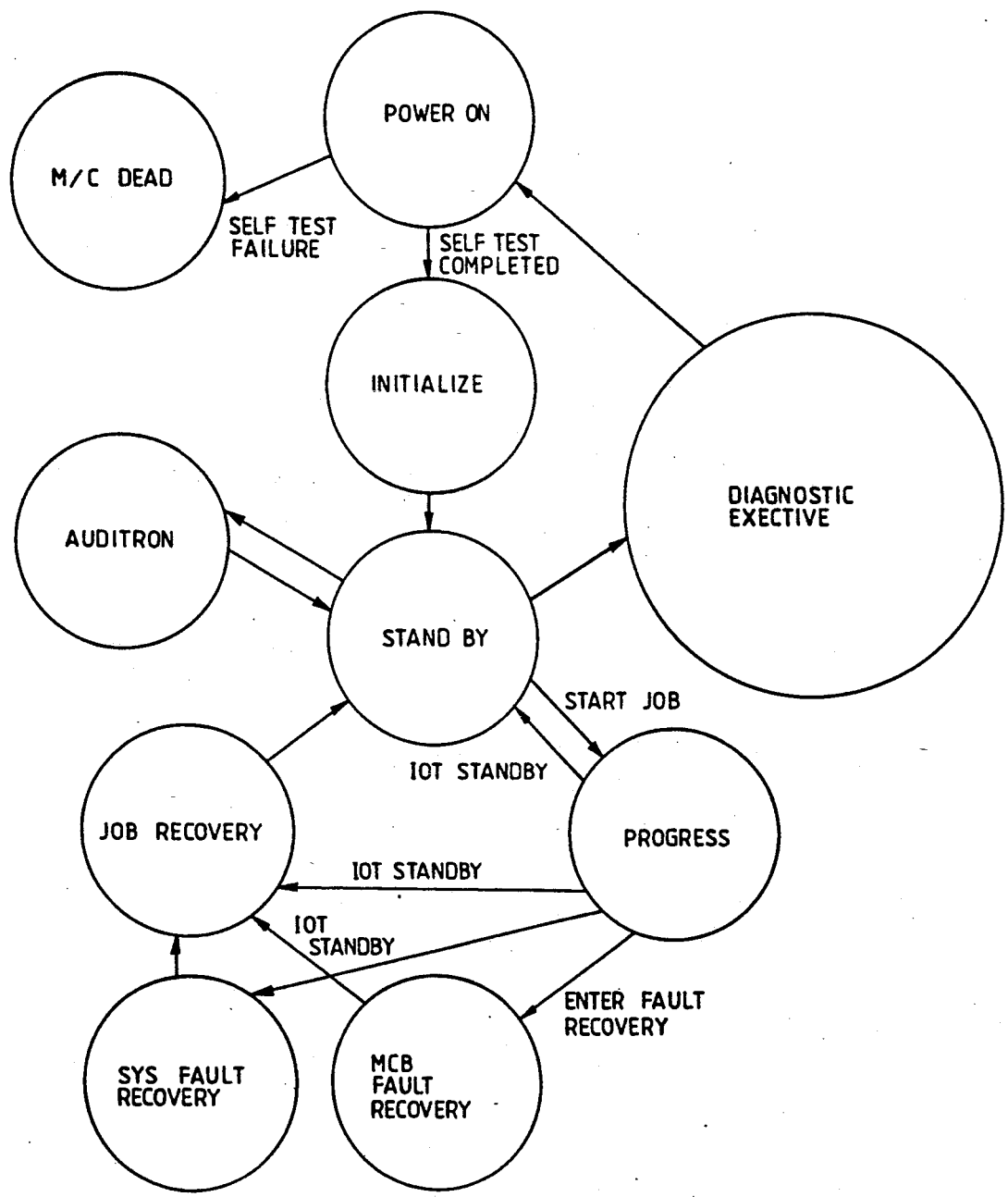
FIG. 6 shows an explanatory diagram for explaining state divisions.

In the present color copying machine, a flow of machine operation including the power-on, copying operation, end of copying operation, and machine state posterior to the copying operation, are divided into a plurality of states. These states are assigned jobs, respectively. Control cannot proceed to the next state until the job in a state is completed. This ensures the good efficiency of control progression and the exactness of control. The above manner to control the machine operation is called a state division. In this instance, the machine operation is divided into states, as shown in FIG. 6.

The state division is featured in that in some operation modes, the SYS remote 71 possesses a control right to control all of the states and a UI master right to use the UI in a state, and in some control modes, the MCB remote possesses them. With the decentralization of control, the LLUI module 80 of the UI remote 70 is controlled not only by the SYSUI module but also by the MCBUI module 86. The processings are shared such that the pitch and copy processings are under control of the copier executive module 87 in the MCB system, and the per original processings and the job programming processings are controlled by the SYS module 82. Accordingly, in some states the SYS module 82 has the control right and the UI master right in some states, and in some states the copier executive module 87 has them. In FIG. 6, in states indicated by circles filled with vertical thin lines, the UI master right is possessed by the copier executive module 87 in the MCB system. In states indicated by circles painted black the UI master right is possessed by the SYS module 82.

Figure 7:
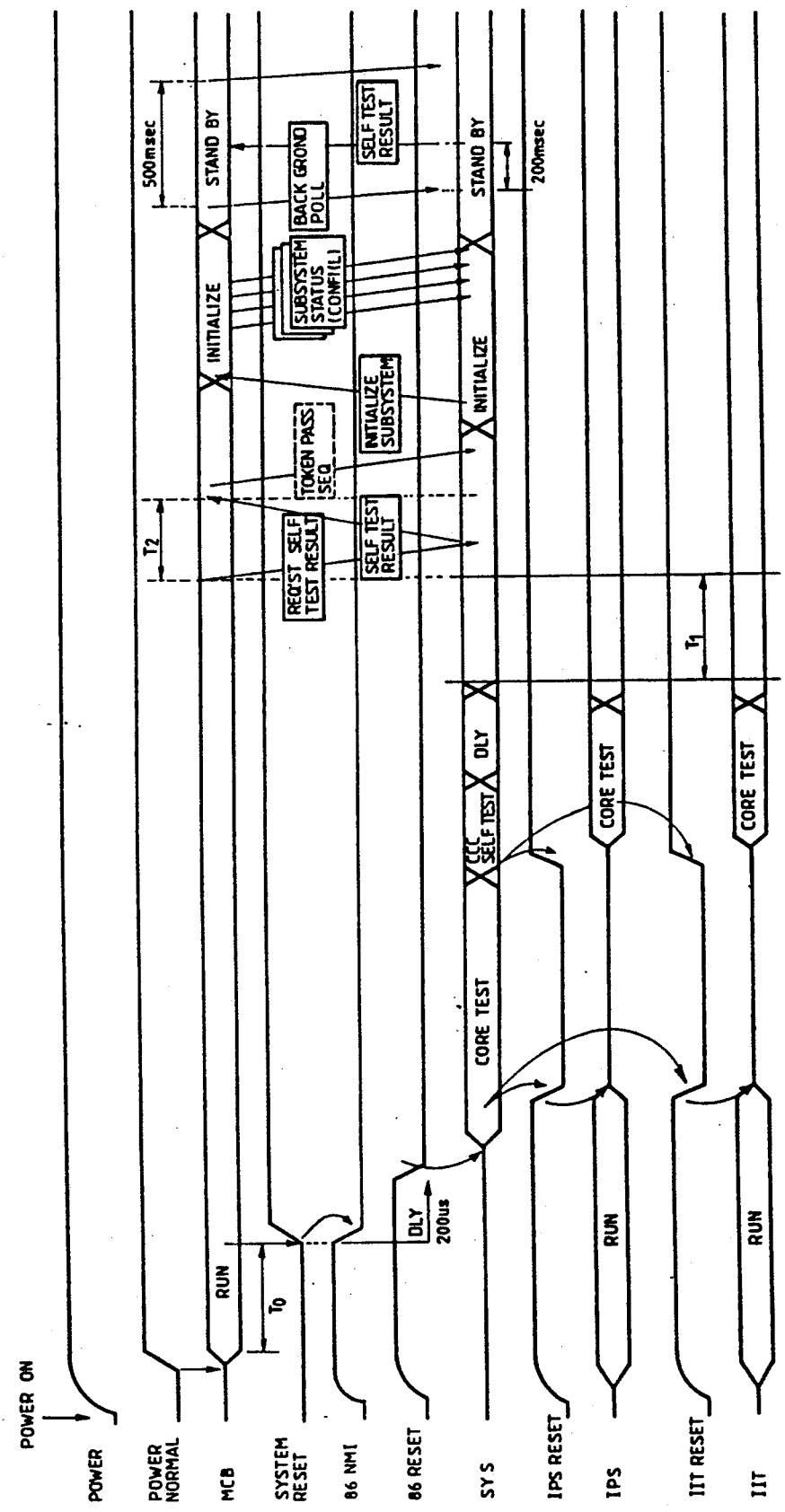
FIG. 7 shows a timing chart for explaining the operation of the copier from the power on state to the standby state.

Of the states shown in FIG. 6, the machine operation from the power-on state to the standby state will be described with reference to FIG. 7.

A power switch is turned on, and the machine is in a power-on state. An IPS reset signal and an IIT reset signal that are supplied from the SYS remote 71 to the IIT remote 74 and the IPS remote 74 (FIG. 3) become H (high) in logic state. Upon receipt of these signals, the IPS remote 74 and the IIT remote 73 are released from the reset status and start to operate. The settle-down of the power voltage is detected and a power normal signal rises. The MCB remote 75 starts to operate and to establish the control right a the UI master right. At the same time it tests the high speed communication network LNET. The power normal signal is transferred from the MCB remote 75 to the SYS remote 71, by way of the hot line. When time T0 elapses from the operation start of the MCB remote 75, a system reset signal supplied from the MCB remote 75 through the hot line to the SYS remote 71 goes high. Then, the SYS remote 71 is released from the reset status and starts to operate. The operation start of the SYS remote 71 is delayed by time T0 plus 200 $\mu$sec by two signals, 86NMI and 86 reset, that are internal signals of the SYS remote 71. The time period of 200 $\mu$sec is provided for storing the present state of the copying machine into a nonvolatile memory when the copying machine stops or runs away due to clash, i.e., temporary trouble, power interrupt, software runaway, and software bug.

When the SYS remote 71 starts to operate, a core test is conducted for a period of approximately 3.8 sec. The test checks the contents of the ROM and RAM, and the hardware. At this time, if undesired data is mistakenly entered, the machine will possibly run away. To avoid this, the SYS remote 71, on its decision, renders low (L) the IPS reset signal and the IIT reset signal, at the time of the start of the core test. By the L signals, the IPS remote 74 and the IIT remote 73 are reset and come to a standstill. Upon completion of the core test, the SYS remote 71 conducts a CCC self test during a period of 10 to 3100 msec, and at the same time renders high the IPS reset signal and the IIT reset signal, thereby to cause the IPS remote 74 and the IIT remote 73 to operate again, and to cause them to conduct the core tests. In the CCC self test, the SYS remote 71 sends predetermined data to the LNET, receives the return data, and checks as to whether or not the transmitted data is coincident with the received data. The times of the self tests of the CCCs are staggered one another, to prevent the different self tests from being conducted concurrently. The LNET employs a contention system. In this system, the nodes such as the SYS remote 71 and the MCB remote 75 transmit data when they desire so. If different data collide, the same data is retransmitted after a predetermined time lapses. The reason why the contention system is used is that when the SYS remote 71 is conducting the CCC self test, if another node uses the LNET, the data collision occurs and it cannot conduct the CCC self test. Accordingly, before the SYS remote 71 starts the CCC self test, the LNET test by the MCB remote is completed. When the CCC self test ends, the SYS remote waits till the core tests by the IPS remote 74 and the IIT remote 73 are completed. It conducts a communication test of the SYSTEM node during a period T1. This communication test is for testing the serial communication network of 9600 bps. In the test, predetermined data is transferred in a predetermined sequence. Upon completion of the communication test, during a period T2 the LNET communication test is conducted between the SYS remote 71 and the MCB remote 75. In the communication test, the MCB remote 75 requests the SYS remote 71 to return the results of the self test. In response to the request, the SYS remote 71 returns the results of the tests thus far conducted, as self test results, to the MCB remote 75. When receiving the self test results, the MCB remote 75 issues a token pass toward the SYS remote 71. The token pass is used to transfer the UI master right. For example, when the token pass is transferred to the SYS remote 71, the UI master right is transferred from the MCB remote 75 to the SYS remote 71. The operations up to this point belong to a power-on sequence. In this sequence, the UI remote 70 displays a message of "Please wait a minute", for example, and executes various tests, such as a core test of the remote 70 itself and communication test.

In the self test sequence, when the return of the self test result is requested, but no return is made, or the returned self test result contains an error, the MCB remote 75 makes the copying machine dead, exercises the UI control right to control the UI remote 70, and visually presents a faulty state of the machine.

An initialize state to set up the respective remotes follows the power-on state. In the initialize state, the SYS remote 71 possesses the control right to control all of the states and the UI master right. The SYS remote 71 initializes the SYS system, and issues a command INITIALIZE SUBSYSTEM to the MCB remote 75 and initializes the MCB system. The result of the initialization is returned as subsystem status from the MCB remote 75. Through the initializing state, in the IOT, the fuse is heated, and the elevator of the tray is set at a predetermined position. The operations up to this point constitute the initialize state.

Upon completion of the initialize state, the respective remotes enter a stand-by state in which the they are ready for a copying operation. In this state, the SYS remote 71 possesses the UI master right. Accordingly, it exercises the UI master right to display the F/F on the UI display screen, and is ready for accepting the conditions for executing the copying operations. At this time, the MCB remote 75 monitors the IOT. In the stand-by state, to check a faulty in the copier, the MCB remote 75 issues a background pole to the SYS remote 71 every 500 msec. In response to this, the SYS remote 71 returns the self test result to the MCB remote 75 within 200 msec. When no return of the self test result is made, or the returned self test result contains an error, the MCB remote 75 informs the UI remote 70 of occurrence of a faulty state, and causes it to display a faulty state of the machine.

When the auditron is used in the stand-by state, the copier enters an auditron state. In this state, the MCB remote 75 exercises the auditron control, and at the same time controls the UI remote 70 to cause it to present an auditron display.

When the F/F is set up and the start key is operated in the stand-by state, the copier enters a progress state. The progress state is further divided into six substates, a set-up, cycle-up, skip pitch, normal cycle-down, and cycle-down shutdown. These substates will be described with reference to FIG. 8.

Figure 8:
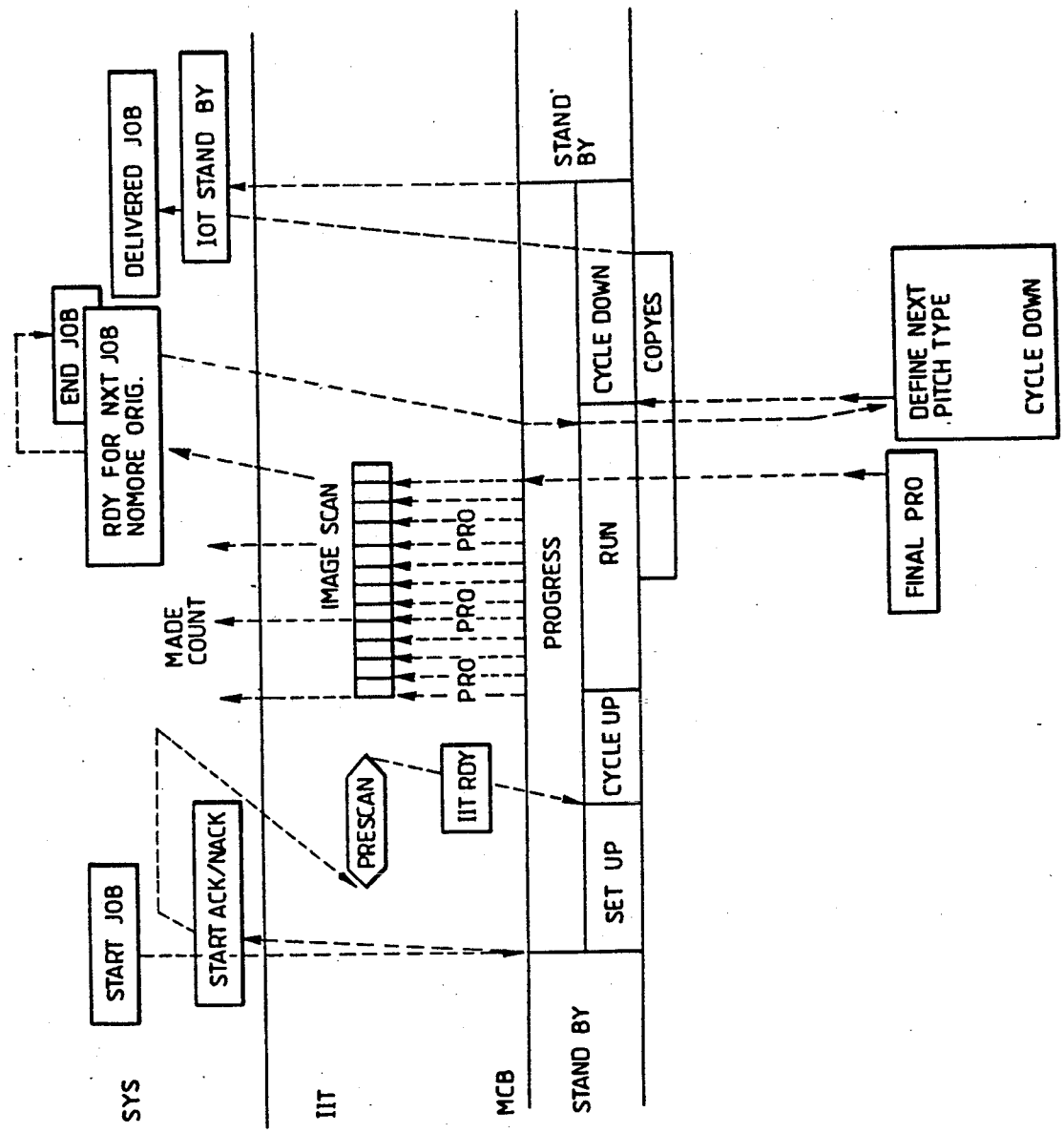
FIG. 8 is a diagram showing a sequence of a progress state.

A timing chart illustrated in FIG. 8 was plotted under conditions that the copier is set in a platen mode, full color mode, and the number of copies is set at three.

When detecting the depression of the start key, the SYS remote 71 sends the contents of a job to the IIT remote 73 and the IPS remote 74, through the serial communication network. The same also issues a command "start job", and sends the job contents and the start job command as well to the copier executive module 87 in the MCB remote 75. As a result, the copier enters the set-up substate, and the respective remotes prepare for executing the designated job. In the IOT module 90, a main motor is driven, and parameters for the photosensitive belt are set to correct values. The SYS remote 71 confirms that an ACK (acknowledge) signal as a response of the MCB remote 75 to the start job reaches, and causes the IIT remote 73 to prescan. In this instance, four types of prescans are used; a prescan to detect size of an original, a prescan to detect a color in a specified portion on the document, a prescan to detect a closed loop for an outline drawing for coloring, and a prescan for reading a marker in the marker edit mode. A maximum of three prescans is repeated in accordance with the selected F/F. At this time, the UI displays a message "Please wait a minute", for example.

When the prescan operation ends, a command "IIT ready" is issued to the copier executive module 87. From this point, the copier, or the copying machine, enters the cycle-up substate. In the cycle-up state, the copier waits for the respective remote to start up and settle down. The MCB remote 75 starts up the IOT and the transfer unit. The SYS remote initializes the IPS remote 74. At this time, the UI displays the progress state being exercised and the contents of the selected job.

Upon completion of the cycle-up substate, the run substate is executed and the copying operation starts. When a first PR0 is produced from the IOT module 90 of the MCB remote 75, the IIT performs a first time scan, and the IOT performs the development of a first color. Here, the processing of one pitch is completed. Then, when the second PR0 is produced, the processing of the second pitch is completed. The above sequence of the processings is repeated four times to complete the processings of 4 pitches. Then, the IOT fuses the toner image and delivers the paper with the fused image outside the base machine. At this point, the copying operation of the first copy is completed. The above sequence of processings is repeated to produce three copies as is preset.

The processings of the pitch layer and the copy layer are under control of the MCB remote 75. The setting of the number of copies in the per original as the upper layer of the above two layers is carried out by the SYS remote 71. Accordingly, in order that the SYS remote 71 can recognize what number of copies is currently made, when the first PR0 for each copy is produced, the MCB remote 75 produces a made count signal for transfer to the SYS remote 71. When the final PR0 is produced, the MCB remote 75 requests the SYS remote 71 to send the next job by issuing a command "RDY FOR NXT JOB" to the SYS remote 71. At this time, if the start job is issued, the job can be continued. When a user does not set the next job, the job ends. In this case, the SYS remote 71 issues a command "END JOB" to the MCB remote 75. When the MCB remote 75 receives the "END JOB" and confirms that the job ends, the copier enters the normal cycle-down substate. In this state, the MCB remote 75 stops the operation of the IOT. The SYS remote 71 issues a stop job command to the IOT, and waits for a response from the IOT.

During the course of the cycle-down, when the copy papers have been delivered out of the base machine and the MCB remote 75 confirms the delivery of the copy papers, the remote 75 informs the SYS remote 71 of it by issuing a command "DELIVERED JOB". Also when the normal cycle down ends and the machine comes to stop, the MCB remote 75 informs the SYS remote 71 of it by issuing a command "IOT STAND BY". At this point, the progress state ends and control returns to the standby state.

The substates of the skip pitch and the cycle-down shut-down that have not yet been described will be referred to below. In the skip pitch, the SYS remote 71 initializes the SYS system for the next job, and the MCB remote 75 is ready for the next copy. In the cycle-down shut-down state that is used when a fault occurs, the SYS remote 71 and the MCB remote 75 both execute a fault processing.

As seen from the foregoing description, in the progress state, the MCB remote 75 controls the pitch processing and copy processing, and the SYS remote 71 controls the per original and the job programming. Accordingly, the control right is possessed by the MCB remote 75 or the SYS remote 71 in accordance with the shared processing that is currently performed. The UI master right, however, is exclusively possessed by the SYS remote 71. The reason for this is that the UI must display the number of copies as is set and the selected edit processings, these jobs belong to the per original layer and the job programming layer, and hence under control of the SYS remote 71.

When a fault occurs in the progress state, control goes to a fault recovery state. The word "fault" means an abnormal state of the copier including no paper, jamming, abnormal and damaged parts, and the like. The fault comes in two categories, a first fault that a user can remove by resetting the F/F, and a second fault that requires some action by a serviceman, such as parts replacement. As described above, basically, the faulty display work is shared by the MCBUI module 86, but the F/F is controlled by the SYS module 82. The machine recovery from the first fault that can be cured by the resetting of the F/F is shared by the SYS module 82. The machine recovery work from other faults is shared by the copier executive module 87.

The SYS system and the MCB system are used for detecting faults. Faults occurring in the IIT, IPS, and F/P are detected by the SYS remote 71, because these are controlled by the remote 71. Faults occurring in the IOT, ADF, and sorter are detected by the MCB remote 75, because these are controlled by the remote 75. Accordingly, the faults possibly occurring in the copying machine may be categorized into four types of faults to be given below.

(1) Fault Detected and Cured by SYS Node

This type of fault occurs when the start key is depressed before the F/P is set. The faulty state of the machine can be removed by resetting the F/F.

(2) Fault Detected by SYS Node, but Cured by MCB Node

This type of fault includes trouble of the reginsor, abnormal speed of the imaging unit, overrun of the imaging unit, abnormal PR0 signal, abnormal CCC, trouble in the serial communication network, check error of the ROM or RAM, and the like. When any of the above faulty state occurs, the UI displays the contents of the fault and a message "Call a serviceman".

(3) Fault Detected by MCB Node and Cured by SYS Node

When the sorter is actually set, if the F/F sets the sorter, the MCB node detects a fault. Such a faulty state in the copying machine can be removed by resetting the F/F by a user. The same thing is true for the ADF. A fault is detected when a less amount of toner is left, no tray is set, and no paper is present. These faults can be removed by merely supplying toner and toner, and setting a tray. When papers are used up in a tray, setting of another tray can recover the machine from the faulty state. When toner of a certain color is used up, designation of toner of another color can recover the faulty machine. Thus, since the F/F selection can make the recovery of the faulty machine, the recovery work is shared by the SYS node.

(4) Fault Detected and Cured by MCB Node

When the developing unit is abnormal, the toner supply is abnormal, the motor clutch is abnormal, or the fuser is abnormal, the MCB node detects such a fault and the UI displays a faulty location and a message "Call a serviceman". When a jamming occurs, the same displays a location of jamming and the way to clear jamming. In this way, the machine recovery work is put into the hands of users.

As described above, in the fault recovery state, the control right and the UI master right are possessed by the SYS node or the MCB node depending on faulty locations and the recovery methods used.

When after the fault recovery, the MCB node issues an IOT stand-by command, control goes to the job recovery state and executes the remaining jobs. Let us consider a situation that the number of copies is set at 3, and a jamming occurs during the copying operation of the second copy. In this case, after the jamming is cleared, the remaining two copies must be made. Accordingly, the SYS node and the MCB node execute their processings, to recover the job. Also in the job recovery state, the control right is possessed by the SYS node or the MCB node depending on their sharing of processings, but the UI master right is possessed by the SYS node. The reason for this follows. To exercise the job recovery state, a display for job recovery must be made, such as "Push a start key" and "Set the remaining document". Such a display processing belongs to the per original layer or the job programming layer that are under control of the SYS node.

Also when an IOT stand-by command is issued in the progress state, the job recovery state is exercised. When the job execution end is confirmed, control goes to the stand-by state, and waits for the next job.

In the stand-by state, control is allowed to proceed to the diagnostic (referred simply to as a diag.) state by a pregiven key operation.

Figure 9:
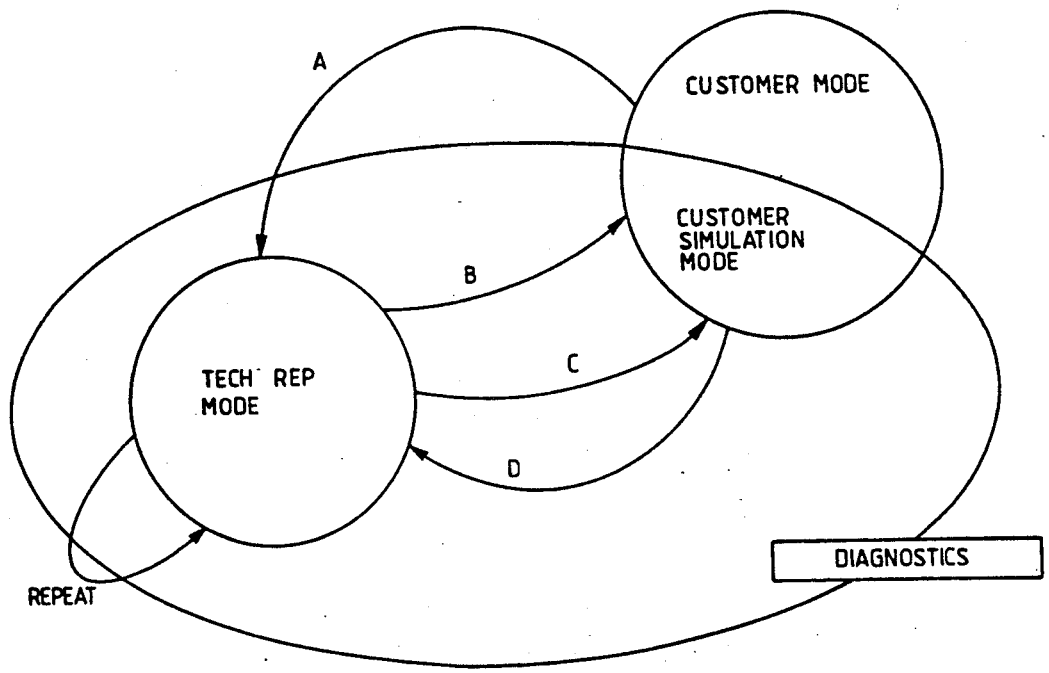
FIG. 9 is a diagram showing an outline of a diagnostic process.

The diag. state consists of the self test processings such as for input/output check of parts, setting of various parameters, setting of various modes, and initializing the NVM (nonvolatile memory). The schematic illustration of the diag. state is given in FIG. 9. As seen from the figure, two modes are used, a TECH REP mode and a customer simulation mode.

The TECH REP mode is used for the machine diagnosis by a serviceman, such as input and output checks. The customer simulation mode operates a customer mode used for the copying operation by customers in the diag. state. Let us assume now that control proceeds from the stand-by state of the customer mode the TECH REP mode by way of a route A. When controls makes only various checks and parameter settings in the TECH REP mode and returns to the customer mode (by way of a route B), a mere operation of a pregiven key allows control to go to the power-on state (FIG. 6) and to return to the stand-by state through the sequence of FIG. 7. Remember that the copying machine of the present invention makes the color copy and is provided with various edit functions. Therefore, after various parameters are set in the TECH REP mode, check must be needed as to whether or not desired colors are produced and whether the edit functions are normal or not by actually making the copy. It is the customer simulation mode that executes the above checks. The customer simulation mode is different from the customer mode in that no billing is made and the UI displays the diag. state being exercised. This is the meaning of used of the customer simulation mode that is the customer mode used in the diag. state. The shift of control from the TECH REP mode to the customer simulation mode (via a route C) and the reverse shift of control from the customer simulation mode to the TECH REP mode (via a route D) may be made by pregiven operations. The TECH REP mode progresses under control of the diag. executive module 88 (FIG. 4). In this case, accordingly, the MCB node has both the control right and the MCB master right. In the customer simulation mode, the actual copying operation is performed under control of the diag. module 83 (FIG. 4). In this case, the SYS node has both the control right and the US master right.

(II—1) System Configuration

Figure 10:
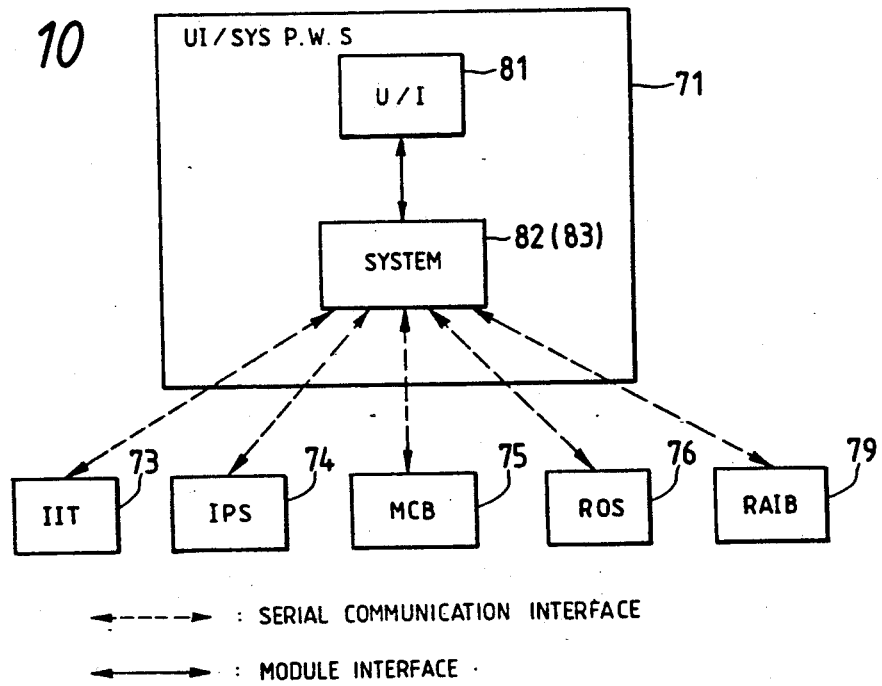
FIG. 10 is a diagram showing relationships of the system and remotes.

FIG. 10 shows relationships between a system and other remotes.

As described, the SYS remote 71 uses the SYSUI module 81 and the SYSTEM module 82. Data is transferred between these modules 81 and 82 through a module interface. A serial communication interface interposed between the SYSTEM module 82, and the IIT 73 and and IPS 74. An LNET communication network couples the SYSTEM module 82 with the MCB 75, ROS 76 and RAIB 79.

A module configuration of the system will be described.

Figure 11:
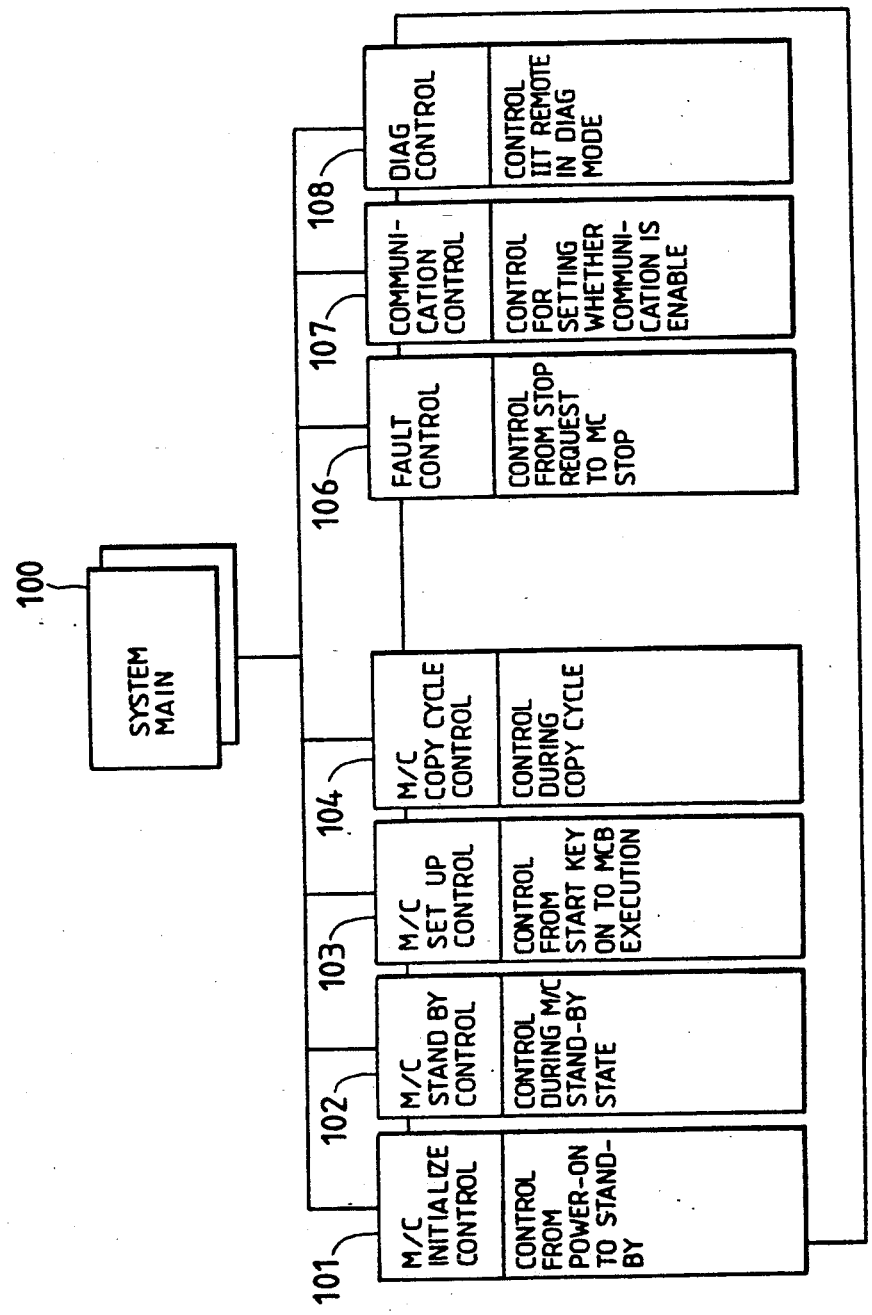
FIG. 11 is a diagram showing a module configuration of the system.

FIG. 11 shows a module configuration of the system. In the color copying machine of the present invention, the modules such as IIT, IPS and IOT function like passive parts, and the modules in the system for controlling the above modules function like active parts with intellect. The copying machine employs the decentralised CPU system. The per original layer and the job programming layer are shared by the system. The system has the control right to control the initialize state, stand-by state, set-up state, and cycle state, and the UI master right for using the UI in the above states. Accordingly, the modules corresponding to them make up the system.

A system main 100 fetches the data received from the SYSUI, MCB, and the like into the internal buffer, clears the data in the internal buffer, calls the respective lower order modules in the system main 100 and transfers the job to them, thereby to execute the updating processings.

An M/C initialize control module 101 controls an initialize sequence from the power-on to the setting up the stand-by mode. This is driven when the power-on state for executing various types of tests after the power-on by the MCB.

An M/C set-up control module 103 controls a set-up sequence from the pushing the start key till the MCB for executing the copy layer is driven. Specifically, it forms job modes using FEATURE (directions given to the M/C in order to reply the request by a user) that is specified by the SYSUI, and determines a set-up sequence in accordance with the job modes.

Figure 12A:
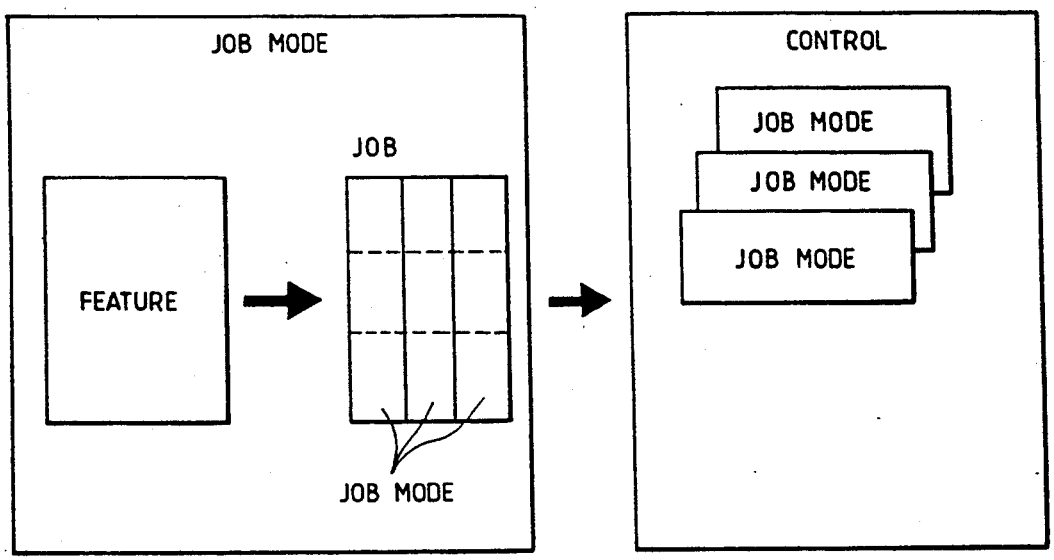
FIGS. 12(a) to 12(c) show explanatory diagrams showing how to prepare a job mode.
Figure 12B:
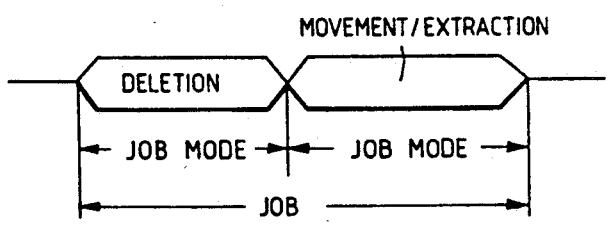
Figure 12C:
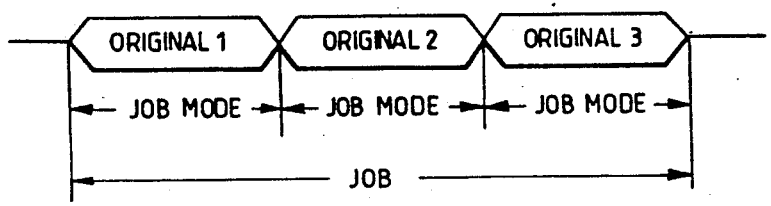

As shown in FIG. 12(a), for forming the job modes, a mode as indicated by the F/F is analyzed and divided into job modes. Here, the job means the M/C operation from the start of it till the copies are all delivered as requested, and it stops. The job mode is the unit of the smallest job into which the job is allowed to be divided. The job is a colligation of the job modes. For example, in the case of an inlay composition, the job modes are a deletion and a movement/extraction as shown in FIG. 12(b). These modes constitute a job. In the case of three ADF originals, job modes are feed processings of originals 1, 2 and 3, as shown in FIG. 12(c). These job modes are collegated into a job.

In an automatic mode, a document scan is done. In a coloring-outline-drawing mode, a prescan is done. In a marker edit mode, a prescan is done. In a color detection mode, a sample scan is done (a maximum of three prescans is allowed). A copy mode required for the copy cycle is assigned to the IIT, IPS and MCB. At the end of the set-up sequence, the MCB is driven.

An M/C stand-by control module 102 controls a sequence during the M/C stand-by state, more exactly controls reception of the start key and color registration, and enters the diag. mode.

An M/C copy cycle control module 104 controls a copy sequence from the start of the MCB to the stop. Specifically, it provides information of a paper feed count, recognizes the end of a job and requests the start of the IIT. Further, it recognizes the stop of the MCB and requests the stop of the IPS.

Additionally, the module 104 sends a through command that is generated during the M/C stop or the M/C operation, to a destination remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example. A communication control module 107 sets the IIT ready signal from the IIT and whether the communication is enable/disale in the image area.

A diag. control module 108 controls in the input check mode and the output check mode that are contained in the diag. mode.

Description to follow is the data transfer among the modules or between the modules and other subsystems.

Figure 13:
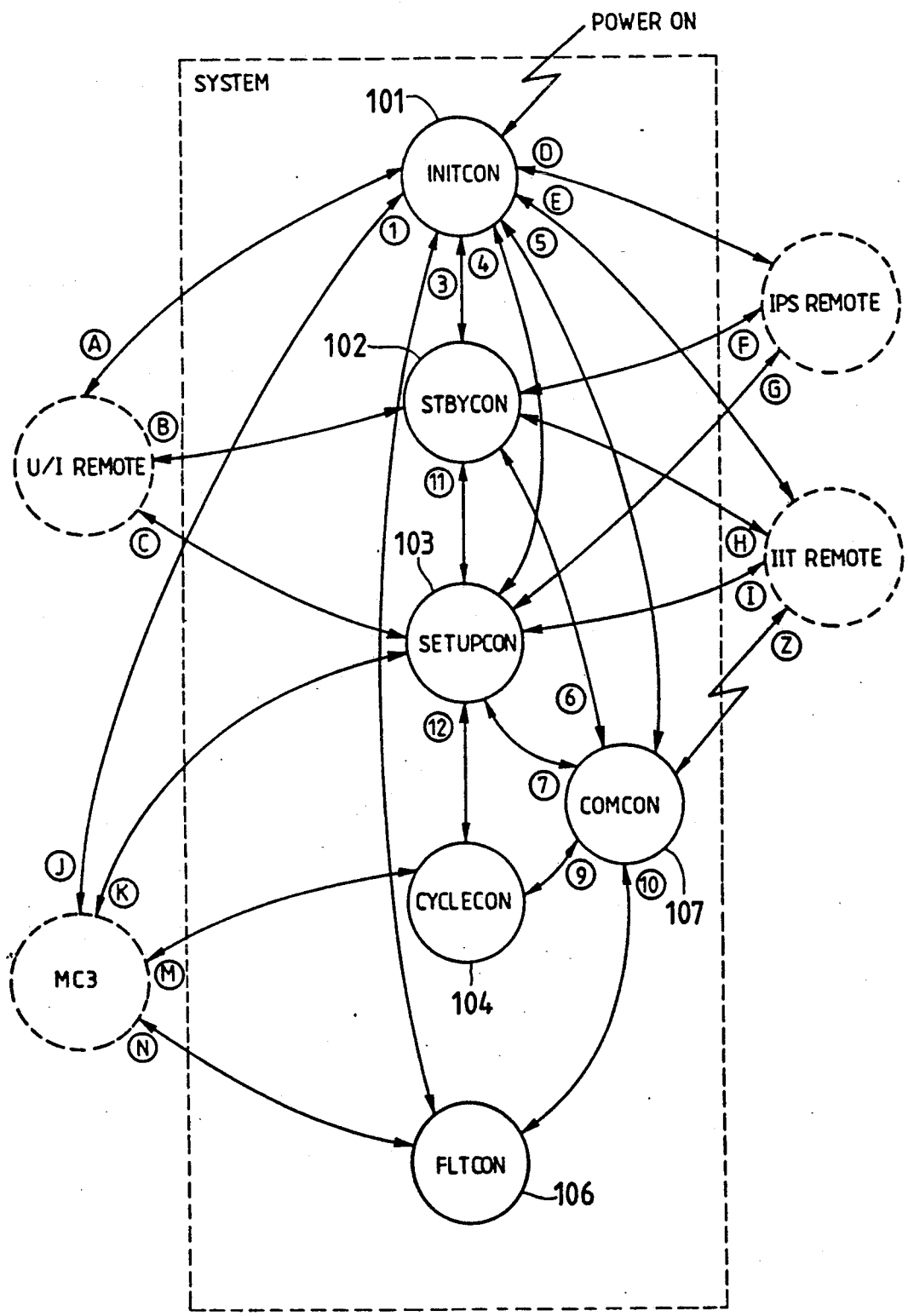
FIG. 13 shows a data flow between the system and the respective remotes and a data flow among modules in the system.

FIG. 13 illustrates data flows between the system and the remotes, and data flows among the modules in the system. In the figure, A to N indicate serial communications, Z a hot line, and (1) to (12) data flow among the modules.

In the communication between the SYSUI remote and the initialize control module 101, the SYSUI sends a token command indicative of transfer the control right for the CRT, to the SYSTEM node. The initialize control module sends a config. command to it.

In the communication between the SYSUI remote and the stand-by control module 102, the SYSUI remote sends to the stand-by control module a mode change command, start copy command, job cancel command, color registration request command, and tray command. The stand-by control module 102 sends to the SYSUI remote an M/C status command, tray status command, toner status command, toner collection bottle command, color registration ans. command, and token command.

In the communication between the SYSUI remote and the set-up control module 103, the set-up control module 103 sends an M/C status command (progress) and APMS status command. The SYSUI remote sends a stop request command and an interrupt command.

In the communication between the IPS remote and the initialize control module 101, the IPS remote sends an initialize command to the control module 101. The control module 101 sends an NVM parameter command to the IPS remote.

In the communication between the IIT remote and the initialize control module 101, the IIT remote sends an IIT ready command to the module 101. The module 101 sends an NVM parameter command and an initialize command to the IIT remote.

In the communication between the IPS remote and the stand-by control module 102, the commands sent by the IPS remote to the control module 102 are an initialize free hand area command, answer command, remove area answer command, and color data command. the commands sent by the module 102 to the IPS remote are a color detect point command, initialize free hand area command, and a remove area command.

In the communication between the IPS remote and the set-up control module 103, the commands sent by the IPS remote to the control module 103 are an IPS ready command and a document information command. The commands sent by the set-up control module 103 to the IPS module are a scan information command, basic copy mode command, edit mode command and M/C stop command.

In the communication between the IIT remote and the stand-by control module 102, the IIT remote sends an IIT ready command indicative of the prescan end to the control module 102. The control module 102 sends to the IIT remote a sample scan start command and an initialize command.

In the communication between the IIT remote and the set-up control module 103, the IIT sends an IIT ready command and an initialize end command to the control module 103. The control module 103 sends a document scan start command, sample scan command, and copy scan start command to the IIT remote.

In the communication between the MBC remote and the stand-by control module 102, the stand-by control module 102 sends an initialize subsystem command and a stand-by selection command to the MBC remote. The MBC remote sends a subsystem status command to the stand-by control module.

In the communication between the MBC remote and the set-up control module 103, the module 103 sends a start job command, IIT ready command, stop job command, and declare system fault command to the MBC remote. The MBC remote sends an IOT stand-by command and a declare MCB fault command to the module.

In the communication between the MBC remote and the cycle control module 104, the module 104 sends a stop job command to the MBC remote. The MBC remote sends a made command, ready for next job command, job delivered command, and IOT stand-by command to the control module.

In the communication between the MBC remote and the fault control module 106, the control module 106 sends a declare system fault command and a system down end command to the MBC remote. The MBC remote sends a declare MCB fault command and a system shut-down command to the control module 106.

In the communication between the IIT remote and the communication control module 107, the IIT remote sends a scan ready signal and an image area signal to the control module 107.

The interfaces among the respective modules will be described below.

The system main 100 sends a reception remote Nos. and reception data to the respective modules (101 to 107). Upon receipt of them, each module transfers data to and from its remote. On the other hand, the respective modules sends nothing to the system main 100.

The initialize control module 101, when completing the initialize processing, sends a system state (stand-by) to the fault control module 106 and the stand-by control module 102.

The communication control module 107 sends communication yes/no data to the initialize control module 101, stand-by control module 102, set-up control module 103, copy cycle control module 104, copy cycle control module 104, and fault control module 106.

The stand-by control module 102 sends a system state (progress) to the set-up control module 103, when the start key is depressed.

The set-up control section 103, when the set-up is completed, sends a system state (cycle) to t copy cycle control module 104.

(II—2) Image Processing System (IPS)

(A) IPS modules

Figure 14:
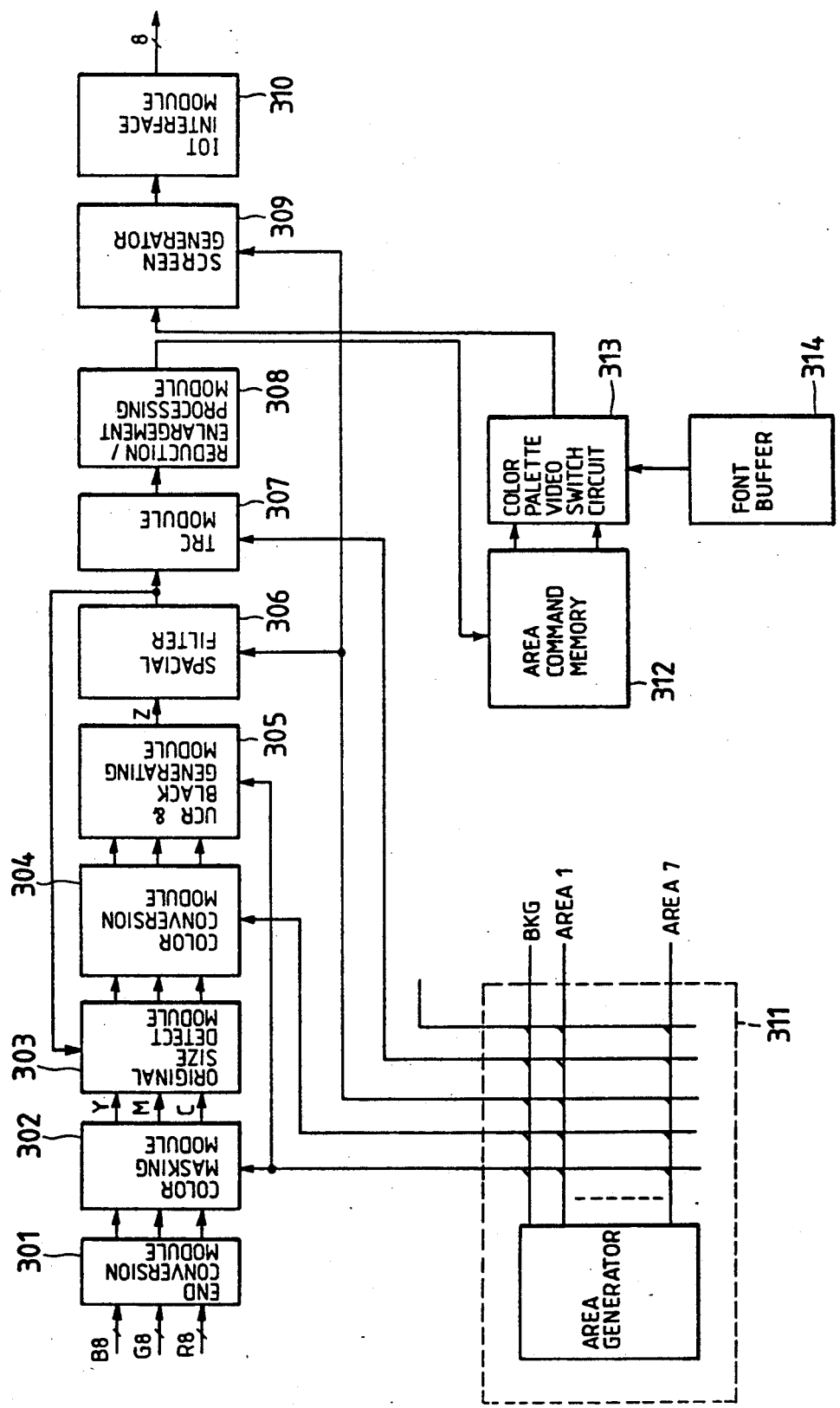
FIG. 14 shows a module configuration of the IPS.

FIG. 14 shows an arrangement of IPS modules in the image processing system (IPS).

In the color image recording apparatus, the IIT (image input terminal) reads a color image on an original in the form of primary three light colors B (blue), G (green) and R (red) by using the CCD image sensor, and converts these signals signals of toner primary colors of Y (yellow), M (magenta), C (cyan), and K (black or tusche), and the IOT (image output terminal) performs the exposure by the laser beam and development to reproduce the original color image. In this case, the four separated toner images of Y, M, C and K are used. A copy process (pitch) is performed one time using the process color of Y. Subsequently, the copy processes will be performed for the remaining process colors M, C and K. A total of four copy cycles are executed.

These four images consisting of mesh points are superposed to reproduce a single color image of the full color. Accordingly, when the separated color signals of B, G and R are converted into toner signals of Y, M, C and K, a designer encounters the problems how to adjust the color balance, how to reproduce colors in accordance with the read characteristic of the IIT and the output characteristic of the IOT, how to adjust the balance of density and contrast, and how to adjust the emphasis and blur of the edge, and how to adjust Moire.

The IPS receives the separated color signals of B, G and R, applies various data processings to these signals for improving the reproducibility of colors, tone, and definition, and converts the toner signals of the developing process colors into on/off signals, and outputs them to the IOT. As shown in FIG. 14, the IPS is made up of an END (equivalent neutral density) conversion module 301, color masking module 302, original size detect module 303, color conversion module 304, UCR (under color removal)/black generating module 305, spatial filter 306, TRC (tone reproduction control) module 307, reduction/enlargement processing module 308, screen generator 309, IOT interface module 310, area image control module 311 including an area generator and a switch matrix, and edit control module including an area command memory 312, color palette video switch circuit 313, and font buffer 314.

In the IPS, the 8-bit data (256 gray levels) on each of the separated color signals B, G and R is applied to the END conversion module 301. The module 301 converts the data into the toner signals of Y, M, C and K. A process color toner signal X is selected, and is digitized. The digitized signals are transferred, as the on/off data of the process color toner signals, from the IOT interface module 310 to the IOT. Accordingly, in the case of the full color (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. A total of four copy cycles are repeated.

In the IIT, the color components of R, G and B of the image are read by using the CCD sensor, with the size of one pixel of 16 dots/mm. The IIT outputs the read signals as the data of 24 bits (3 colors×8 bits; 256 gray levels). B, G and R filters are laid on the upper surface of the CCD sensor with the density of 16 dots/mm and whose total length is 300 mm. The CCD sensor makes scan of 16 lines/mm at the process speed of 190.5 mm/sec. Accordingly, the sensor produces the read data at the rate of about 15 M pixels/sec for each color. The IIT log converts the analog data of B G and R pixels to obtain the density data from the reflectivity data, and then digitizes the density data.

The respective modules will be described in detail.

Figure 15A:
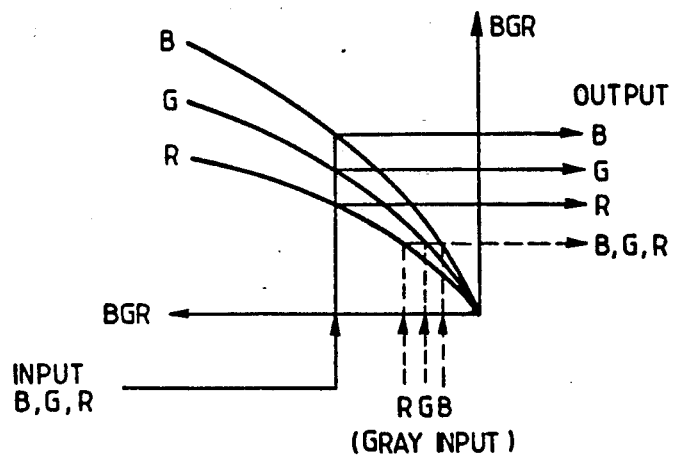
FIGS. 15(a) to 15(q) are diagrams showing the respective modules constituting the IPS.
Figure 15B:
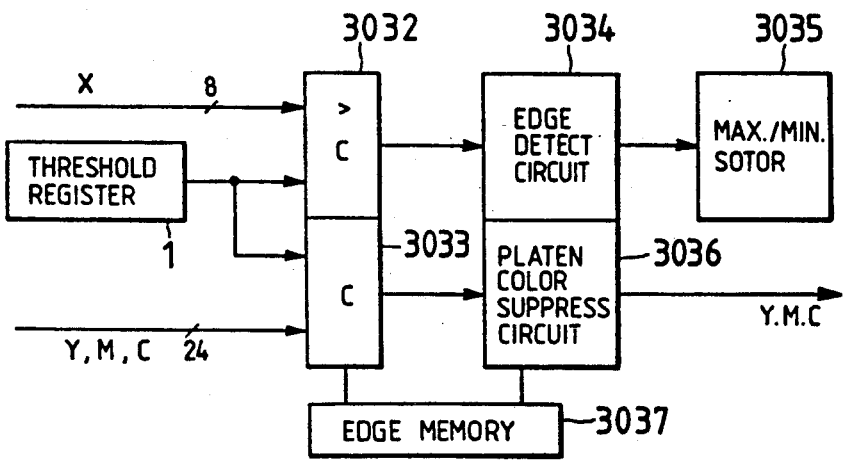
Figure 15C:
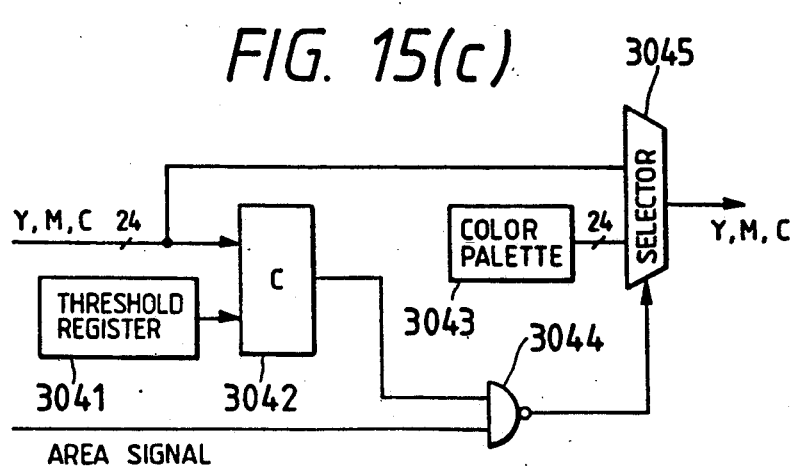
Figure 15D:
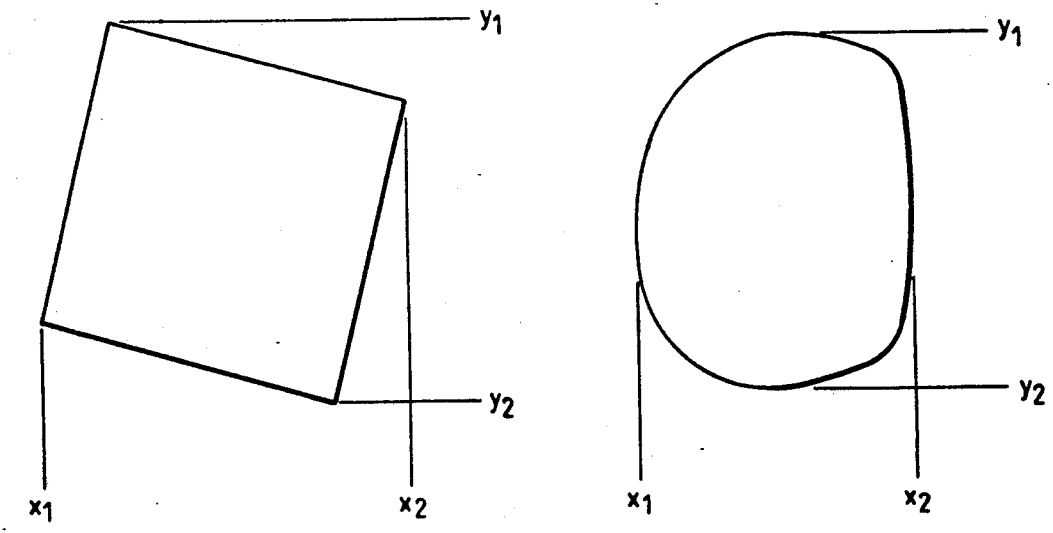
Figure 15E:
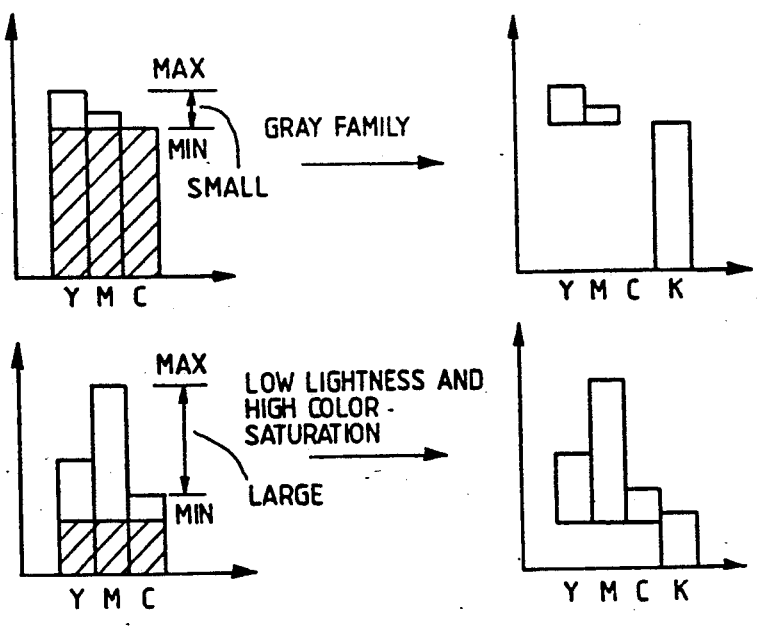
Figure 15F:
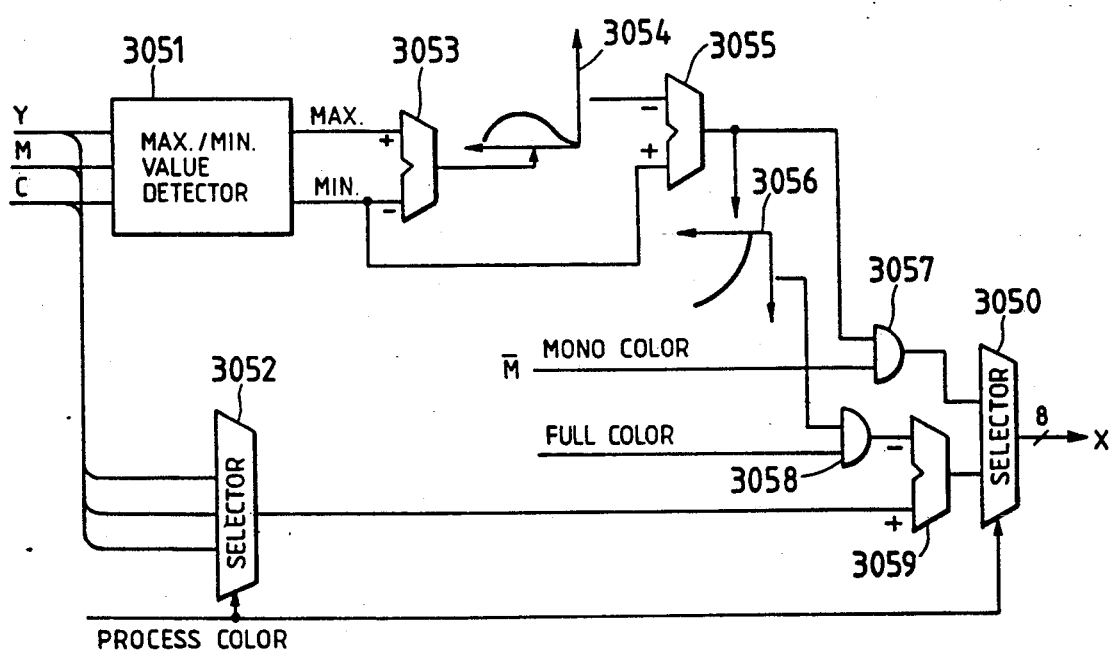
Figure 15G:
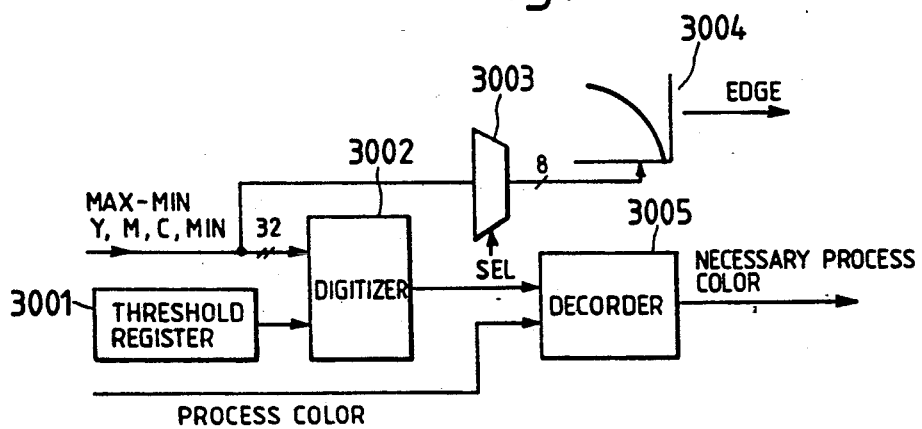
Figure 15H:
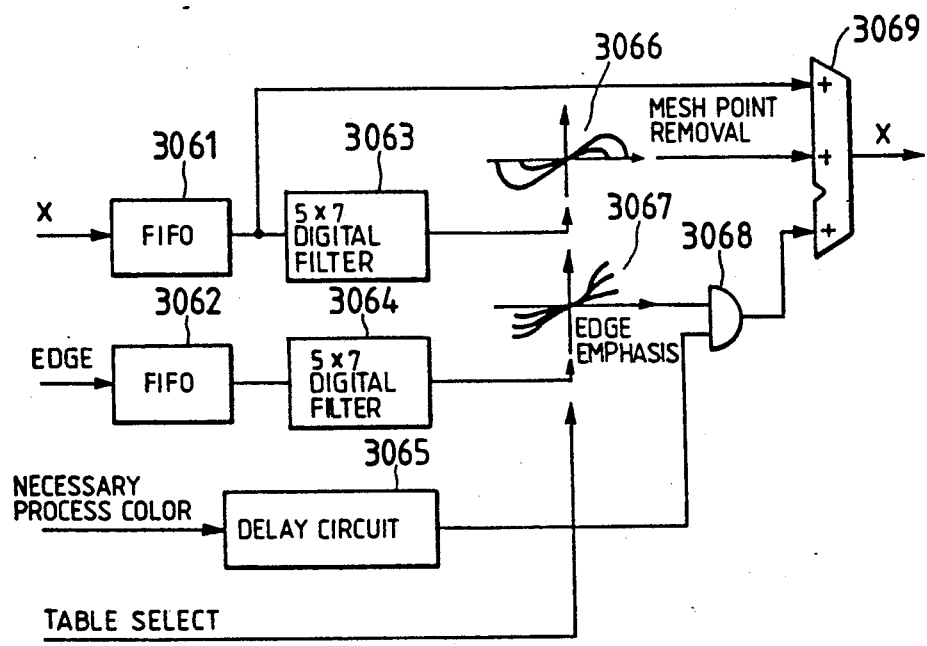
Figure 15J:
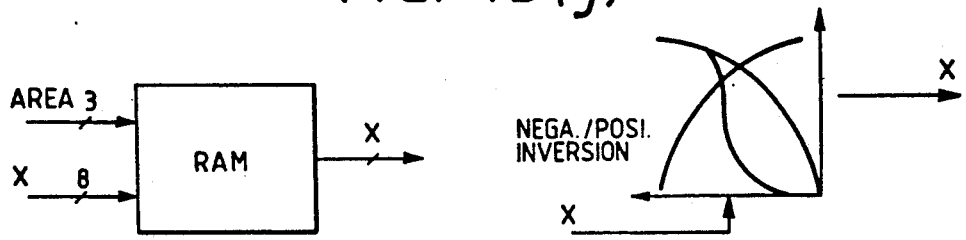
Figure 15K:
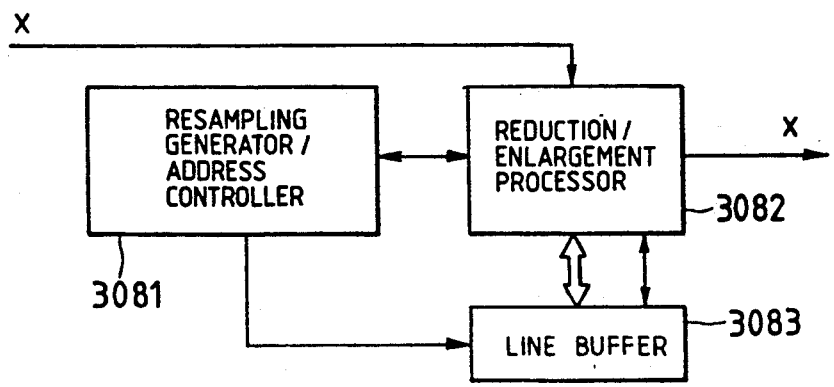
Figure 15I:
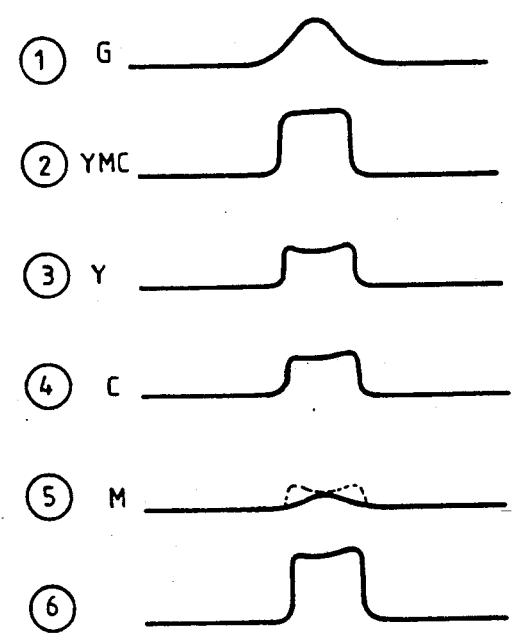
Figure 15L:
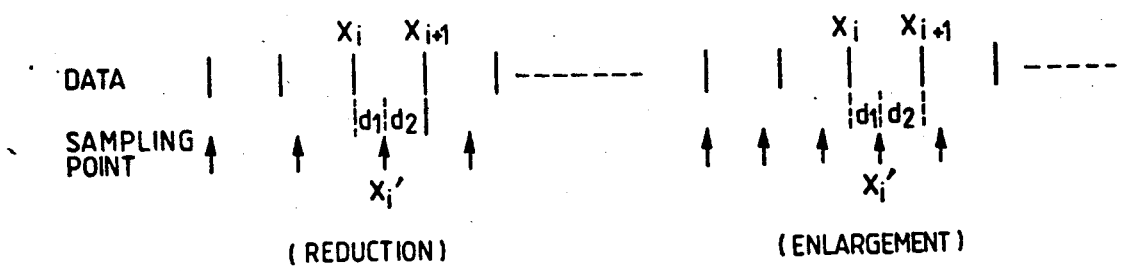
Figure 15M:
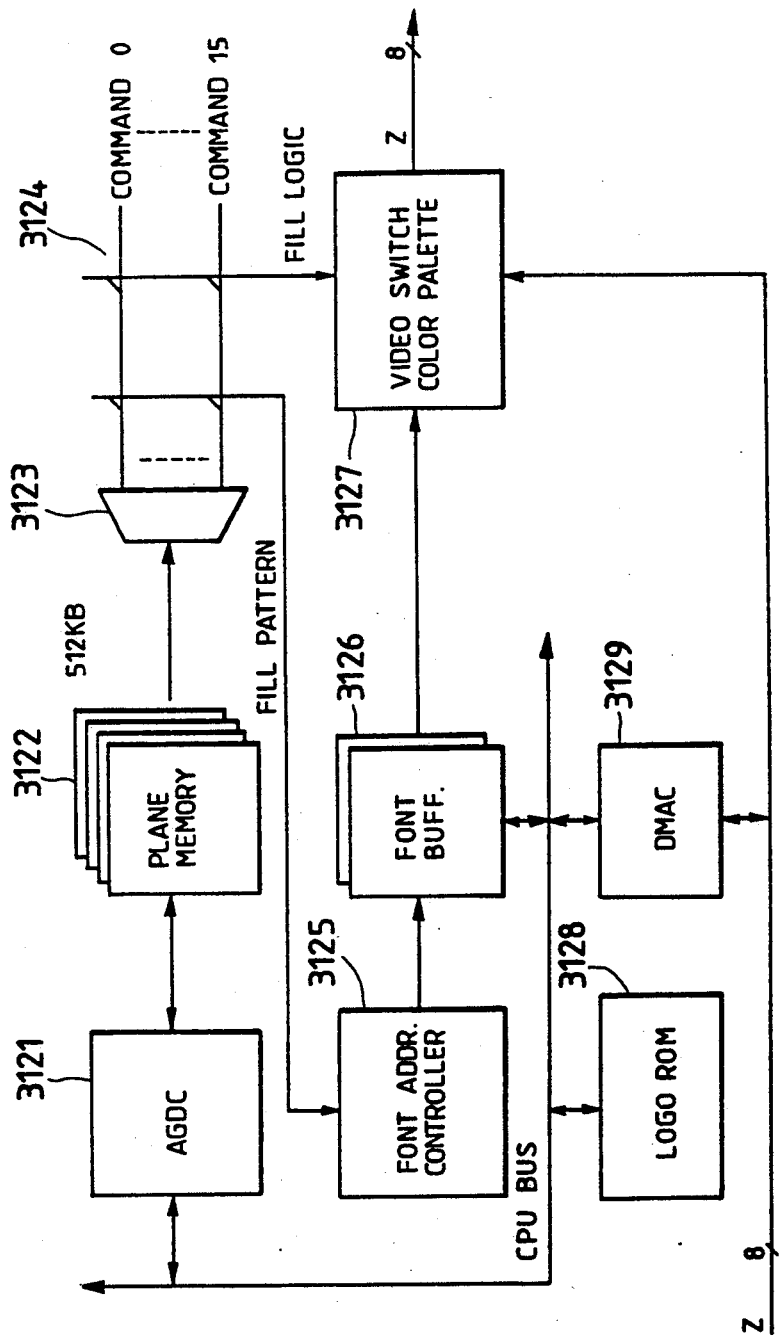
Figure 15N:
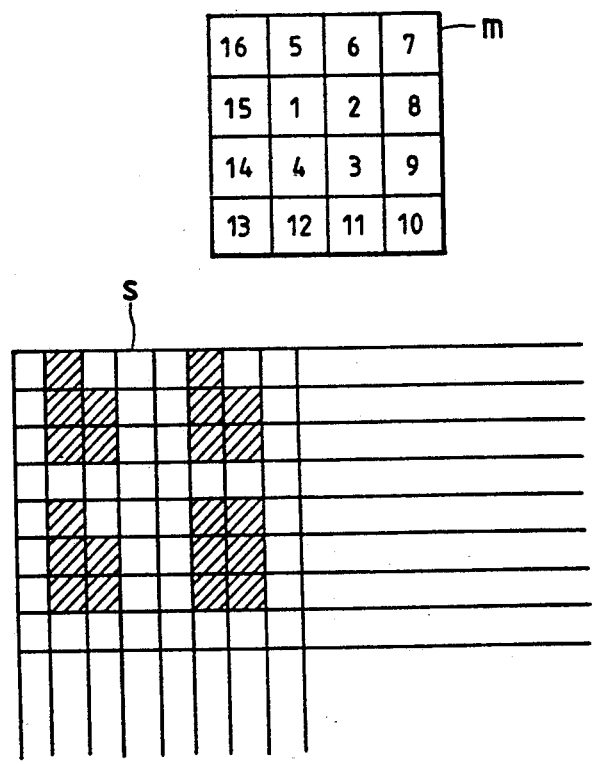
Figure 15O:
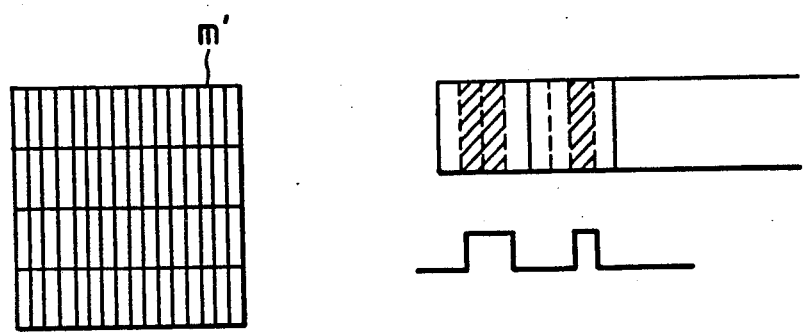
Figure 15P:
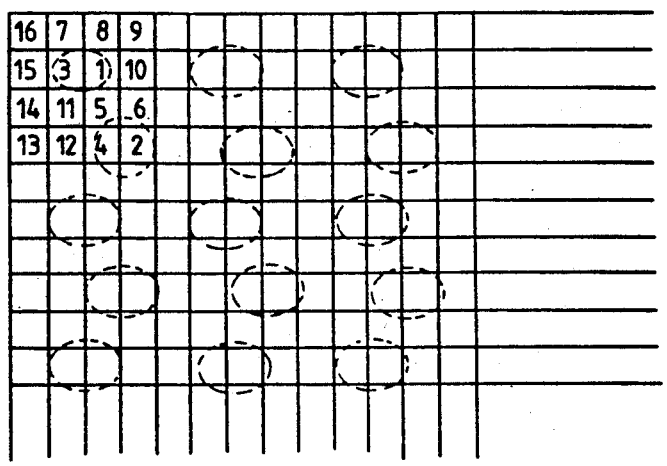
Figure 15Q:
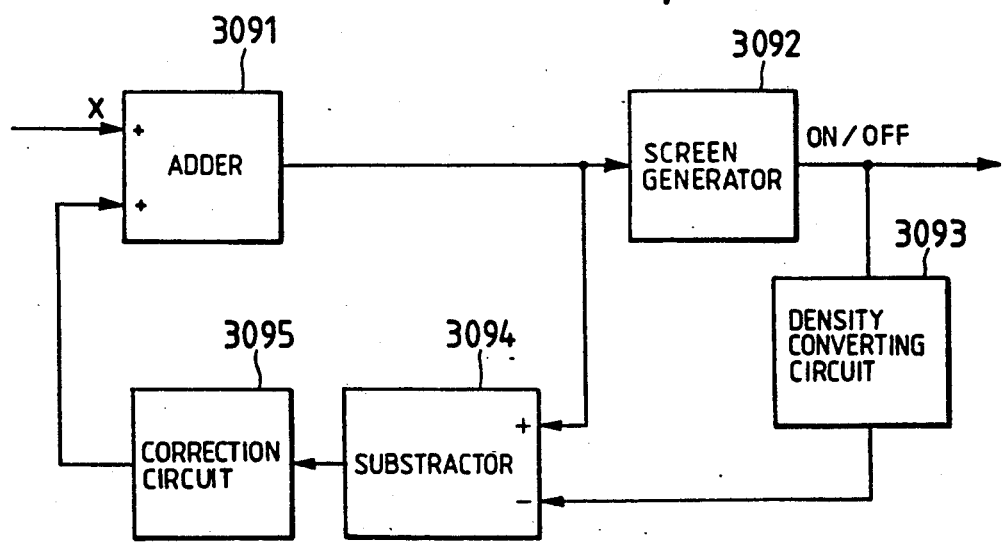

FIGS. 15(a) to 15(q) are explanatory diagrams for explaining the respective modules of the IPS.

(a) END conversion module

The END conversion module 301 adjusts (converts) the optically read signal of the color original obtained by the IIT into a gray balanced color signal. The toners of the color image are equal to one another when the color is gray. The toner amount of gray is used as a reference toner amount. However, the separated color signals of B, G and R produced from the IIT when it reads the gray document, are not equal in value, because the spectral characteristics of the light source and the color separation filter are not ideal. These imbalanced color signals are balanced by using a converting table (LUT: look up table) as shown in FIG. 15(a). This balancing work by the LUT is the END conversion. When a gray original is read, the LUT converts the B, G and R color separated signals into those signals at the equal gradation in accordance with a level (black→white) of the read gray. The LUT depends on the characteristics of the IIT. 16 LUTs are used. Of those LUTs, 16 tables are for the film projectors including negative films. 3 tables are for copy, photograph, and generation copy.

(b) Color Masking Module

The color masking module 302 converts the B, G and R color signals into signals indicative of toner amounts of Y, M and C, respectively, through a matrix operation. This conversion is applied to the signals after these are subjected to the gray balance adjustment by the END conversion.

In this instance, the conversion matrix for the color masking is a 3×3 matrix exclusively used for converting the B, G and R into Y, M and C. A matrix capable of dealing with BG, GR, RB, $B^2$, $G^2$, and $R^2$, in addition to B, G and R may also be used. Any other suitable matrix may be used, if necessary. Two sets of matrices are used, one for an ordinary color adjustment and the other for emphasis signal generation in the mono color mode.

Thus, when the video signal from the IIT is processed by the IPS, the gray balance adjustment is first conducted. If it follows the color masking process, the gray balance adjustment using the gray original must be made allowing for the characteristics of the color masking. This makes the conversion table more intricate.

(c) Original Size Detection Module

Original to be copied contains not only the standard size document, but also patched up documents and others. To select paper of a proper size corresponding to the size of an original, it is necessary to detect the original size. In case that the paper size is larger than the original size, if the peripheral region of the original is masked, the resultant copy is excellent. For this reason, the original size detection module 303 detects the original size at the time of scanning and suppresses the platen color (edge suppress) at the time of scanning to read the original image. Accordingly, color, for example, black, that is clearly distinguished from the original is used for the platen color. The upper limit value and lower limit value for the platen color discrimination are set in a threshold register 3031, as shown in FIG. 15(b). At the time of prescan, the signal is converted (γ conversion) into a signal X representing the data approximate to the reflectivity of the original (by using the spatial filter 306 to be given in detail). The signal X is compared with the upper/lower limit value as is set in the register 3031, by a comparator 3032. An edge detect circuit 3034 detects the edge of the original, and stores the maximum and minimum values of X and Y in the coordinates into a max./min. sorter 3035.

As shown in FIG. 15(d), when the original is obliqued or its figure is not rectangular, the maximum values and the minimum values ($x_1$, $x_2$, $y_1$, $y_2$) at four points on the outline of the figure are detected and stored. At the time of scanning for reading the original, the comparator 3033 compares the Y, M and C of the original with the upper/lower limit values in the register 3031. A platen color suppress circuit 3036 suppresses the pictorial information outside the edge, viz., the read signal of the platen, to effect the edge suppressing processing.

(d) Color Change Module

The color change module 305 set up a condition that a designated color in a specific area on an original is erasable. As shown in FIG. 15(c), this module is made up of a window comparator 3042, threshold register 3041, and color palette 3043. To effect color change, the upper/lower limit values of Y, M and C of the colors to be changed are set in the threshold register 3041. The upper/lower limit values of Y, M and C of the converted colors are set in the color palette 3043. According to an area signal applied from the area image control module, the NAND gate 3044 is controlled. When it is not a color change area, the color signals of Y, M and C of the original are transferred from a selector 3045, as intact. When the color change area is reached, and the color signals of Y, M and C of the original are between the upper limit values and the lower limit values as set in the threshold register 3041, the selector 3045 is switched by the output signal of the window comparator 3042 and it sends the converted color signals of Y, M and C that are set in the color palette 3043.

As for the designated color, by directly pointing an original by a digitizer, 25 pixels of B, G and R in the vicinity of the coordinates as designated at the time of prescan are averaged and the designated color is recognized on the basis of the average. By the averaging operation, even in the case of the 150 lines original, the designated color can be recognized with the precision within 5 of color difference. To the B, G and R density data, the designated coordinates are converted into an address and the density data are read out of the IIT shading correction circuit, with that address. In the address conversion, readjustment corresponding to the registration adjustment is needed, as in the case of the original size detection. In the prescan, the IIT operates in the sample scan mode. The B, G and R density data read out of the shading RAM are subjected to a shading correction by a software, and averaged. Further, the data are subjected to the END correction and the color masking, and then are set in the window comparator 3042. The registered colors are selected from 1670 colors, and up to eight colors can be simultaneously registered. The reference color prepared include a total of 14 colors, Y, M, C, G, B and R, colors between these colors, and K and W.

(e) UCR/Black Generation Module

When the color signals of Y, M and C, if these have equal quantities, are combined, gray is produced. Theoretically, the same color can be obtained by replacing the colors of Y, M and C of equal quantities with black. In this case, however, the color is impure and hence the reproduced color is not fresh. To cope with this problem, the UCR/black generation module 305 generates a proper amount of K to prevent such a color impurity, and equally reduces the toner colors Y, M and C in accordance with the amount of the generated K (this process is called an under color removal (UCR)). More specifically, the maximum and the minimum values of the toner colors Y, M and C are detected. A K is generated by a conversion table in accordance with the difference between the maximum value and the minimum value. Further, the toner colors Y, M and C are UCR processed in accordance with the generated K.

As shown in FIG. 15(e), in the case of color closer to gray, the difference between the maximum and the minimum values is small. Accordingly, the minimum value or its near value of each color Y, M and C is removed for generating the color K. When the difference is large, the removal quantities of the colors Y, M and C are set below the minimum values of them, thereby to reduce the quantity of the generated K. In this way, the mixing of tusche into the pure color and the saturation degradation of a low lightness, high saturation color can be prevented.

In FIG. 15(f) showing a specific circuit arrangement of the UCR/black generation module, a max./min. value detector 3051 detects the maximum and the minimum values of the process colors Y, M and C. A calculating circuit 3053 calculates the difference between the maximum and the minimum values of each color. A conversion table 3054 and another calaculating circuit 3055 cooperate to generate the black K. The conversion table 3054 adjusts the value of K. When the difference the maximum and the minimum values is small, the output signal of the conversion table is zero. Accordingly, the calculating circuit 3055 produces the minimum value as intact in the form of the value of K. When the difference is large, the output value of the conversion table 3054 is not zero, the calculating circuit 3055 subtracts the difference from the minimum value and produces the result of the subtraction as the value of K. A conversion table 3056 provides the values to be removed from the colors Y, M and C in accordance with the K value. In cooperation with the conversion table 3056, an additional calculating circuit 3059 subtracts the values as defined by the k value from the process colors Y, M and C. AND gates 3057 and 3058 operate for the signal K, and the signals of Y, M and C after UCR processed in accordance with the signals in the mono color mode and the full color mode. The selector 3052 and 3050 are used for selecting any of the toner signals Y, M, C and K by the process color signals. A color is thus reproduced by the mesh points of Y, M, and C are used. Accordingly, the curves and tables that are empirically formed are used for the removal of Y, M and C and for determining the generation ratio of K.

(f) Spatial Filter Module

In the color image recording apparatus incorporating the present invention, the IIT reads an image of an original while the original image being scanned by the CCD. When the data is used as intact, the resultant data is faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and the Moire phenomenon. For the Moire removal, a low-pass filter and for edge emphasis, a high-pass filter is used.

In the spatial filter module 306, as shown in FIG. 15(g), a selector 3003 selects one of the input signals Y, M, Min and Max-Min. A conversion table 3004 converts it into a data signals approximately indicative of the reflectivity. Use of this type of data makes it easy to pick up the edge data. In this instance, the selected color signal is Y. A threshold register 3001, 40 bit digitizer 3002, and decoder 3005 separates the color signals Y, M, C, Min, and Max-Min into eight colors, Y, M, C, K, B, G, R, and W (white), for each pixel. A decoder 3005 recognizes the hue in accordance with the digitized data signal, and produces a 1-bit data indicative of necessary processor color or not.

The output signal of the circuit of FIG. 15(g) is applied to a circuit of FIG. 15(h). In the circuit, an FIFO 3061, 5×7 digital filter 3063, and modulation table 3066 cooperates to generate the mesh-point removal data. An FIFO 3062, 5×7 digital filter 3064, modulation table 3067, and delay circuit 3065 cooperate to generate edge emphasis data by using the output data of the output circuit of FIG. 15(g). The modulation tables 3066 and 3067 are selectively used in accordance with a copy mode used, such as a photograph copy, character only copy, and photo/character copy.

In respect with the edge emphasis, when a green character as shown in FIG. 15(i) (1) is reproduced in the form of a character (2), the colors Y and C are emphasized at the edges as indicated by waveforms (3) and (4), but the color M is not emphasized as indicated by a solid line of a waveform (5). The switching for this is carried out by the AND gate 3068. In this case, if the waveform (5) of M is emphasized as indicated by a broken line, M is emphasized at the edges as shown in a waveform (6) and accordingly the color purity is lost. To switch the emphasis by the AND gate 3068 for each process color, the delay circuit 3065 synchronizes the FIFO 3062 with the 5×7 digital filter 3064. When a fresh green character is reproduced by using the conventional image processing, the magenta M is emphatically mixed into the green character and the color purity is lost. To solve this, the spatial filter module, when recognizing green, outputs the colors Y and C in an ordinary manner, but outputs the magenta M being not edge emphasized.

(g) TRC Conversion Module

The IOT exercises the copy cycles four times using process colors of Y, M, C and K in accordance with an on/off signal derived from the IPS (in the case of the fully color copy). With this, reproduction of a full color original is realized. Actually, however, to exactly reproduce the colors theoretically obtained through the signal processing, delicate and careful adjustment is required taking the characteristics of the IOT into consideration. The TRC conversion module is used for improve the color reproduction. An address conversion table containing various combinations of Y, M and C which is accessed with 8-bit image data is stored in the RAM, as shown in FIG. 15(j). With use of such a table, the following various functions, such as density adjustment, contrast adjustment, nega./posi. inversion, color balance adjustment, character mode, and transparent composition, may be exercised in accordance with an area signal. The bits 0 to 3 of the area signal are assigned to the upper three bits of the RAM address, respectively. IN an out-of-area mode, the above functions may be appropriately combined. In this instance, the RAM has a memory capacity of 2 k bytes (256 bytes×8 planes), and eight conversion tables. During the IIT carriage return, a maximum of 8 conversion tables are stored every cycle of Y, M and C. These tables are selectively used in accordance with an area designation and a copy mode used. If the memory capacity of the RAM is increased, there is no need for storing the tables every cycle.

(h) Reduction/Enlargement Module

The reduction/enlargement module 308 exercises the reduction/enlargement processing by a reduction/enlargement processor 3082 during a period that data X is temporarily stored in a line buffer 3083 and then is transferred therefrom, as shown in FIG. 15(k). A resampling generator/address controller 3081 generates a sampling pitch signal and a read/write address for the line buffer 3083. The line buffer 3083 serves as a ping-pong buffer of two lines in which line data is rad out of one of one of the lines, while at the same time the next line data is written into the other line. The reduction-/enlargement processing in the main scan direction is digitally processed by the reduction/enlargement module 308. For the reduction/enlargement in the vertical scan direction, the scan speed of the IIT is appropriately varied. The scan speed is varied in the range from 2 times to ¼ time, to vary the magnification from 50% to 400%. In the digital processing, when the data is transferred to and from the line buffer 3083, the reduction is based on a thin-out interpolation, while the enlargement is based on an additional interpolation. When the data lies between the adjacent sampling points, the interpolation data is obtained by weighting the in-between data in accordance with the distances of that data to the data located on both sides, as shown in FIG. 15(l). If the data is $X_i'$, for example, the following calculation $$(X_i \times d_2) + (X_{i+1} \times d_1)$$

where $d_1 + d_2 = 1$, and $d_1$ and $d_2$ are distances from a sampling point to the data $X_i$ and $X_{i+1}$ on both sides of the data $X_i'$.

In the reduction processing, data is loaded into the line buffer 3083 while interpolating the data. At the same time, the reduced data in the previous line is read out of the buffer, and sent to the succeeding stage. In the enlargement processing, the data is loaded into and temporarily stored in the line buffer, while the data is interpolated for enlargement while reading the previous line data out of the line buffer. When the interpolation for enlargement is conducted at the time of writing, a clock frequency must be increased in accordance with a magnification. Such an enlargement process, however, allows the same clock to be used for both the read and write operations. Further, the shift image processing in the main scan direction is possible by reading data at a mid point between one read timing and the next read timing or by delaying the read timing. The repetitive processing is possible by repeatedly reading data. The mirror image processing is also possible when data is read out in the reverse direction.

(i) Screen Generator

A screen generator 309 converts a gradation toner signal of each process color into an on/off or binary toner signal. In the screen generator, the digitizing processing and the error diffusion processing are conducted by comparing a threshold matrix with the gradated data. The IOT receives the binary toner signal, and turns on and off a laser beam to reproduce a halftone image. In this case, the laser beam is elliptically shaped in cross section with its geometry of about 80 $\mu m \phi$ long and about 60 $\mu m \phi$ wide. These figures are selected so as to satisfy the recording density of 16 dots/mm.

How to express a gradation will first be described. Description to follow is directed for forming halftone cells each of 4×4, for example, as shown in FIG. 15(n). To form the cells, the screen generator sets up a threshold matrix "m" corresponding to such a halftone cell. Then, it compares the matrix with the gradated data. If the value of data is "5", the screen generator generates signals that is turned on in the squares of the matrix "m" whose figures are less than "5".

The 4×4 halftone cell of 16 dots/mm is generally called a mesh point of 100 spi and 16 gradations. If an image is depicted by such mesh points, the image reproduction is poor. In the present invention, to increase the gradations, the 16 dots/mm pixel is further divided into four in the vertical direction (main scan direction). Accordingly, the laser beam is turned on and off at the ¼ unit distance, viz., at the 4-times frequency, as shown in FIG. 15(o). The gradation attained in four times that of the conventional gradation expressing method. To this end, a threshold matrix "m'" as shown in FIG. 15(o) is set up in the present invention. Further, if a submatrix method is used, the number of lines will effectively be increased.

The above instance uses the threshold matrices "m" of the type in which the center portion of each halftone cell is used as a sole growth nucleus. In the submatrix method, a pixel consists of a plurality of unit matrices. Each matrix has two growth nuclei or more, as shown in FIG. 15(p). If such a screen pattern design method is used, the number of lines and the gradation may be changed in accordance with bright or dark portions, in such a way that 141 psi and 64 gradations are used for bright portions, and 200 psi and 128 gradations, for dark portions. Such a pattern may be designed while visually judging smoothness in gradation, definition, graininess, and the like.

When the halftone image is reproduced by using the above dot matrix method, the gradation or gray level and the resolution contradictively coexist. For example, if the gray level is increased, the resolution becomes poor. On the other hand, if the resolution is increased, the gray level is decreased. If small threshold data matrices are used, the actually outputted image suffers from quantization error. The error diffusion processing is to improve the gradation reproducibility in such a manner that, as shown in FIG. 15(q), the quantization errors between the on/off or binary signal generated by a screen generator 3092 and the input gradation signal are detected by a density converting circuit 3093 and substractor 3094, and are fed back by using a correction circuit 3095 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone images and character images. In this way, the reproduction of images of high gradation and high definition is improved.

(j) Area Image Control Module

In the area image control module 311, seven rectangular areas and a priority order of them can be set in an area generator. Control data relating to the respective areas are set in a switch matrix. The control data includes data of color change and a color mode indicative of mono color or full color, modulation select data of photo graph, characters, and the like, select data of TRC, select data of the screen generator, and the like. The control data is used for controlling the color masking module 302, color conversion module 304, UCR module 305, spatial filter 306, and TRC module 307. The switch matrix may be set by software.

(k) Edit Control Module

The edit control module executes an outline-drawing processing in which an original bearing a circular figure, such as a circular graph, not a rectangular figure is read, and a specified area whose configuration is indefinite is painted with specified color. As shown in FIG. 15(m), a CPU bus is clustered with an AGDC (advanced graphic digital controller) 3121, font buffer 3126, logo ROM 3128, and DMAC (DMA controller) 3129. The CPU writes encoded 4-bit area command into a plane memory 3122 through the AGDC 3121, and font is loaded into the font buffer 3126. The plane memory 3126 consists of four memory planes. Each point on an original can be set by 4 bits of planes 0 to 3 in such a manner that for "0000", a command 0 s used to output an original. It is a decoder 3123 that decodes the 4-bit data into commands 0 to 15. It is a switch matrix 3124 that converts the commands 0 to 15 into commands to make jobs of fill pattern, fill logic, and logotype. A font address controller 3125 generates an address of a font buffer 3126 in accordance with a pattern such as mesh point shade and hatching shade, by using a 2-bit fill pattern signal.

A switch circuit 3127 selects one of document data X, font buffer 3126 and color palette in accordance with a fill logic signal of the switch matrix 3124 and the contents of the original data X. The fill logic is used to fill only the background (of original) with a color mesh, to change the color in a specific portion of the image to another color, and to mask or trim a specific portion of the image, and to fill there with a color.

As seen from the foregoing description, in the IPS, the read signals from the IIT are subjected to the END conversion, and the color masking process. The read signals are further subjected to the edge suppress and the color change, and the under color removal process. A tusche color is generated. Then, the read signals are converted into the process colors. In the case of the processings, such as spatial filter, color modulation, TRC, and reduction/enlargement, it is better to use the process colors data rather than to use the full color data, because the amount of processed data is small, and hence the number of the used conversion tables may be reduced to ⅓. Accordingly, more varieties of the conversion tables may be used, thereby to improve the reproducibility of colors, gradation, and definition.

(B) IPS Hardware

FIGS. 16(a) to 16(d) show a hardware configuration of the IPS.

Figure 16A:
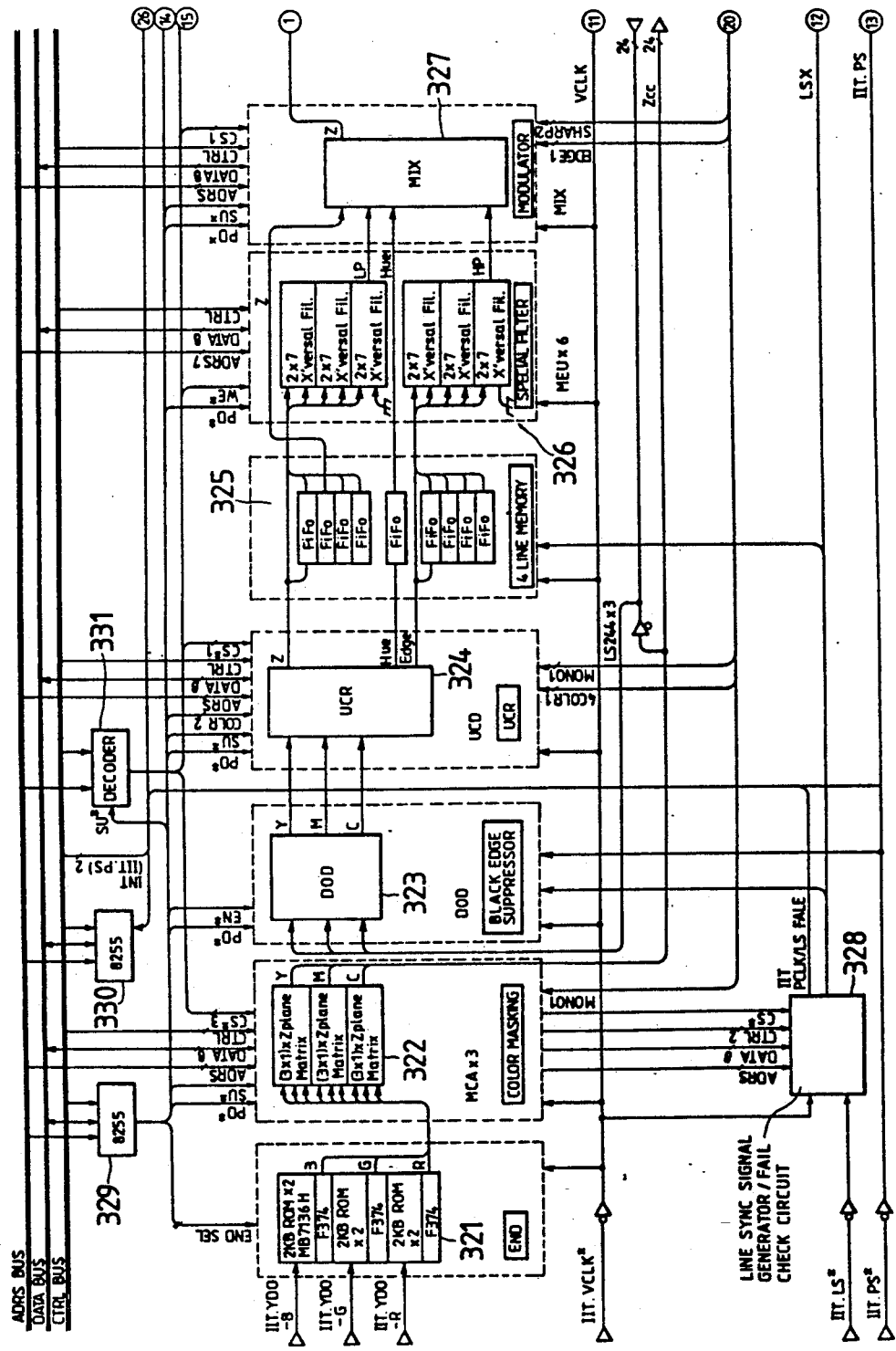
Figure 16B:
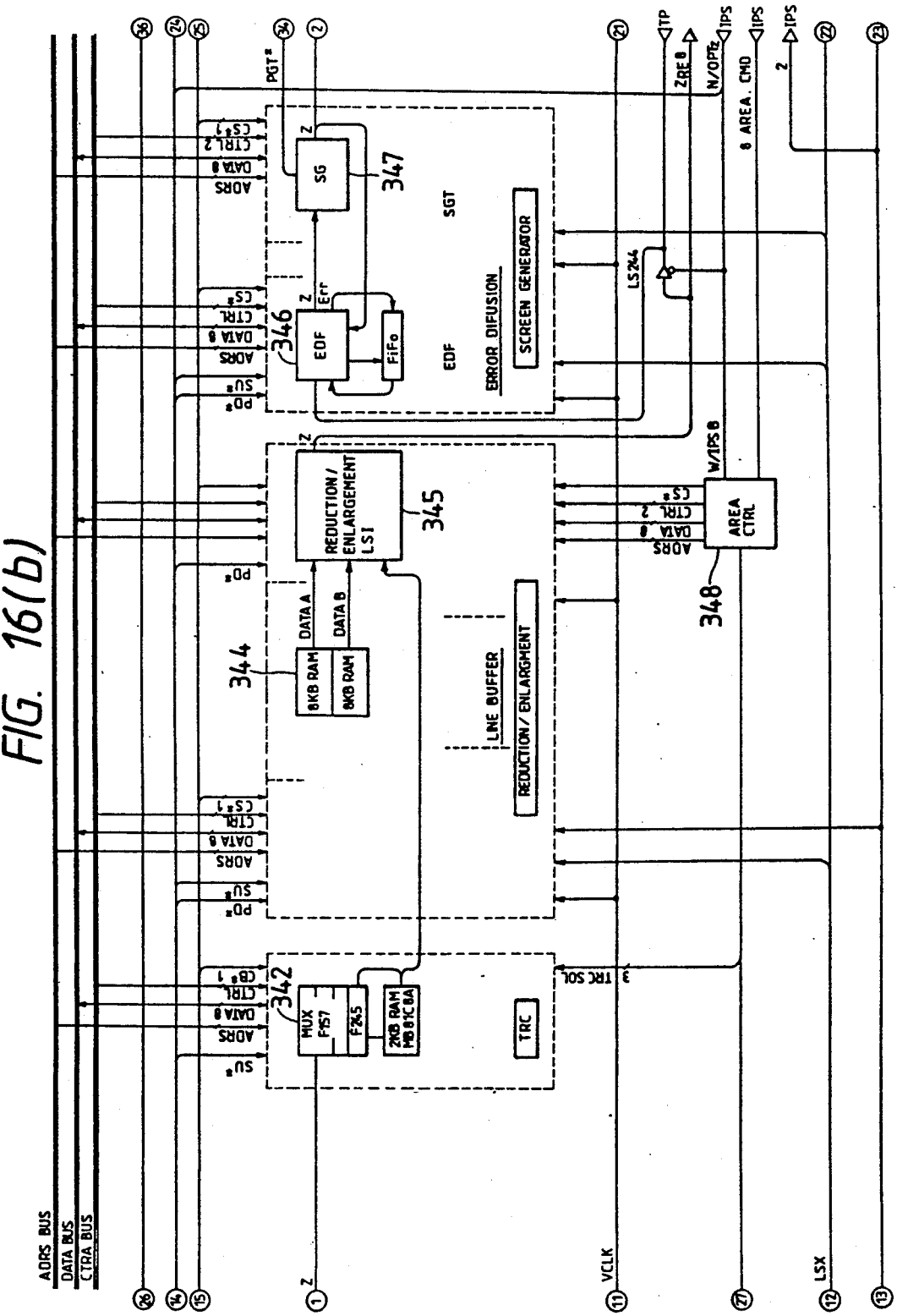
Figure 16C:
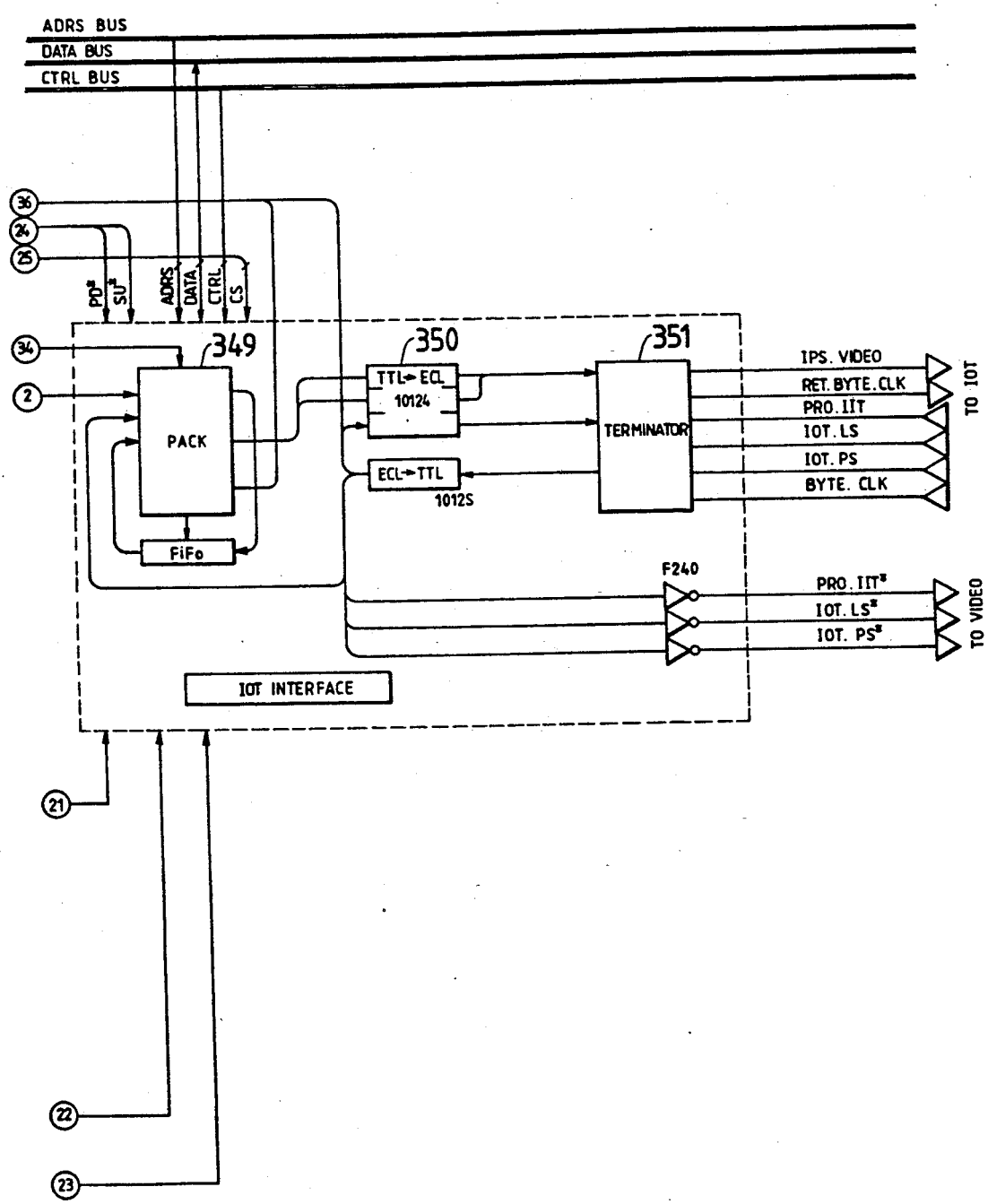

In this instance, a circuitry of the IPS is divided into two circuit boards IPS-A and IPS-B. The circuit board IPS-A contains a circuitry for exercising the basic functions of the color image recording apparatus, such as reproductions of colors, gradation, and definition. The second circuit board ISP-B contains a circuitry for exercising applications and professional works, such as edit works. An arrangement of the circuitry contained in the first circuit board IPS-A is as shown in FIGS. 16(a) to 16(c). A circuit arrangement contained in the second circuit board IPS-B is as shown in FIG. 16(d). During the course of using the copier as the color image recording apparatus of the present invention, there will inevitably occur user's demands for additional and new applications and professional works. The copier may flexibly cope with such demands by merely modifying and altering only the circuitry of the second circuit board IPS-B, because the basic functions of the copier are secured by the circuitry of the first circuit board.

As shown in FIGS. 16(a) to 16(d), the IPS board is coupled with CPU buses including an address bus ADRSBUS, data bus DATABUT and control bus CTRLBUS. The board is also coupled with video data B, G and R from the IIT, video clock IIT VCLK as a sync signal, line sync signal (the main scan direction and the horizontal sync) IIT LS, and page sync (vertical scan direction, vertical sync) IIT PS.

The video data is pipeline processed in the stage after the ENC converting unit. Accordingly, the video data is delayed by a delay amounting to the number of clocks required for the respective processing stages in the pipeline processing. A line sync generator/fail check circuit 328 is provided for generating and distribute horizontal sync signals to meet such a situation of delay, and for the fail check of the video clock and the line sync signal. Therefore, the line sync signal generator/fail check circuit 328 is coupled with the video clock IIT VCLK and the line sync signal IIT LS. To change the settings of the circuit 328, it is coupled with the CPU buses (ADRBUS, DATABUS and CTRLBUS), and a chip select signal CS.

The video data B, G and R from the IIT are inputted to the ROM 321 in the END converting unit. The END conversion table may be loaded into a RAM, for example, under control of the CPU. Actually, however, when use of the copier progresses, there little occurs a situation that the END table must be altered when the image data is being processed. For this reason, two ROMs of 2 k bytes are used for each of the END conversion tables of B, G and R. That is, this instance employs a LUT (look-up table) system using the ROMs. 16 conversion tables are provided and selectively used by a 4-bit select signal ENDSel.

The END converted data signal outputted from a ROM 321 is coupled with a color masking unit made up of three calculation LSI 322 each having two planes each of 3×2 matrix for each color. The calculation LSI 322 is coupled with the CPU buses. The coefficients of the matrices may be set in the calculation LSI 322 from the CPU. The LSI 322 is coupled with a set-up signal SU and a chip select signal CS. These signals are used for connecting the calculation LSI 322 having processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, viz., no image processing is performed, the internal video clock is stopped by the power down signal PD.

Those signals of Y, M and C that have been converted from the color image signals B, G and R by the LSI 322, are applied to a color change LSI 353 in the second circuit board IPS-B shown in FIG. 16(d). Here, the colors of these signals are changed, and inputted to a DOD LSI 323. The color change LSI 353 contains four color change circuits each consisting of a threshold register for setting the not- changed colors, color palette for setting changed colors, and comparator. The DOD LSI 323 contains an original edge detector, black edge suppressor, and the like.

The black edge suppressed data signal outputted from the DOD LSI 323 is applied to an UCR LSI 324. This LSI contains an UCR circuit, black generating circuit, and necessary color generators. The LSI 324 produces a process color X corresponding to the toner color, necessary colors Hue, and edge signal Edge. Accordingly, this LSI also receives a process color designating signal COLR and color mode signals (4COLR, MONO).

The line memory 325 consists of two types of FIFOs. The first FIFOs are used for storing the data of 4 lines in order to transfer the signals of the process color X, necessary colors Hue, and edge Edge to a 5×7 digital filter 326. The second FIFOs are for adjusting the delays by the first FIFOs. The process color X and edge Edge signals of 4 lines are stored, and a total of five lines of those data signals are transferred to the digital filter 326. The data signal of the necessary color Hue is delayed by the FIFO, to synchronize it with the output data signal of the digital filter 326, and then is transferred to a MIS LSI 327.

The digital filter 326 consists of a couple of 5×7 filters (low-pass filter LP and high-pass filter HP) each consisting of three 2×7 filter LSIs. One of the 5×7 filter is used for processing the process color X, and the other, for processing the edge Edge data signal. The MIX LSI 327 applies the mesh-point removal and the edge emphasis to these output data signals by using the conversion tables, and these processed data signals are mixed into the process color X. The LSI 327 receives an edge EDGE signal and a sharp Sharp signal for switching the conversion tables one to another.

The TRC 342 consists of a RAM of 2 k bytes containing eight conversion tables. The conversion table may be reprogrammed during the return period of the carriage before each scan. A 3-bit select signal TRSel is used for selecting any of those conversion tables. The data processed by the TRC 342 is transferred to a reduction/enlargement LSI 345 by a transceiver. In the reduction/enlargement unit, a couple of RAMs 344 of 8 k bytes constitute a ping-pong buffer (line buffer). The LSI 343 generates resampling pitches, and the addresses for the line buffer.

The output data of the reduction/enlargement unit returns by way of an area memory portion in the second circuit board of FIG. 16(d). An EDF LSI 346 contains a FIFO retaining the data of the previous line, and exercises an error diffusion processing by using the previous line data. A signal X after error diffusion processed is outputted to an IOT interface by way of an SG LSI 347 in a screen generator unit.

In the IOT interface, the signals outputted from the SG LSI 347 that receives it in the form of 1-bit on/off signals are packed into an 8-bit data signal, and sends the 8-bit data signal in parallel to the IOT.

In the second circuit board of FIG. 16(d), the data signal actually flowing in the board are for the 16 dots/mm record density. Because of this, a reduction LSI 354 reduces the data into ¼ and digitizes them, and finally stores them into an area memory. An enlargement decode LSI 359 contains a fill pattern RAM 360. When reading the area data out of the area memory to generate a command, the LSI 359 expands the data into the 16 dots/mm data. By using the expanded data, it generates a log address, color palette, and filter pattern. A DRAM 356, consisting of four planes, stores coded area data of 4 bits. An AGDC 355 is a controller exclusively used for controlling the area commands.

(II—3) Image Output Terminal (IOT)

A) Outline

Figure 17:
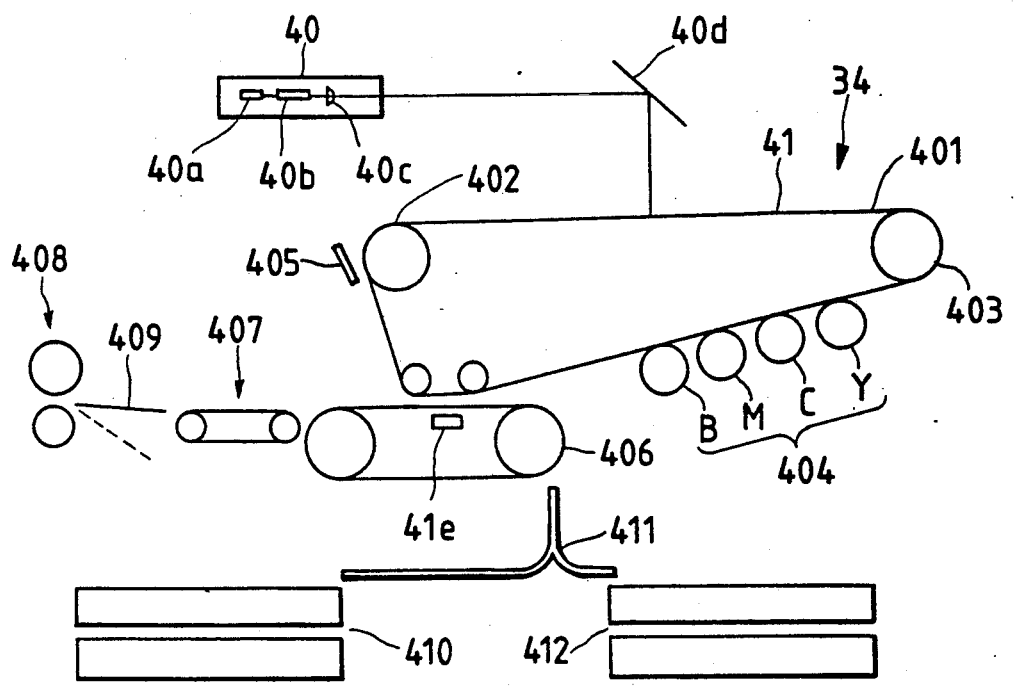
FIG. 17 is an explanatory diagram schematically showing the structure of the IOT.

An outline of the image output terminal (IOT) is shown in FIG. 17.

The IOT uses a photo receptor belt as a photo sensitive member. The IOT is provided with a developing unit 404 consisting of four developing devices of the full color, i.e., black (K), magenta (M), cyan (C) and yellow (Y), a tow roll transfer loop 406 for transferring paper to the transfer unit, a vacuum transfer 407 for transferring paper from the tow roll transfer loop 404 to a fuser 408, paper trays 410 and 412, and a paper transfer path 411. The three units of the photo receptor belt, developing unit 412, and paper transfer path 411 can be pulled out of the IOT to the front side.

The data light obtained by modulating a laser beam from a laser source 40 is guided through a mirror 40d onto the surface of the photo receptor belt 41, thereby forming a latent image thereon. The latent image formed on the surface of the tow roll transfer loop or turtle 41 is developed into a toner image by the developing unit 404. The developing unit 404 consists of four developing devices of K, M, C and Y which are disposed as shown. The layout of the developing devices is determined allowing for a relationship between a dark attenuation and the characteristics of the respective toners, difference in the results of mixing of the respective color toners with the black toner, and the like. In the case of the full color copy, these developing devices are driven in the order of Y→C→M→K.

Papers fed from the two-stage elevator tray 410 and another tray 412 are supplied through the transfer path 411 to the transfer tow roll transfer loop 406. The loop 406 is disposed in the location of the transfer unit, and is made up of a pair of rolls rotatably coupled by a timing chain or a timing belt, and a gripper bar to be given later. The paper is gripped and transferred by using the gripper bar, and the toner image on the the surface of the photo receptor belt is transferred onto the paper. In the case of the 4-color full color, the paper is turned four times by the tow roll transfer belt, during the four turns, the toner images of Y, C, M and K are transferred onto the paper in this order. After the image transfer, the paper is released from the gripper bar, and transferred to the vacuum transfer 407, and fed to the fuser 408. The toner image on the paper is fused by the fuser and delivered outside the base machine.

The vacuum transfer 407 absorbs the difference of the speeds of the transfer loop 406 and the fuser 408, thereby synchronize them in operation. In this instance, the transfer speed (process speed) is 190 mm/sec. In the case of the full color copy, a fusing speed is 90 mm/sec. Thus, the transfer speed is different from the fusing speed. To secure the fusing speed, the process speed is reduced. Since the 1.5 kVA power must be secured, the power cannot be distributed to the fuser. To cope with this, in the small paper such as B5 and A4 papers, at the instant that the image transferred paper is released from the transfer loop 406 and rides on the vacuum transfer 407, the speed of the vacuum transfer 407 is decreased from 190 mm/sec to 90 mm/sec, thereby to make it equal to the fusing speed The instant copier is designed to be compact by making the distance between the transfer loop and the fuser as short as possible. The A3 paper is in excess of the distance of the transfer point and the fuser. If the speed of the vacuum transfer is decreased, there inevitably occurs a situation that the leading end of the paper reaches the fuser, but the trailing end portion of the paper is under image transfer process. In such a situation, the paper is braked and consequently a color displacement possibly occurs. To solve this problem, a baffle plate 409 is provided between the fuser and the vacuum transfer. When the A3 paper arrives, the baffle plate is turned down to curve the A3 paper along the plate, thereby to apparently elongate the path between the fuser and the vacuum transfer. Accordingly, the vacuum transfer is operable at the same speed as the transfer speed of the turtle 6. With such an arrangement, after the image transfer is ended, the leading end of the paper reaches the fuser. In other words, the speed difference between the turtle and the fuser is absorbed and both are operable synchronously. The above approach for the A3 paper is correspondingly applied to the OHP, because it has a poor thermal conduction.

The instant copier is designed that a black copy as well as the full color copy can made at a high efficiency. In the case of the black copy, the toner layer is thin and hence it can be fused by a less amount of heat. Accordingly, the fusing speed is 190 mm/sec, viz., without speed down in the vacuum transfer. The same thing is applied to a single color copy, because the single color copy has a single toner layer. After the transfer process is completed, the toner remaining on the surface of the photo receptor belt is wiped out by a cleaner 405.

(B) Transfer Loop

Figure 18:
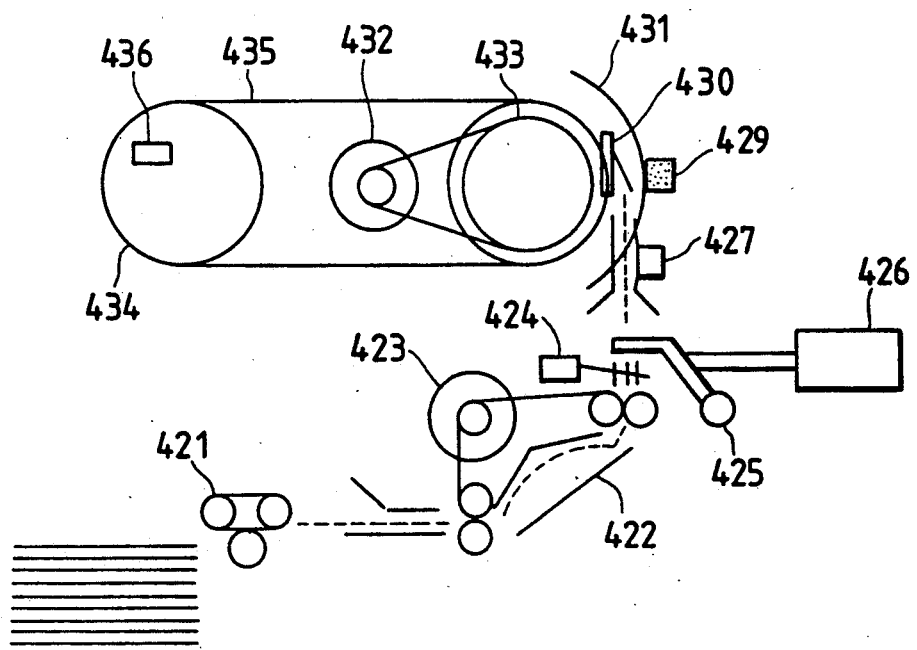
FIG. 18 is an explanatory diagram showing the structure of a transfer unit.

The tow roll transfer loop 406 is configured as shown in FIG. 18(a).

The two roll transfer loop 406 is features in that no mechanical paper support member is used to eliminate color irregularity, and the transfer speed can be increased through a speed control.

Papers are picked up from a tray sheet by sheet by a feed head 421, and the picked up paper is transported through a buckle chamber 422 and a regi. gate 425 that is controlled by a regi. gate solenoid 426, to the transfer loop. Arrival of the paper at the regi. gate is detected by a pre-regi. gate sensor 424. The The transfer loop is driven counterclockwise by rotating a roller 433 by a servo motor 432 through a timing belt. No particular drive is applied to another roller 434. A chain or belt for timing is wound around the paired rollers. A grip bar 430 is provided between the chains (in the direction orthogonal to the paper transfer direction). The grip bar is opened at the entrance of the transfer loop with the aid of a solenoid. The gripper 430 grips and pulls about the paper for transfer at the entrance transfer loop. The transfer loop is not provided with a support for the transferred paper, and the paper is flung away by the centrifugal force. To hold the paper against the centrifugal force, the paired rollers are designed so as to draw a vacuum, and attract the paper. Therefore, after passing the roller, the paper is transported fluttering. At the transfer point, the paper is electrostatically attracted toward the photo receptor belt near which a detach corotron and a transfer corotron are disposed, and the toner image on the photo receptor surface is transferred onto the paper. After the image transfer, at the exit of the transfer loop, the present position of the gripper bar is detected by a gripper home sensor 436. At a proper timing, the gripper bar is opened by a solenoid to release the paper and transfer it to the vacuum transfer 413. In the case of the full color copy, the paper is turned around the transfer loop four times, for the color image transfer purposes. In the case of the three-pass color copy, it is turned three times.

Conventionally, an aluminum or steel support covered with a mylar sheet or mesh supports the paper. When it is heated, deference of thermal expansions over the support makes the support surface irregular. The poor flatness on the support brings about a nonuniform transfer efficiency over the support surface, and consequently a color irregularity. The use of the gripper bar eliminates the need of the paper support, and hence the color irregularity. In the case of small size papers such as A4 and B5 size, the transfer loop of the present copying machine loses its image function during a period from an instant that the lead edge of the paper starts at a transfer point till it returns to the next transfer point. To cope with this, two different speed are selectively used; one speed is high and quickly turns the transfer loop during the above period, and the other is normal speed. The paper of A3 size has an approximately ⅔ length of that of the transfer loop. For such a large paper, the normal copying speed is used, not changed.

(II—4) User Interface (U/I)

(A) Use of Color Display

Figure 19A:
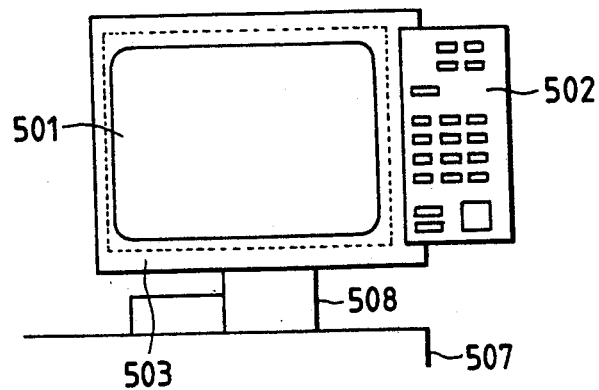
FIGS. 19(a) to 19(c) are diagrams showing an example of mounting an UI using a display.
Figure 19B:
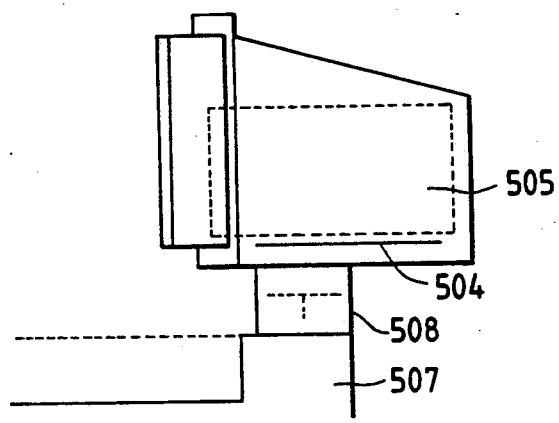
Figure 19C:
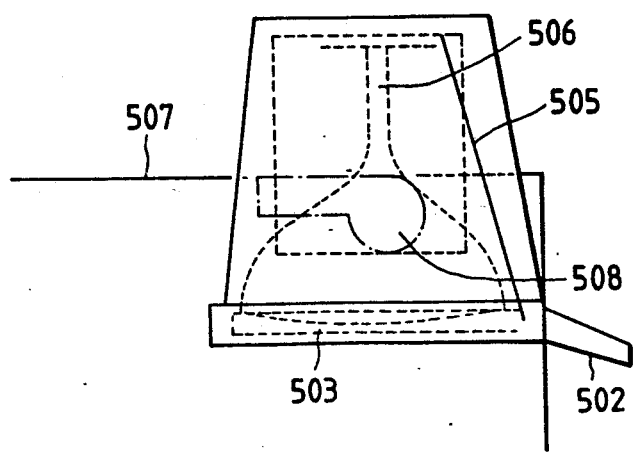
Figure 20A:
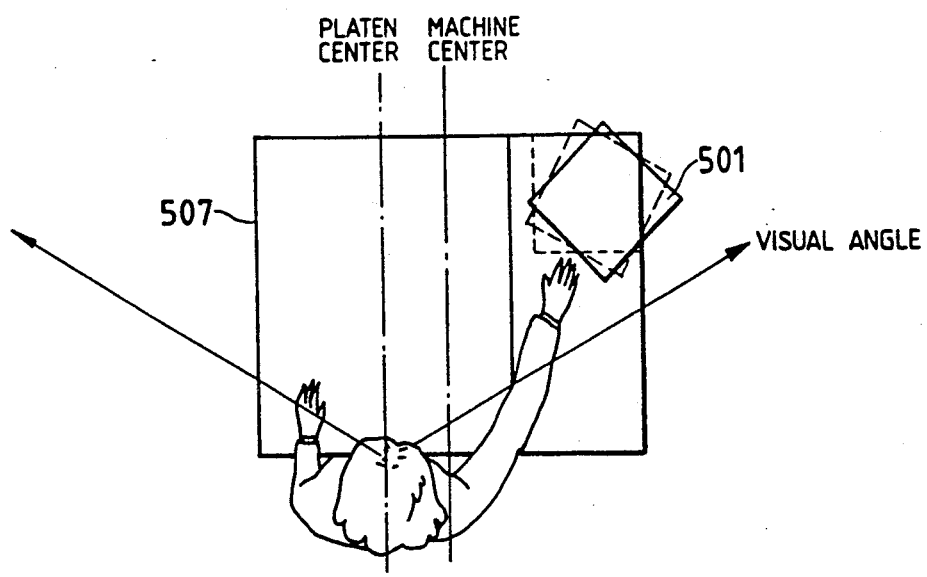
FIGS. 20(a) and 20(b) are diagrams showing an angle and a height of the UI mounted.
Figure 20B:
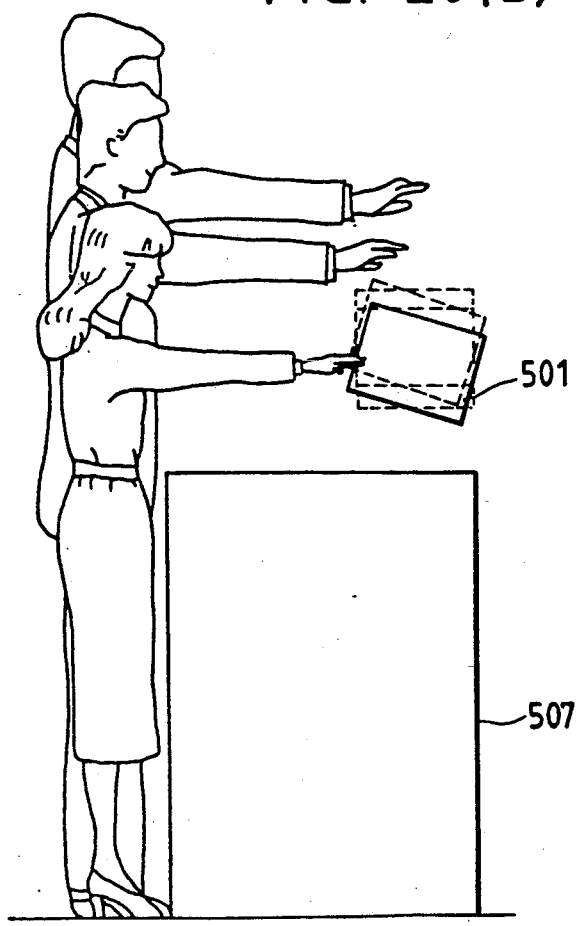

FIGS. 19(a) to 19(c) show how to mount a user interface (UI) using a display device and an appearance of the display. FIGS. 20(a) and 20(b) illustrate and angle and a height of the user interface mounted to the base machine.

The user interface is a man-machine interface aiding an intelligible conversation between an operator and the color copying machine. Accordingly, it must be operable in a simple manner, and distinctively and impressively present necessary information in connection with the related information to an operator. Bear this in mind, and the user interface according to the present invention is inventive and creative in that it is user friendly, intelligible to beginners, and simple to the expertized operators, allows a user to directly select desired functions, exactly and quickly provides necessary information to operators by using colors, and buttons and provides a good operability by gathering controls at one location.

A copying machine, which has many functions and is reliable, in this respect, may be considered as a good machine. However, if such a machine is difficult to operate, it will be evaluated as a mere expensive machine. Accordingly, even a high performance machine, if its operability is poor, will receive a poor evaluation. Thus, the operability constitutes an important factor in evaluating the user interface. In recent copying machines with multi-functions, this is more distinct.

To improve the operability of the user interface, the user interface is provided with a monitor as a color display 501 of 12 inches and a hard control panel 502 placed by the monitor, as shown in FIGS. 19(a) to 19(c). A creative color display provides menus legible to users. Further, an infrared ray touch board 503 is disposed on the fringe of the color display 501. Use of the touch board allows a user to directly access to the machine by soft buttons to be displayed in the display screen of the display 501. Various types of operations are properly assigned to the hard buttons on the hard control panel 502 and the soft buttons in the screen of the display 501, thereby providing simple operations and effective use of menu displays.

The color display 501 and the hard control panel 502 are provided on the rear side with a monitor control/power supply board 504, a video engine board 505, and a CRT driver board 506, and the like, as shown in FIGS. 19(b) and (c). As shown in FIG. 19(c), the hard control panel 502 is bent toward the front of the display 501.

It is noted that the color display with the hard control panel 502 is placed atop a support arm 508 standing erect on the base machine 507, viz., not directly placed on the base machine. Since the stand type of color display 501, not the console panel that is used in the conventional machine, is used, the display may be installed above the base machine 507, as shown in FIG. 20(a). Particularly when it is located at the right back corner, as shown in FIG. 20(a), the copier may be designed not taking the console panel space into account. A compact copier may be designed.

A height of the platen, or a height of the base machine, is selected to a height, such as the height of the waist, which is best for a user to set an original on the platen table. This height limits the design freedom in selecting the height of the base machine. The conventional console panel is mounted on the top of the base machine. The console is placed substantially at the height of the waist, and access to the console panel by the hands is easy. However, the display and operating sections for selecting the various functions and for setting the conditions to execute the functions are relatively remote from the operator's eyes. In the case of the user interface of the present invention, the display and operating sections are placed above the platen, viz., it is nearer to the operator's eyes than the conventional console, as shown in FIG. 20(b), and hence is easy to operate and to see. Further, these are positioned not below the operator's eye, but in the forward and right place of the operator. Such a placement makes it easy to operate the machine. Such a placement of the display put close to the eyes of the operator provides a new place to accommodate the control board, and option kits including a memory card device, a key counter and the like. Accordingly, when a memory card device is assembled into the copying machine, any structural and outer appearance modification is not required for the base machine. Further, it makes it easy for a designer to properly select the place to mount the display and the height of the display. The display may be set at a fixed angle, and if necessary, it may be adjustably set at a desired angle.

(B) System Configuration

Figure 21:
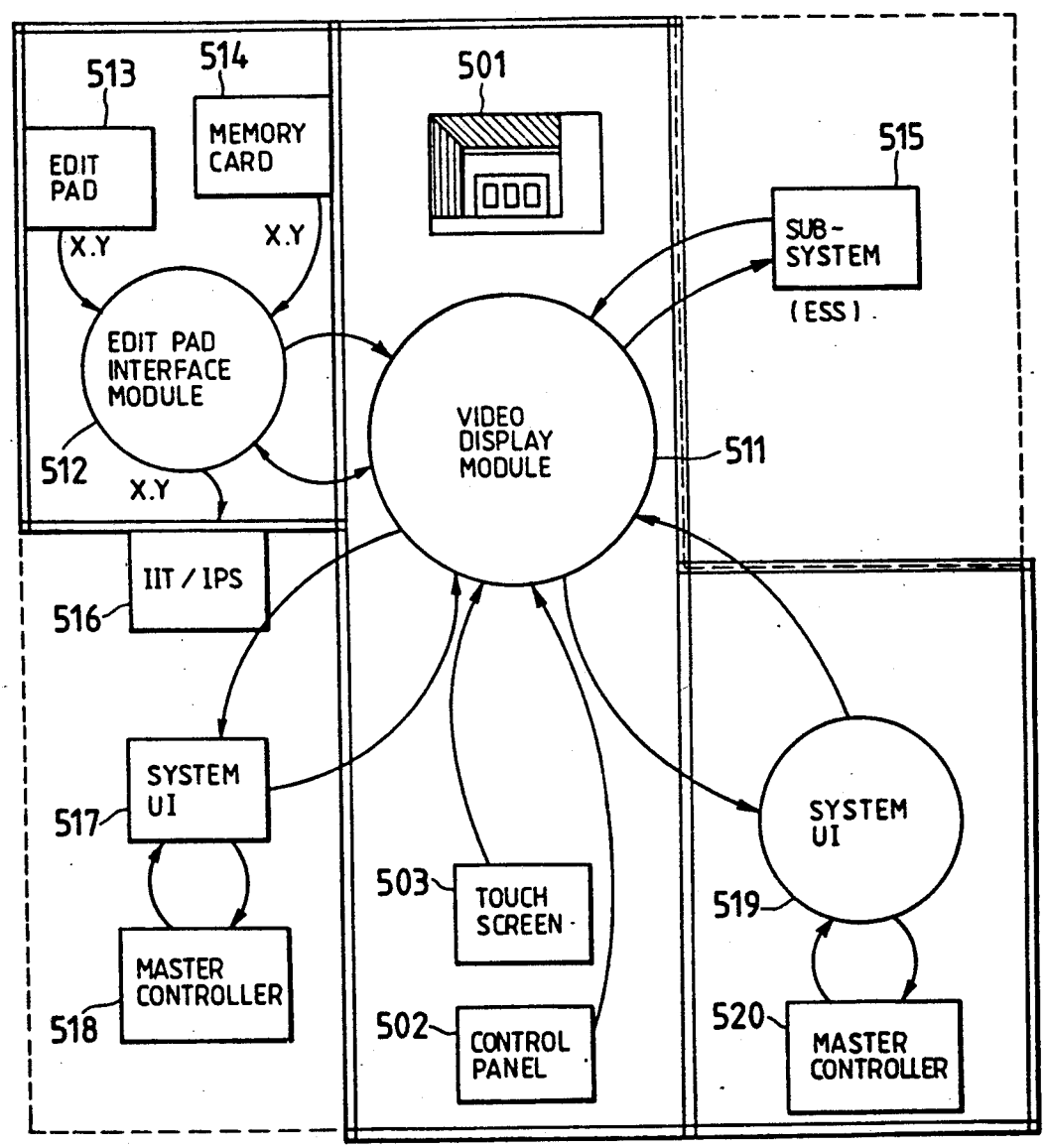
FIG. 21 shows a module configuration of the UI.
Figure 22:
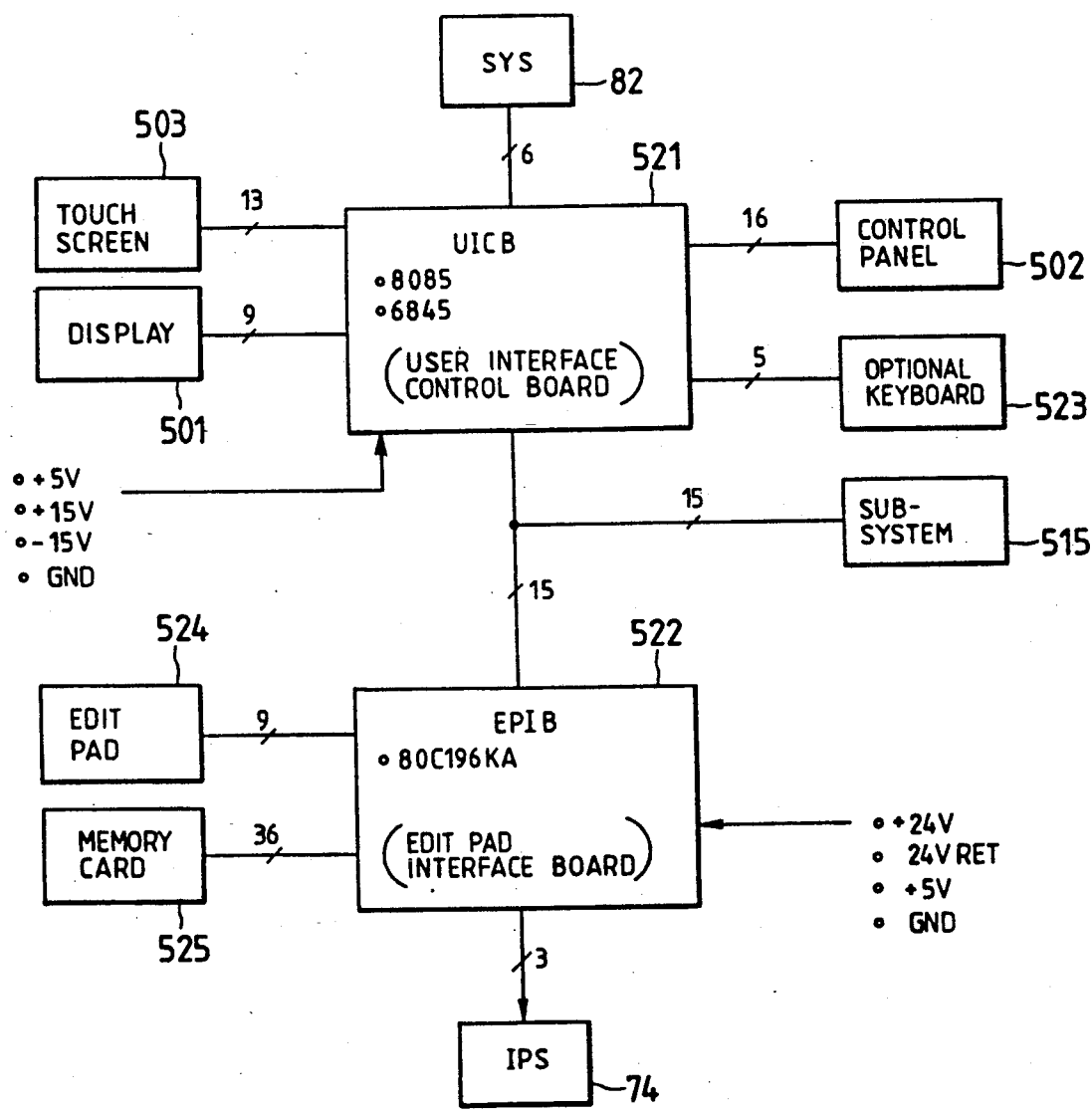
FIG. 22 shows a hardware configuration of the UI.

FIG. 21 shows a module configuration of the user interface, and FIG. 22 shows a hardware configuration of the same.

As shown in FIG. 21, the user interface of the present invention is composed of a video display module 511 for controlling the display screen of the color display 501, and an edit pad interface module 512 for inputting and outputting an edit pad 513 and a memory card 514. System UIs 517 and 519 and a subsystem 515 for controlling the above modules, and a touch screen 503 and a control panel 502 are connected to the video display module 511. The edit pad interface module 512 enters X and Y coordinates data from the edit pad 513, and receives jobs and X and Y coordinates from the memory card 514, sends video may display data to the video display module 511, and transfers UI control signals to and from the video display module 511.

An area designation consists of a marker designation to designate a specific area on an original by a red or blue marker for effecting trimming and color change process, a 2-point designation by using coordinates data in a rectangular area, and a close loop designation by tracing an edit pad. The marker designation has no data in particular. The 2- point designation a small amount of data. The close loop designation needs a large amount of data for the area to be edited. The IPS is used for the data edition. The amount of the data is too large to transmit them at a high speed. For this reason, the transfer line connecting to the IIT/IPS 516 and exclusively used for transmitting the X and Y coordinates data is provided separately from the ordinary data transmission line.

The video display module 511 enters vertical and horizontal input points (coordinate positions on the touch screen) on a touch screen 503, recognizes a button ID, and enters a button ID on the control panel 502. Further, it sends a button ID to the system USs 517 and 519, and receives a display request from the system UIs 517 and 519. The subsystem (ESS) 515 is connected to a work station and a host CPU, for example, and serves as a print controller when the instant copying machine is used as a laser printer. In this case, the data of the touch screen 503, control panel 502, and keyboard (not shown) is transferred to the subsystem 515 as intact. The contents in the display screen are sent from the subsystem 515 to the video display module 511.

The system UIs 517 and 519 transfer the data of copy modes and machine states to and from master controllers 518 and 520. In connection with the software architecture shown in FIG. 4, one of the system UIs 517 and 519 is the SYSUI module 81 in FIG. 4, and the other is the MCBUI module 86 of the MCB remote.

The hardware of the user interface according to the instant invention is made up of a couple of control boards, UICB 521 and EPIB522, as shown in FIG. 22. In connection with the above module configuration, the functions of the user interface are also categorized into two groups. The UICB 521 uses two CPUs, such as 8085 and 6845 or their equivalents by Intel CO., in U.S.A., in order to control the hardware of the UI, to drive the edit pads 513 and 514, and to process the received data of the touch screen 503 and to write the results on the CRT screen. The EPIB 522 uses a CUP of 16 bits such as 80C196KA made by Intel Co., and transfers the depicting data of the bit map area to the UICB 521 in the DMA mode. The 16-bit CPU is used because a CPU of 8 bits is unsatisfactory to gain the function to depict data in the bit map area. In this way, the many functions used are decentralized.

Figure 23:
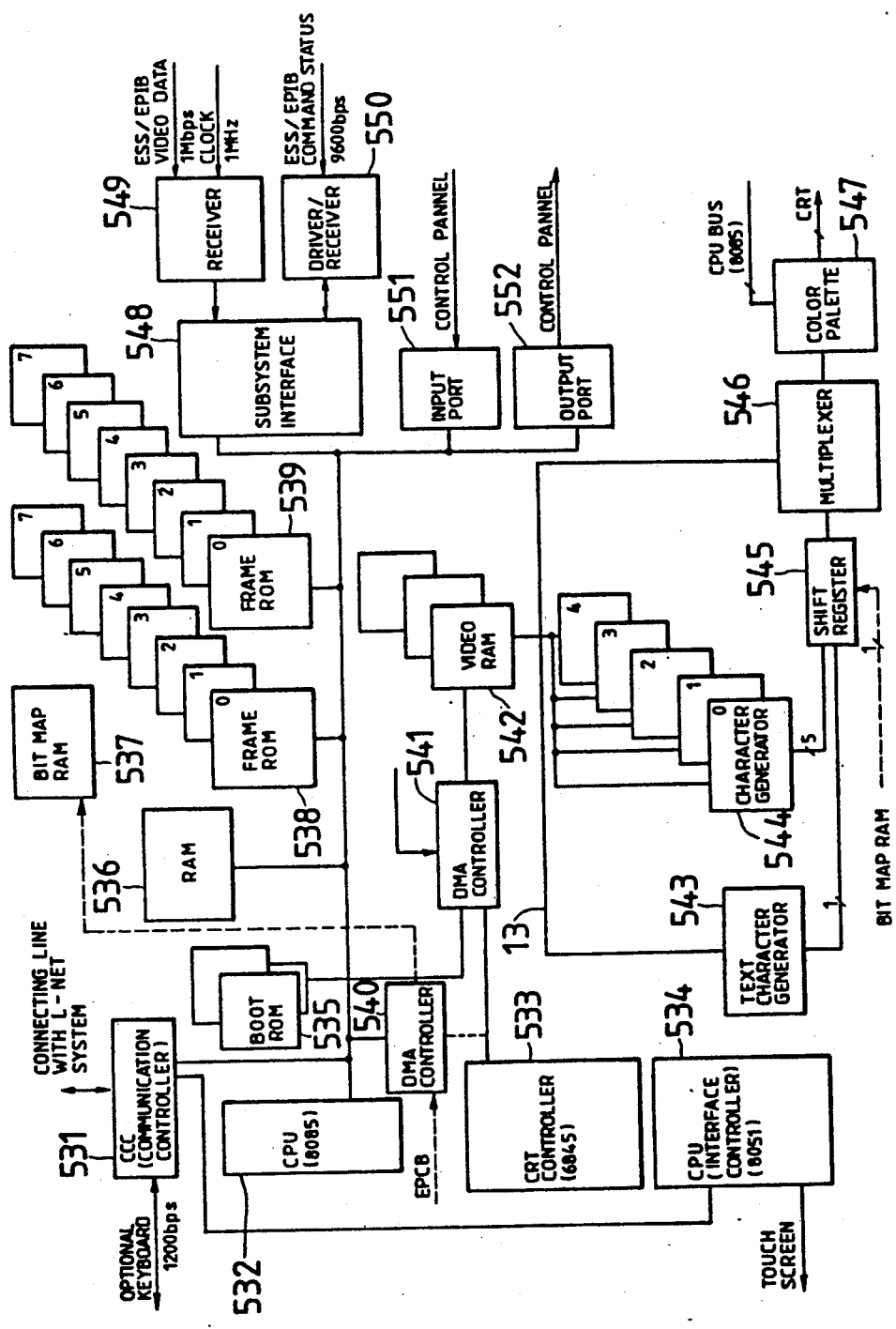
FIG. 23 shows a configuration of a UICB.

FIG. 23 shows a circuit arrangement of the UICB. The UICB uses a CPU 534 such as 8051 by Intel Co., or its equivalent, in addition to the above SUPsA 531 is connected to the high speed communication line L-NET or a communication line of an optional keyboard, and it controls the communication by the CPU 534 and CCC531. Further, the CPU 534 is also used for driving the touch screen. The signals of the touch screen as the coordinates position data are fetched through the CCC531 into the CPU 532, from the CPU 534. In the CPU 532, the button ID is recognized and processed. The UICB is connected to the control panel through an input port 551 and an output port 552. Further, it receives video data at 1 Mbps, together with a 1 MHz clock signal, from the EPIB 522 and the subsystem (ESS) through the subsystem interface 548, receiver 549, and driver receiver 550, and is capable of transmitting and receiving commands and status data at 9600 bps.

The memories are a boot ROM 535 storing a bootstrap, frame ROMs 538 and 539, RAM 536, bit map RAM 537, and V-RAM 542. The frame ROMs 538 and 539 store the data with regard to the display screen whose data structure is easy to handle in the software, viz., not bit map. When a display request arrives through the L-NET, the CPU 532 generates depicting data in the RAM 536 that used as a work area. Then, the data generated is written into the V-RAM 542 by the DMA 541. The bit map data is transferred from the EPIB 522 to the bit map RAM 537, and written thereinto by the DMA 540. A character generator 544 is for a graphic tile, and a character generator, for a character tile. The V-RAM 542 is controlled by a tile cold. The tile code consists of 24 bits (3bytes). In the tile code, 13 bits are assigned to the data indicative of kinds of tiles; 2 bits, to the data to identify text, graphic or bit map; 1 bit, to brink data; 5 bits, to color data of tiles; 3 bits, to the data indicative of background or foreground. A CRT controller frames a display according to the data of tile codes that is stored in the V-RAM542, and feeds the video data to the CRT screen by way of a shift register 545, multiplexer 546, and color palette 547. Description in the bit map area is changed by the shift register 545.

Figure 24:
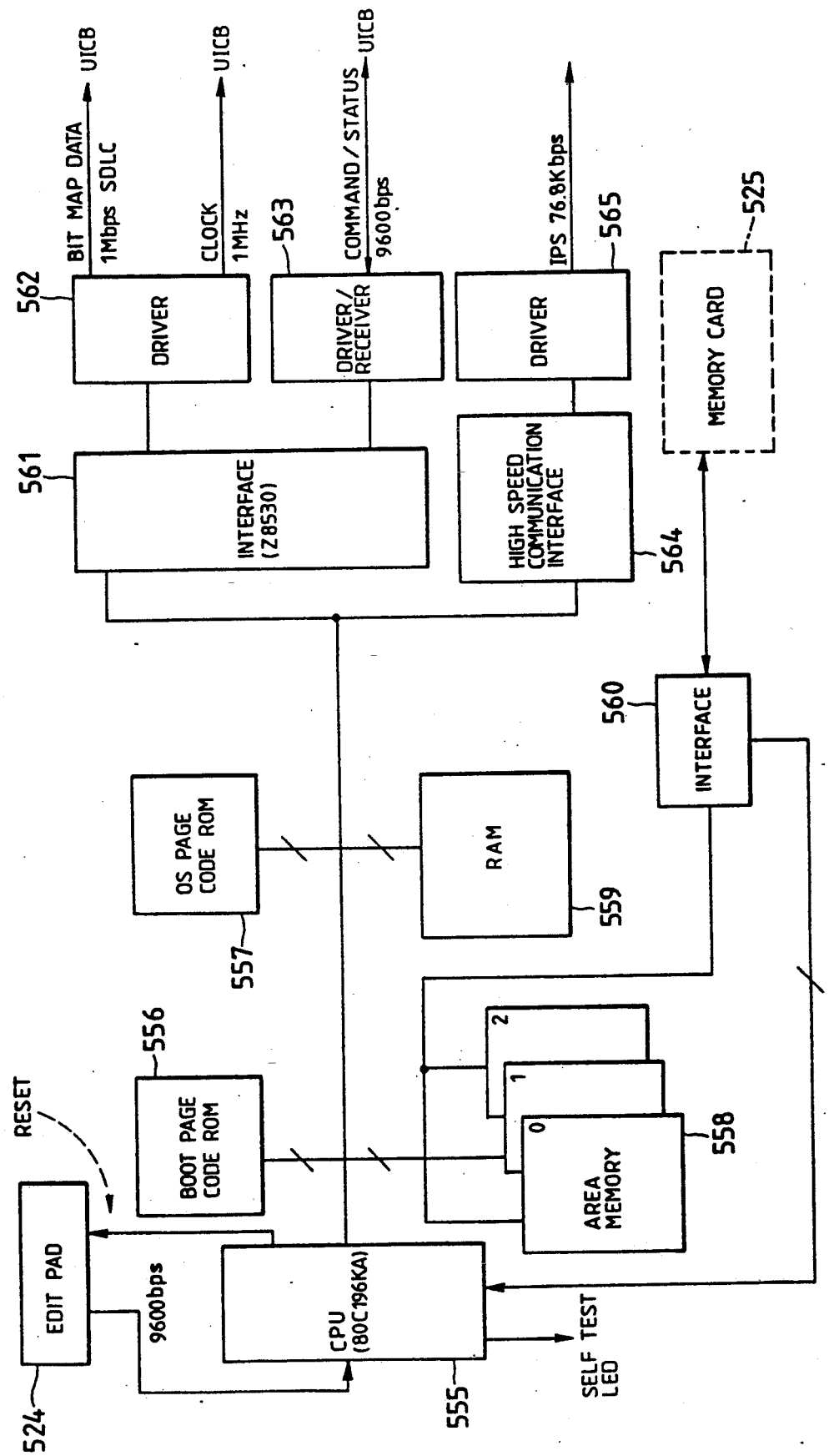
FIG. 24 shows a configuration of an EPIB.

FIG. 24 shows an arrangement of the EPIB. The EPIB is made up of a 16-bit CPU 555, such as 80C196KA manufactured by Intel Co., or its equivalent, boot page code ROM 556, OS page code ROM 557, area memory 558, and RAM 559 used as a work area. The EPIB transfers bit map data to the UICB, and transfers commands and status data to and from the same, through a driver 562 and a driver/receiver 563. Through a high speed communication interface 564 and a driver 565, the EPIB transfers X and Y coordinates data to the IPS. Data transfer to and rom a memory card 525 is performed through an interface 560. Accordingly, when the EPIB receives the data to designate a close loop edit area or copy mode data from the edit pad 524 or the memory card 525, the received data is transferred to the UICB through the interface 561 and the driver 562, and to the IPS through the high speed communication interface 564 and the driver 565.

(C) Effective Use of Display Screen

Also in the case of using a display system for the user interface, to visually present a great amount of data of the multi-functioning copying machine, data to assist the display of the machine operating data is correspondingly increased. When plainly considering the increased data, a broad display area is required, and this goes against our intention of the compact machine. If a compact size display is used, all necessary data must be displayed in one display screen. However, a display density would make it difficult to realize this. Further it would be realized, the displayed items are illegible to operators.

In the present invention, creations are introduced into the display screen layout and its controls, enabling use of the compact display. The color display can provide various display modes by controlling many attributes of display, for example, color, brightness, and the like. In this respect, the color display is superior to LEDs and LCDs used in the conventional console panel. By making use of the advantageous features, a legible display is obtained with a compact display unit.

For example, the information to be displayed on the display screen is categorized into a plurality of groups of information. These groups of information are displayed in a plurality of displays. With regard to one display, the detailed information is displayed in a pop-up manner, and is not displayed in the primary display screen. Accordingly, the display is concise and clear with only minimum necessary information. For the display containing different items of information, color and emphatic indications are used so that the operator can readily and distinctly recognize the necessary information on the display screen from among the information.

a. Screen layout

Figure 25A:
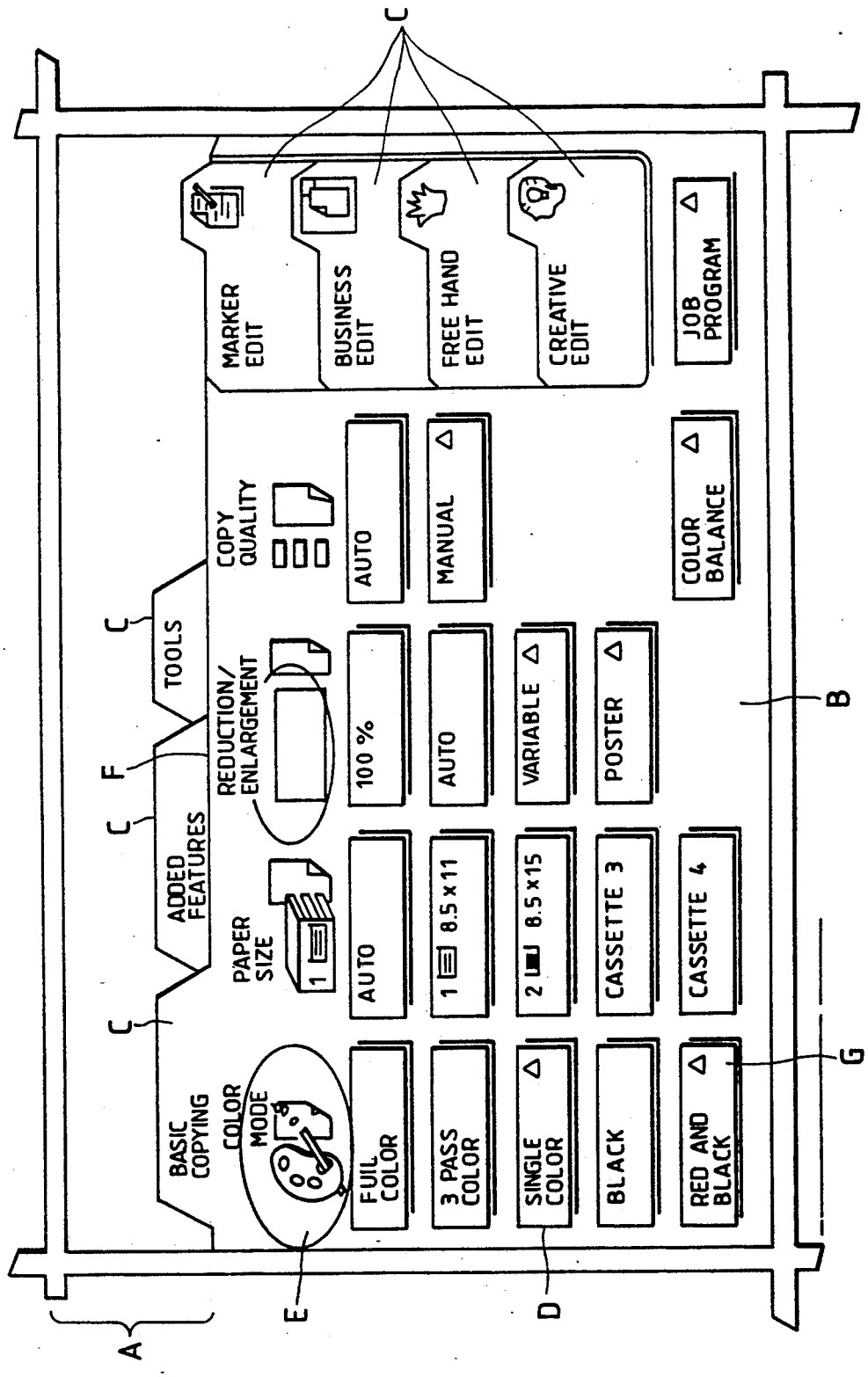
FIGS. 25(a) to 25(c) show layouts in displays for instructive controls.
Figure 25B:
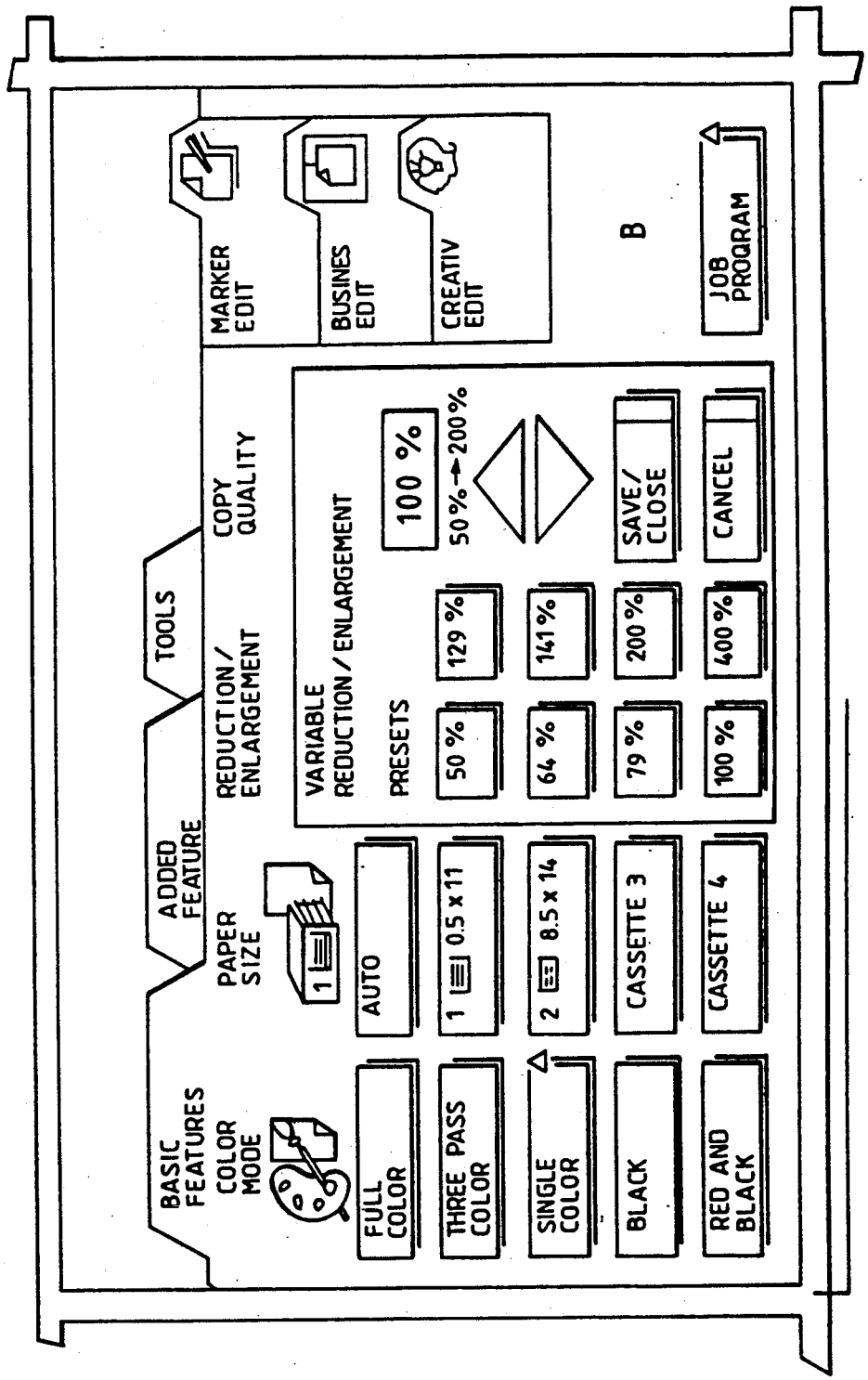
Figure 25C:
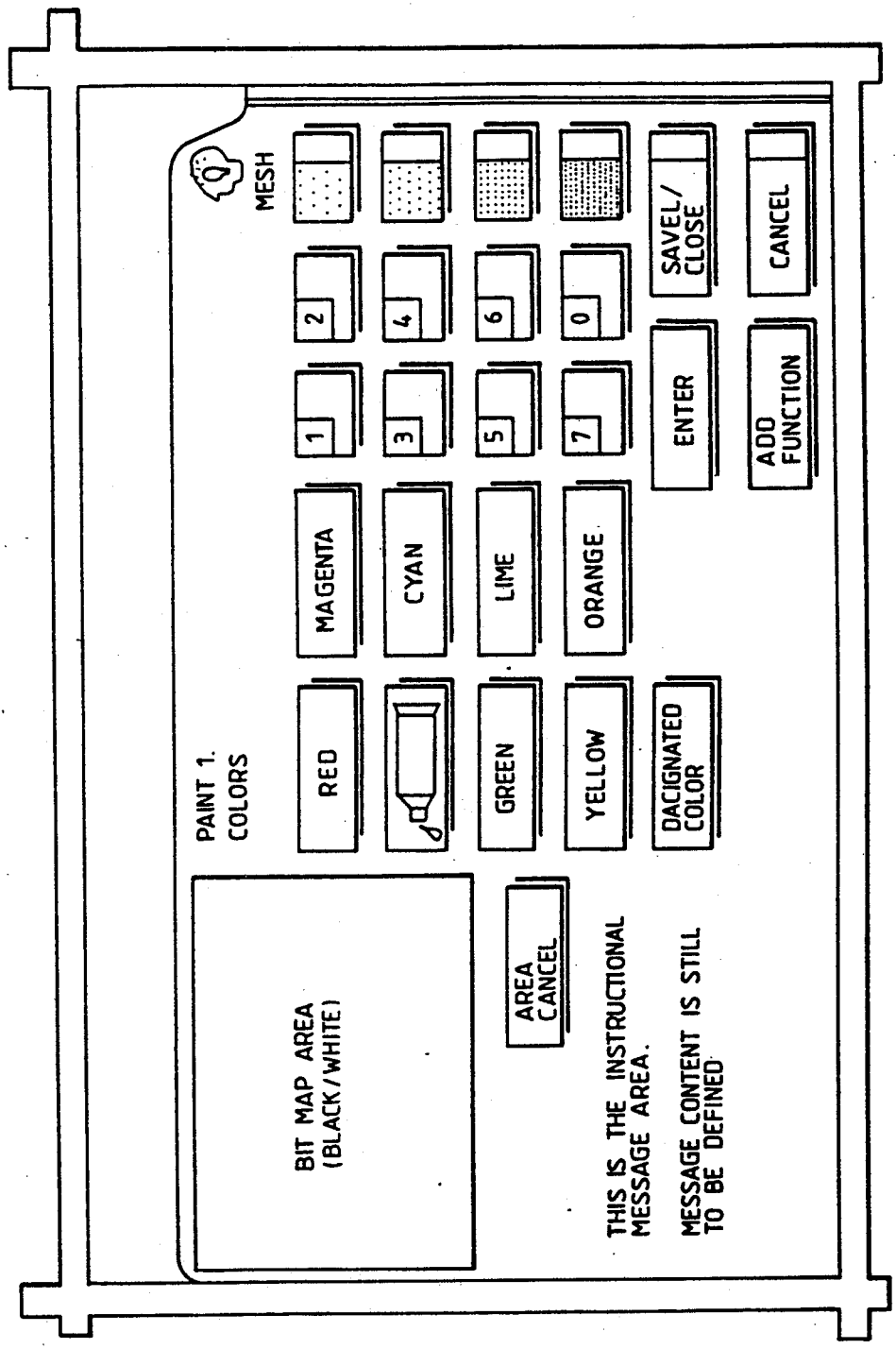

FIGS. 25(a) to 25(c) show some layouts of display screen. FIG. 25(a) shows a basic copy display. FIG. 25(b) shows a display in which a pop-up display is inserted in the basic copy display. FIG. 25(c) shows a paint 1 display of the creative edit.

In the user interface according to the present invention, an initial display is the basic copy display for setting copy modes as shown in FIG. 25(a). The display for setting copy modes is divided into two sections, a message area A and a pathway area B, as shown in FIG. 25(a).

The message area consists of the upper three lines on the screen. The first line is for a statement message. The second and third lines are for various messages, such as a guide message when different functions are contradictively selected, a message showing a faulty state of the machine, and an alarm message. The right end portion of the message area is used as an area for display the number of copies, such as the number of copies set by ten keys, and the number of copies being under copying operation.

The pathway area B is an area to select various functions, and contains many pathways of a basic copy, added feature, marker edit, business edit, free hand edit, creative edit, and tool. The pathway tabs C for those pathways are displayed. Each pathway uses a pop-up function for improving the operability. The pathway area B further contains soft buttons D as choices for selecting functions by touching it by the finger, an icon (picture) E for indicating the function selected, and an indicator F for indicating magnification percentages. Those soft buttons with the pop-up functions are each marked with a pop-up mark G of Δ. By touching the pathway tab C, the pass-way of the touched tab is opened. By touching the soft button, the function indicated by the touched soft button is selected. For gaining a good operability, the soft buttons D are arrayed so that for function select, those buttons are operated in the order from the left upper button to the right lower button.

The basic copy display and other displays are sorted so as to maximize a community between it and other devices, and that between the soft panel and the hard console panel. Further, the edit displays consist each of a plurality of levels that can be selected in accordance with a degree of skill of the operator. Further, the pop-up function is used. Of those functions displayed, the functions requiring a high level of technique or complicated functions are displayed in a pop-up manner.

The pop-up has detailed setting items data for a specific function. The display has a pop-up open function. To see detailed setting items data, the pop-up is opened. With this, the display of each pathway is easy to seen and simple. The pop-up is opened by touching the soft button with the pop-up mark. The pop-up is closed when a closed button or a cancel button, an all-clear button are pushed, or when an automatic clear function operates. A display shown in FIG. 25(b) appear when the reduction/enlargement function is selected, the pop-up is opened by touching a variable reduction/enlargement soft button.

In the basic copy display, when the pathway tab for the creative edit is touched, the display is changed to the screen of the creative edit pathway. The display of paint 1 of those creative edit pathway displays is shown in FIG. 25(c). The display includes a bit map area H and an instructional message area I. The bit map area H is located in the left upper portion in the screen. When an edit area is designated by the edit pad, a single color bit map is displayed in the area. An instructional message area I is located in the lower left portion in the screen. By using this area, instructive messages for edit work are presented to the operator. As a matter of course, the message differs with the type of the edit work. In the screen, a work area occupies an area except the bit map area H, instructional area I and the message area A in the upper portion of the screen.

b. Basic copy display

As shown in FIG. 25(a), the pathway for the basic copy includes soft buttons (choices) for selecting the color mode, paper select, reduction/enlargement, copy image quality, color balance, and job program, and the pathway tabs for the maker edit, business edit, free-hand edit, and creative edit, and the edit feature and tool. This pathway is an initial pathway as is displayed after power on and when au automatic clear mode is set up by pushing the all clear button.

The color mode consists of five modes, a full color (4-pass color) mode using four colors Y, M, C and K for copy, 3-pass color mode using three colors except color K, single color mode using a single color selected from among 12 colors, black mode, and black/red mode. A default automatically selected may be set appropriately. The single color mode and the black/red mode have detailed setting items. Accordingly, these modes are displayed in a pop-up mode.

The paper select mode consists of an automatic paper select (APS), tray 1 and tray 2, cassette 3 and cassette 4. The APS functions when a specific magnification is set in the reduction/enlargement mode, and does not function when an automatic magnification select (AMS) mode is set up. The default is the APS.

The reduction/enlargement mode has two choices, 100%, an AMS for determining a magnification on the basis of document size and paper size when paper of a specific size is set, and a variable magnification select. In this mode, a set magnification and calculated magnification or an automatic is indicated by the indicator on the top. In the variable magnification select, a magnification may be set with the steps of 1% in the range from 50% to 400%. The magnifications in the vertical and the horizontal may independently be set. Accordingly, these detailed items are displayed in the pop-up mode. The default is 100%.

In respect to the reduction/enlargement, as described above, the magnification in the vertical scan direction (X direction) is adjusted by controlling the scan speed. The magnification in the main scan direction (Y direction) is adjusted by changing the method of reading data from the line memory in the IPS.

The copy image quality consists of two choices, an automatic mode and a manual mode. In the automatic mode, an optical density is automatically controlled for a mono color document, and a color balance is automatically controlled for a color document. In the manual mode, the pop-up technique is used for controlling an optical density of the document in seven steps. The control is carried out by the IPS.

The job program is effective only when as memory card is inserted into a slot of the card reader. In this mode, jobs can be written into and read out of the memory card. The memory card used in this instance has 32 k bytes and is capable of storing a maximum of 32 jobs. Accordingly, all other jobs than that of the projector mode can be programmed.

c. Aided feature display

The pathway of the aided feature display includes soft buttons (choices) for selecting a copy output, copy sharpness, copy contract, copy position, film projector, page programming, job program, and binding margin, and the pathway tabs for the marker edit, business edit, free-hand edit, and creative edit, and the basic copy and tool.

The copy output has two choices, a top tray and a sort mode. The default is the top tray, and when not sorter is used, this item is not indicated.

The copy sharpness has three choices, a standard, a manual and a photo. In the manual, the pop-up is used and control of 7-steps is possible. In the photo, the pop-up is used. It contains items of photo, character, print and photo/character. The control for this is carried out in the IPS.

The copy contrast has a copy contrast control in seve steps. The copy position has a choice of an automatic center function in which the center of the copy image is positioned at the center of paper by the default.

The film projector is used for copying images on various kinds of films, and will be described in detail later. The pop-up is used for selecting any of 35 mm nega. and 35 mm posi. by the projector, and 35 mm nega. 6 cm×6 cm slide and 4"×5" slide on the platen.

The page programming has choices of a cover for laying a cover to copies, insert for inserting a white or color paper into copied papers, color mode to set up a color mode every page of document, and paper to select a desired tray every page of document. This item is not displayed when the ADF is not set up.

In the binding margin mode, the margin may be set with the steps of 1 mm in the range of 0 to 30 mm. The binding margin is allowed to designate one location for one document. The length of the binding margin is from the lead end of the paper to the lead end of an image area. The length of the margin in the main scan direction is adjusted by a shift operation by the line buffer in the IPS. The length of the margin is adjusted by shifting the scan timing of the IIT.

d. Edit display and tool display

The edit display consists of four pathways, the marker edit, business edit, free hand edit, and creative edit.

The marker edit pathway and the free hand pathway have choices of extract, delete, color application (mesh-/line/solid), and color change. Further, it has pathway tabs of a basic copy, edit feature, and tool.

The business edit pathway has choices of extract, delete, color application (mesh/line/solid), color conversion, coloring, logotype insertion, and binding margin. Further, the business edit, like the marker edit pathway, etc., has pathway tabs of a basic copy, edit feature, and tool.

The creative edit pathway has choices of extract, delete, color application (mesh/line/solid), color conversion, coloring, logotype insertion, binding margin, nega./posi. inversion, inlay composition, transparency composition, paint, reflected image, repeat, enlargement continuous projection, partial movement, corner/center movement, manual/automatic one-side magnification, color mode, color balance control, page continuous copy, and color composition. Further, the creative edit, like the marker edit pathway, etc., has pathway tabs of a basic copy, edit feature, and tool.

The tool pathway is used by key operators and customer engineers. This pathway is opened by entering a password. Choices of the tool pathway are: an auditron, machine initial value set-up, select of default of the respective functions, color registration, film type registration, fine adjustment of registered color, preset of the respective choices of the machine, setting of a film projector scan area, audio tone (kind of tone and volume), setting of timers for the paper transport system and others (automatic clear, etc.), billing meter, setting of dual languages, diag. mode, max. control value, and memory card format.

The default select is directed for the color mode, paper select, copy density, copy sharpness, copy contrast, paper tray for page programming, color of the single color, color and mesh of a color palette for color application, pattern of a logotype, binding margin, and color balance.

e. Other display controls

In the user interface, progress of the copying operation is constantly monitored. When jamming occurs, the user interface displays the jamming occurrence. In respect to the function settings, an information display for presenting the information of the current display is provided, which is ready for display at all times.

The displays except the bit map area are composed of tiles whose width is 3 mm (8 pixels) and height is 6 mm (16 pixels). The width of each display is 80 tiles and the height is 25 tiles. The bit map area is displayed with pixels and its height is 151 pixels and width is 216 pixels.

As described above, the user interface is arranged such that the functions are categorized into different modes such as the basic copy, edit feature, and edits. The displays are assigned to those modes, and accordingly, the display is changed in accordance with the mode used. The display of each mode presents items of function select, setting of conditions for function exercise, and the like. For exercise a function, a choice is selected by pushing the related soft button. Necessary condition data can be entered while seeing the display. Some of the choices in the menu are displayed in the form of a pop-up display (overlay display or window display). Use of the pop-up display provides a concise and easy-to-see visual presentation, even if the numbers of selectable functions and conditions settings are large. Accordingly, the operability of the copying machine is improved.

(D) Hard Control Panel

The hard control panel, as shown in FIG. 20, is disposed on the right side of the color display panel, and is slightly bent toward the center. The control panel is provided with various buttons of ten keys, ten key clear, all clear, stop, interrupt, start, information, auditron; and language.

The ten key buttons are used to set the number of copies, to enter codes and data, and to enter a password when the tool is used. These buttons are invalid when a job occurs or it is interrupted.

The all clear button is used to return all of the copy modes as are set to the defaults, and to return the displays to the basic copy display except when the tool display is opened. When an interrupt job is being set, the copy mode returns to the default, but the interrupt mode is not removed.

The stop button is used to interrupt the job at a proper place to end in the copy during the execution of copying operation, and to stop the machine after the copied paper is delivered outside. In the diag. mode, it is used to stop (interrupt) the input/output check.

The interrupt button is used to set up an interrupt mode during the primary job except when the job is interrupted, and returns control to the primary job when control is being interrupted. When this button is operated during the execution of the primary job, the machine is placed into a reserve mode, and the job is interrupted or ends at the end of delivering the copied paper.

The start button is used to start the job or to restart the interrupted job. In the diag. mode, it is used to enter and save codes and data, and to start the inputting and outputting the same. When the machine is being preheated, if this button is operated, the machine automatically starts at the end of preheating.

The information button consists of an on button and an off button. These buttons are in a ready state except the progressing of copying operation. When the on button is operated, an information display for the display being currently presented appears. To remove the information display the off button is operated.

The auditron button is used to enter a password at the start of job.

The language button is used to select a desired language of expressions in the display from among a plurality of languages.

The hard control panel is also provided with LEDs (light emitting diodes) for indicating operations of the respective buttons.

(II—5) Film Image Reader

(A) Outline

The film image reader, as shown in FIG. 2, is composed of a film projector (F/P) 64 and a mirror unit (M/U) 65.

(A-1) Film Projector (F/P)

Figure 26:
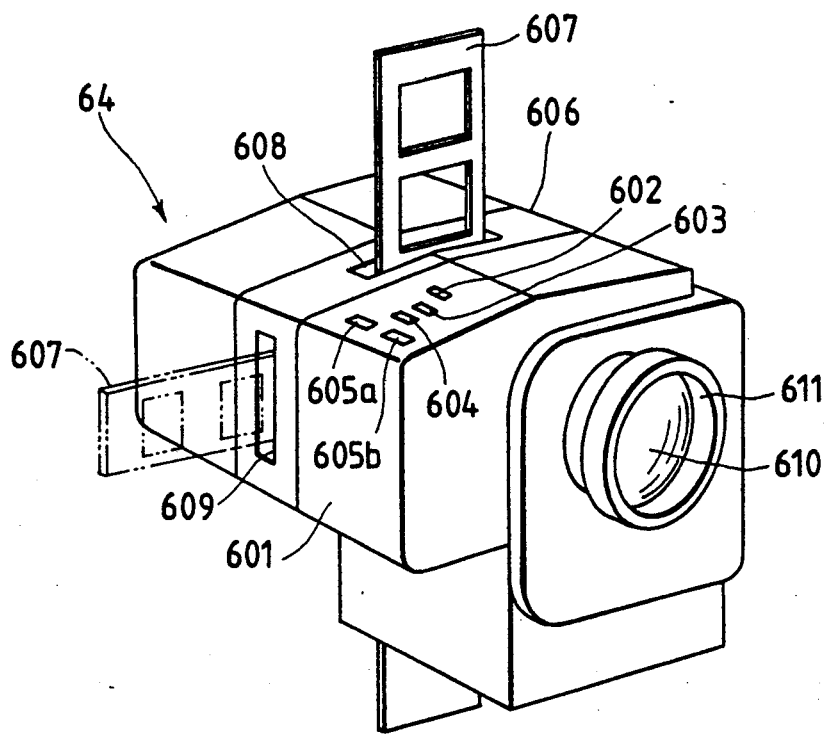
FIG. 26 shows a perspective view of an F/P.

As shown in FIG. 26, the F/P is provided with a housing 601. The housing 601 is further provided with an operation check lamp 602, manual lamp switch 603, automatic focus/manual focus (AF/MF) select switch 604, and manual focus (M/F) operation switches 605a and 605b. The housing 601 is further provided with an open/close member 606 swingable for open and close. Slots 608 and 609 are formed in the upper surface and the side wall of the open/close member 606. A film holder 607 holding an original film 633 is inserted into the housing 601 through either of these slots. In use, these slots are selectively used in accordance with the orientation of the image recorded in the film 633. Slots (not shown) are additionally formed in the bottom surface and the wall opposite to the above. Through these slots, the film holder 607 may be ejected. The open/close member 606 is hinged to the housing 601 or removably mounted to the housing 601. With provision of the open/close member 606 thus mounted, when foreign material enters the housing 601, an operator opens the member 606, and may remove the material.

In this instance, two types of film holders are used, one for the 35 mm nega. film, and the other for the 35 mm posi. film. The F/P 64 accepts these types of films, and further nega. films of 6 cm×6 cm and 4"×5". In the case of the nega. film, in use it is closely placed between the M/U 65 and the platen glass 31.

Figure 29:
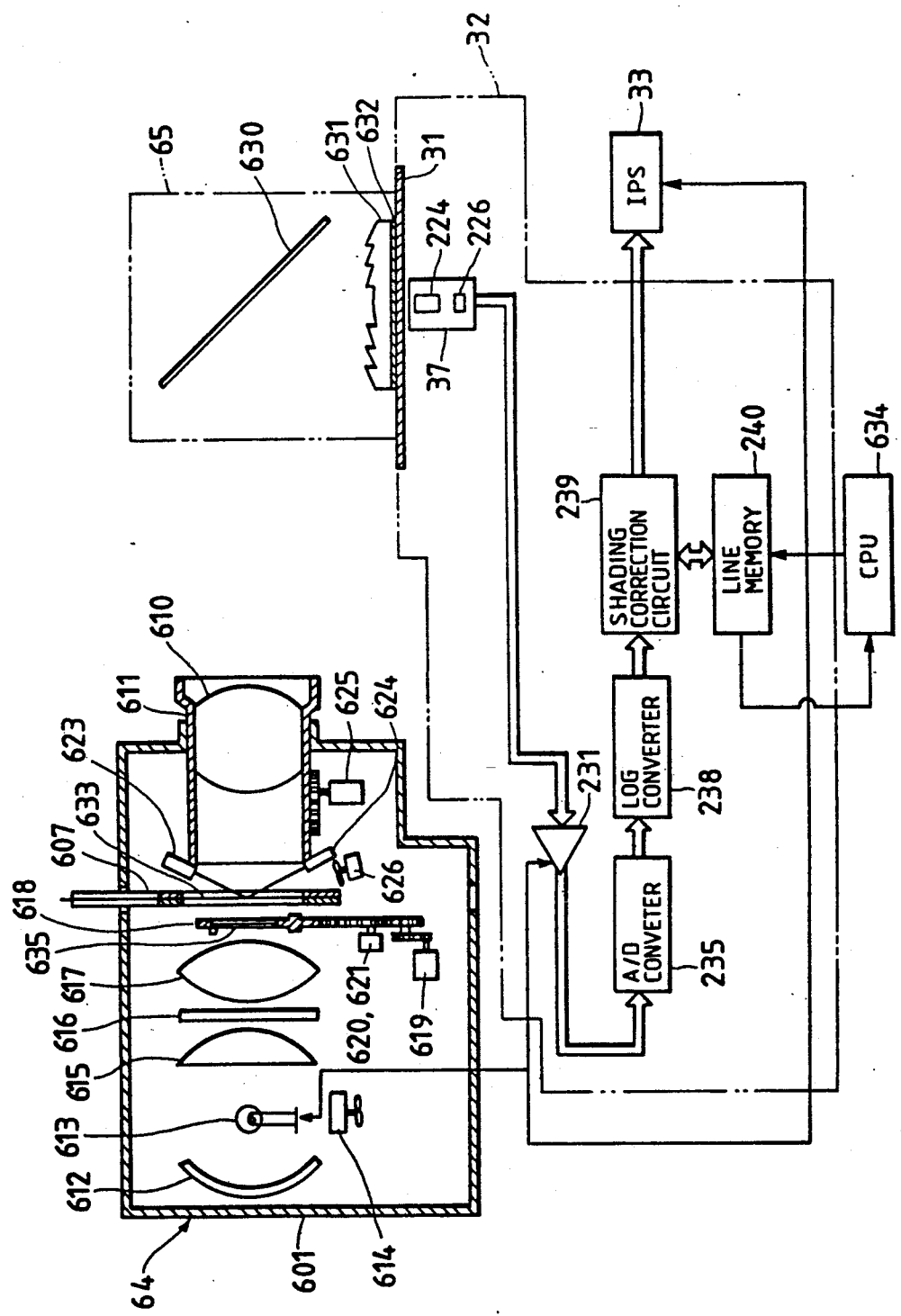
FIG. 29 shows a configuration of the F/P in connection with the F/P, M/U and IIT.

As shown in FIG. 29, a lens holder 611 holding a projection lens 610 is slidably supported in the right portion of the housing 601 as viewed in the drawing.

Within the housing 601, a reflector 612 and a light source lamp 613 such as a halogen lamp is disposed in alignment with the projection lens 610 with respect to an optical axis. A cooling fan 614 for cooling the lamp 612 is disposed near the lamp 613. An aspheric surface lens 615 for converging rays of light from the lamp 613, heat wave absorbing filter 616 for cutting off the light of a predetermined wave length, and a convex lens 610 are disposed on the right side of the lamp 613 and in alignment with the same with respect to the optical axis.

An automatic exchanger for correction filter is installed on the right side of the convex lens 617. The automatic filter exchange includes a correction filter holder 618, motor 619, first and second position sensors 620 and 621, and controller (not shown, but is housed in the F/P 64). The filter holder 618 holds a correction filter 635 for correcting a film density of the 35 mm nega. film and the posi. film. The correction filter illustrated is for one of the two types of films. The motor 619 drives the filter holder 618. The first and second position sensors 620 and 621 are for detecting angular displacements of the filter holder 618. In use, a correction filter corresponding to the original film 633 is automatically selected from those contained in the filter holder 618, and is aligned with the projection lens 610 and other lenses with respect to the optical axis. The automatic filter exchanger 635 may be any other place than the above, if it lies on an optical axis of the projection light, for example between the platen glass 31 and the imaging unit 37.

An automatic focus device is further installed, which is composed of a light emitting means 623 such as a photo diode and a photo sensor 624 that operate in connection with the lens holder 611, and a motor 625 for sliding the lens holder 611 of the projection lens 610 with respect to the housing 601. When the film holder 607 is inserted through the slot 608 or 609 into the housing 601, the original film 633 contained in the film holder 607 is positioned between filter holder 618 and the paired photo diode 623 and photo sensor 624. A fan 626 for cooling the original film 633 is located near the place where the original film 635 is set.

A power supply for the F/P 64 is different from that for the base machine 30, but is installed within the base machine 30.

(A-2) Mirror unit (M/U)

Figure 27:
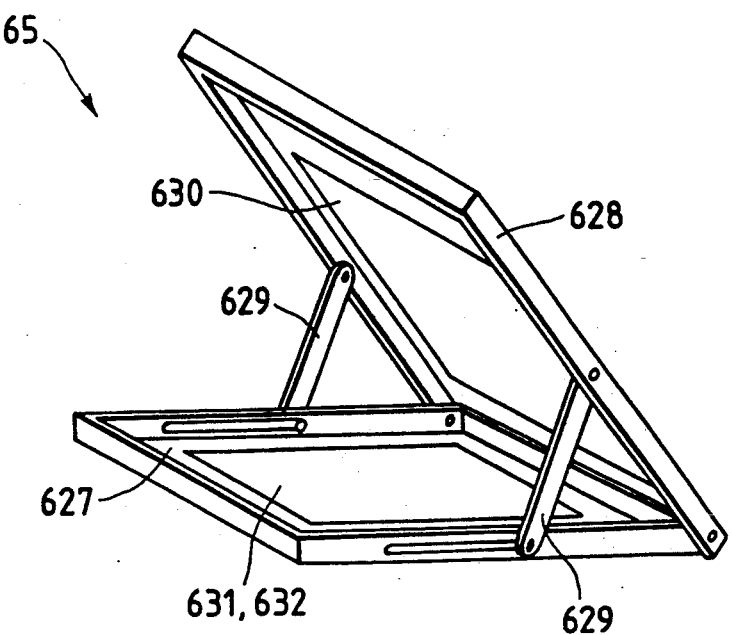
FIG. 27 is a perspective view of an M/U.

As shown in FIG. 27, the mirror unit (M/U) 65 is made up of a bottom plate 627 and a cover 628 swingably mounted at one end of the bottom plate 627. A couple of supports 629 and 629 are coupled between the bottom plate 627 and the cover 628. The paired supports 629 and 629 support the cover 628 left open at 45° with respect to the bottom plate 627 when the bottom plate is maximumly opened.

A mirror 630 is mounted to the rear side of the cover 628. The bottom plate 627 has a large opening which is filled with a fresnel lens 631 and a diffusion plate 632.

As best illustrated in FIG. 29, the fresnel lens 631 and the diffusion plate 632 are formed by a single acrylic plate. The top surface of the acrylic plate constitutes the fresnel lens 631, and the bottom surface constitutes the diffusion plate 632. The fresnel lens 631 converts the light reflected from the mirror 630 that otherwise will spread out, into parallel rays of light, thereby to preventing the peripheral portion of an image from being darkening. The diffusion plate 632 minutely diffuses the parallel rays of light to such an extent as to prevent the line sensor 226 from detecting a shadow of the selfoc lens 224 within the imaging unit 37.

When the color copy using the F/P 64 is not used, the mirror unit 65 is folded and stored in a given storage place. In use, it is opened and placed a predetermined location on the platen glass 31 of the base machine 30.

(B) Major Functions

Major functions of the film image reader are as follows:

(B-1) Automatic exchange of correction filter

The halogen lamp as is generally used as the light source lamp 613 of the F/P 64 has a spectral characteristic of much red (R) and of less blue (B). When, with the light emitted from the halogen lamp, an image on a film is projected, a ratio of red (R), green (G) and blue (B) on the projection light is influenced by the spectral characteristic of the lamp. Therefore, some correction must be applied to the adverse effect by the spectral characteristic when the halogen lamp is used.

A variety of the film recording images exist, such as negative films, positive films, and the negative and positive films per se each consist of many types of films. These films are formed by their own spectral characteristics, respectively. For example, in the case of the negative film, and a transmittance of R is high but a transmittance of B is low. Accordingly, for the negative film, its spectral characteristic must be corrected so as to increase the amount of light of color B.

The F/P 64 is provided with a correction filter effecting such a correction of the spectral characteristic.

In the F/P 64, these correction filters are automatically exchanged. To this end, the automatic filter exchange as already mentioned is used. To be more specific, a microprocessor (CPU) in the system (SYS) issues a 2-bit command signal to set a correction filter corresponding to the original film 633 at a predetermined position. Receiving this, the controller drives the motor 619 so that 2-bit signals derived from the first and second position sensors 620 and 621 coincide with the 2-bit command signal from the CPU. When these signals are coincident with each other, the controller stops the motor 619. When the motor 619 stops, the correction filter corresponding to the original film is automatically set at the predetermined position.

Thus, the correction filter can be exchanged readily and exactly.

(B-2) Original film inserting direction detection

The original film 633 may be inserted into the housing through either of the slots 608 and 609. In other words, in accordance with the orientation of the image of the film, the film may be inserted into the housing vertically or horizontally. In this case, at least one of the slots 608 and 609 is provided with a film detecting switch. In other words, at least one film detect switch is provided. In case that the slot 608 has the film detect switch is provided, and the slot 609 has not the switch, the film holder 607 is inserted through the hole 608, and it detects the film to turn on and produces a detect signal. When the detect signal is present, a necessary area of the line sensor 226 is vertical, that is, the the scanning direction is set to be coincident with the longitudinal direction of the projection image. When the film holder 607 is inserted through the slot 609, the switch is left in off state, and hence produces no detect signal. When the detect signal is absent, the necessary are is lateral, viz., the main scan direction is set to be in the logitudinal direction of the projection image.

Also when in case that film detect switch is provided in the slot 609 alone, or both the slots 608 and 609 have the switches, when the film holder 607 is inserted through the slot 608, the necessary area of the line sensor 226 is set so that the vertical scan direction is in the logitudinal direction of the projection image. When the film holder 607 is inserted through the slot 609, the necessary area of the line sensor 226 is so set that the main scan direction is in the logitudinal direction of the projection image. That is, the on and off signals of the film detect switch are set so as to set up the above operations.

(B-3) Automatic focusing (AF) function

When the film holder 607 is set to the F/P 64, the original film 633 must be positioned with the precision within several tens mm. Therefore, after the original film 633 is set, a focusing operation is required. To manually effect the focusing, an image of the original film 633 is projected onto the diffusion plate 632 of the M/U 65, an operator slides the projection lens holder 611 for focusing, while seeing the projection image. In this case, the image projected onto the diffusion plate 632 is hard to see and therefore, it cannot be expected that an exact focusing is attained.

To cope with this, the F/P 64 is so arranged to automatically focus the projection image when it is set to the F/P 64.

The AF function is exercised by the AF in the following way.

To start, a related key on the display of the U/I 36 is operated to set up an F/P mode. The photo diode 623 emits light. In FIG. 26, the AF/MF select switch 604 is set to the AF side. The AF is ready for operation. As shown in FIG. 29, when the film holder 607 containing the original film 633 is set, the light from the photo diode 623 reflects at the original film 633. The reflected light is detected by the photo sensor 624 of the two element type, for example, for the AF purposes.

The two elements of the photosensor 624 produces signals amounting to the amount of the reflected light, and applies it to a CPU 634. The CPU 634 calculates a difference of these signals. When the difference is not 0, the CPU produces a signal and drives the motor 625 in the direction to reduce the difference. With the rotation of the motor, the projection lens holder 611 slides. With the sliding of the lends holder, the photo diode 623 and the photo sensor 624 both move. When the difference between the signals of the sensors is reduced to 0, the CPU 634 stops the motor 625. The focusing is set up at the stoppage of the motor.

In this way, the AF operation is carried out. As seen from the above, when the film holder containing the original film is loaded into the F/P 64, the focusing is automatically carried out without any assistance of any manual operation. Consequently, the focusing operation is free from trouble some manual operation and failure of copy due to inexact focusing.

(B-4) Manual focusing (MA) function

To exercise this function, the AF/MF select switch 604 is set to the MF side, and the lamp 613 automatically lights up for a predetermined period of time, to set up an MF mode. In this mode, an operator operating the operation switches 605a and 605b while carefully seeing the projection image on the diffusion plate 632. Through the MF, the film image is focused at a specific portion.

(B-5) Manual turn-on of light source lamp

When a manual lamp switch 603 is pushed, the lamp 613 is unconditionally turned on. The switch is not used in normal mode. This is used to make a back lighting for copying an image recorded in a relatively thick original including paper, films, and the like, to see a projection image for a long period of time in the AF mode, and to check as to if the lamp is burnt out.

(B-6) Automatic changing of magnification and scan area

The instant copying machine is so arranged that by setting the paper size by the U/I 36, an optimum paper size is automatically selected. Additionally, when the kind of film used is selected by the U/I 36, a copy area is automatically selected in accordance with the kind of the film.

(B-7) Automatic shading correction

The ROM of the CPU 634 prestores density data of the orange mask of the ASA 100 of each of FUJI (trade mark), KOKAK (trade mark) and KONICA (trade mark) as nega. films. When any of these films is selected the CPU 634 automatically makes the shading correction on the basis of the density data stored in the ROM. In this case, there is no need for loading the base film of that film into the F/O 64. Further, density data of the orange mask of one type of film other than the above three types of films can be recorded. This data is stored into the RAM in the system of the copying machine. The film recorded, like other three types of films, is automatically shading corrected.

(B-8) Automatic image quality adjustment

Corrections, for example, $\Gamma$ correction are performed on the basis of various conditions such as the density characteristic of the original film and exposure conditions at the time film-recording. A density control and a color balance adjustment are automatically carried out.

(C) Image Processing

(C-1) Need and principle of image signal correction

Generally, a density range of a film is broader than that of a document. The density range differs with the type of film. For example, the density range of the positive film is broader than that of the negative film. Further, the density range of film depends on film-recording conditions such as exposure light amount, density of an object to be photographed, and brightness at the time of photographing. Actually, a density of the object is broadly distributed over the entire density range of the film.

When the image recorded in the film with the above density characteristic is copied by a copying machine using the light reflected from the image on the film, if the same signal processing as that for the ordinary document copying is used, the reproduced image is unsatisfactory in quality. To cope with this, correction is applied to the read image signal so as to have proper densities of major objects.

Figure 28:
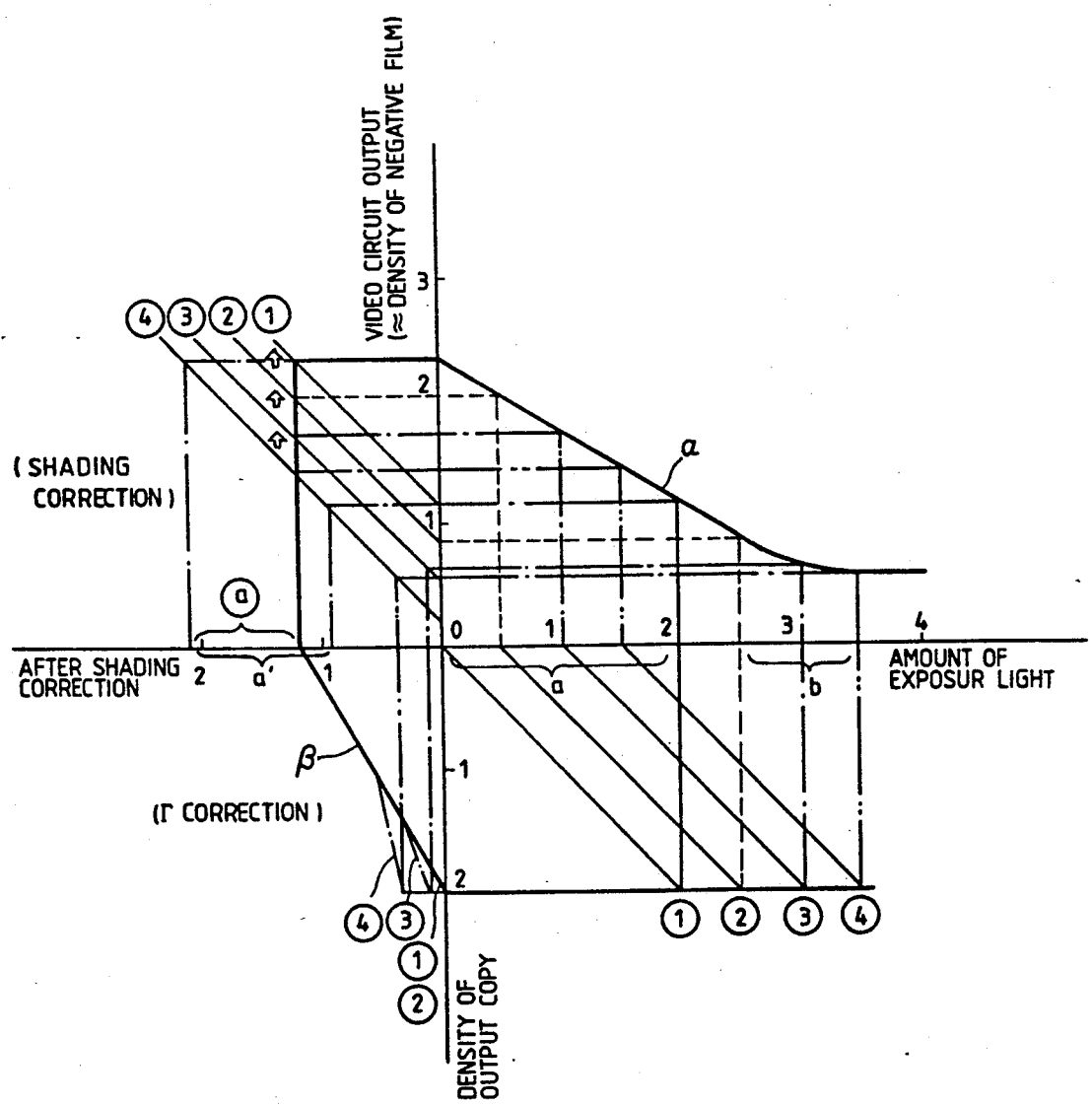
FIG. 28 is a graph showing a density characteristic of a negative film and the principle of correction.

FIG. 28 graphically illustrates the density characteristic of a nega. film and the principle of its density correction. In the figure, the right half of the abscissa represents an amount of exposure light applied to the object (corresponding to a density of the object), and the left half represents a density after the shading correction. The upper half of the ordinate shows video circuit output (approximately equal to a density of a negative film), and the lower half shows a density of the output copy. Thus, the first quadrant shows a density characteristic of a negative film; the second quadrant, shading correction; the third quadrant, $\Gamma$ correction; the fourth quadrant, relationship of exposure light amount vs. density of an output copy.

The density characteristic of the negative film is represented by a line "$\alpha$" in the first quadrant in FIG. 28. As shown, when the amount of the exposure light from the object is large, a density of the negative film is large. As the exposure light amount becomes small, the density of the negative film becomes linearly small. When the amount of the exposure light from the object decreases to a value or less, the linear relationship between the exposure light amount and the density of the negative film is lost. When the exposure light amount is small, contrast problems are created. When an image recorded on the film is a burst, a contrast of the face and hair is lost. Also when the exposure amount is large, if the inclination of the line "$\alpha$", viz. the $\alpha$ value is less than 1, and the correction is not made, the resultant copy is soft.

It is for this reason that the $\Gamma$ correction is needed.

The principle of the $\Gamma$ correction will be described with reference to FIG. 28. As shown, an END curve "$\beta$" is present in the third quadrant. An inclination $\Gamma'$ of the END curve "$\beta$" is selected to be $\Gamma'=1/\Gamma$ in order that a relationship between the amount of exposure light from an object to be copied and the output copy density is expressed by a straight line inclined at 45°.

It is now assumed that in the region "a" where the exposure light amount is relatively large, a density adjustment value set in the register of the shading correction circuit is expressed by a straight line (4). In this case, a density after the shading correction lies in the region "a'". This region "a'" is out of the conversion region by the END curve "$\beta$". Therefore, a portion of the reproduced image corresponding to this region is smeared out with white. To avoid this, the straight line (4) representative of the density adjusting value is shifted to the straight line (1) so that the density after the shading correction falls within the conversion range by the END curve. If the density adjusting value is so set, the relationship between the exposure light amount ant the output copy density traces a straight line (1) in the fourth quadrant. The copies image had a gradational density. In a region "b" where the exposure light amount is relatively small, the relationship between the exposure light amount and the nega. film density loses its linearity. In this case, the density adjusting value of the shading correction circuit is changed to a straight line (4) in the second quadrant. When the exposure light amount lies in the region "b", the following problem can be solved in which, when a person with black hair and wearing a blown hat is copied, densities of the hair and the hat are substantially the same, and the resultant copies image has a good contrast between the hair and the hat.

In this way, the density of the object is corrected to be proper.

(C-2) Method of Image Signal Processing

As shown in FIG. 29, the line sensor 226 reads a projection light of an image on the document film 633 in the form of the amounts of color lights of R, G and B, and produces analog signals representative of them. The analog image signals representing the light amounts are amplified by an amplifier 231 up to preset levels. The amplified image signals are digitized by an A/D converter 235. The digital signals indicative of the light amounts are then converted into signals indicative of densities by a log converter 238.

The density image signals are subjected to the shading correction by the shading correction circuit 239. The shading correction removes from the image the nonuniform of the light amount of the selfoc lens, the variance of the sensitivities of the pixels of the line sensor 226, variances of the spectral characteristics and of the light amounts of the correction filters and the lamps 613, and/or the adverse effects due to aging.

Before the shading correction, reference data is stored into the line memory 240. To effect this, when a document film is selected from amount the three types of films and the registered films, the related correction filter is selected and set to the posi. film filter. The copying machine is operated with the original film 633 being not set. Under this condition, the amount of light from the lamp 613 is read, amplified, digitized, and converted into a density signal. The data based on the density signal thus obtained is stored into the line memory 240, as the reference data. More specifically the imaging unit 37 is step scanned 32 lines for each pixel of R, G and B. The sampled data is transferred through the line memory 240 to the CPU 634. The CPR produces an average density of the sampling data of 32 lines through its calculation. In this way, the shading area is obtained. The averaging of the sampling data eliminates the error for each pixel.

Then, the original film is set, and the image of the original film is read. The CPU 634 calculates a density adjusting value DADj by using the density data of the film as is read out of the ROM, and replaces the DADj value in the register of the LSI in the shading correction circuit 239. Further, the CPU 634 adjusts the amount of light of the lamp 613 and the gain of the amplifier 643 in accordance with the selected film.

The shading correction circuit 239 adds the DADj value to the actual data obtained by reading the original film, and shifts the read shift value. The shading circuit 239 subtracts the shading data of each pixel from the adjusted data, thereby to effect the shading correction.

For copying the films that are not stored in the ROM of the CPU 634 and in the RAM of the system, a base film is set to collect the density data of the film, and a DADj value must be calculated on the basis of the collected density data.

After the shading correction, the IIT 32 transmits density signals of R, G and B to the IPS 33.

The CPU 634 selects the END curve on the basis of the actual data of the original film, and produces a correction signal for the F correction on the basis of the selected curve. The IPS 33 exercises the F correction to remove the poor contract problem due to the nonlinearity characteristic and the fact that the $\Gamma$ of the original film is not 1.

(D) Operation procedure and signal timing

Figure 30:
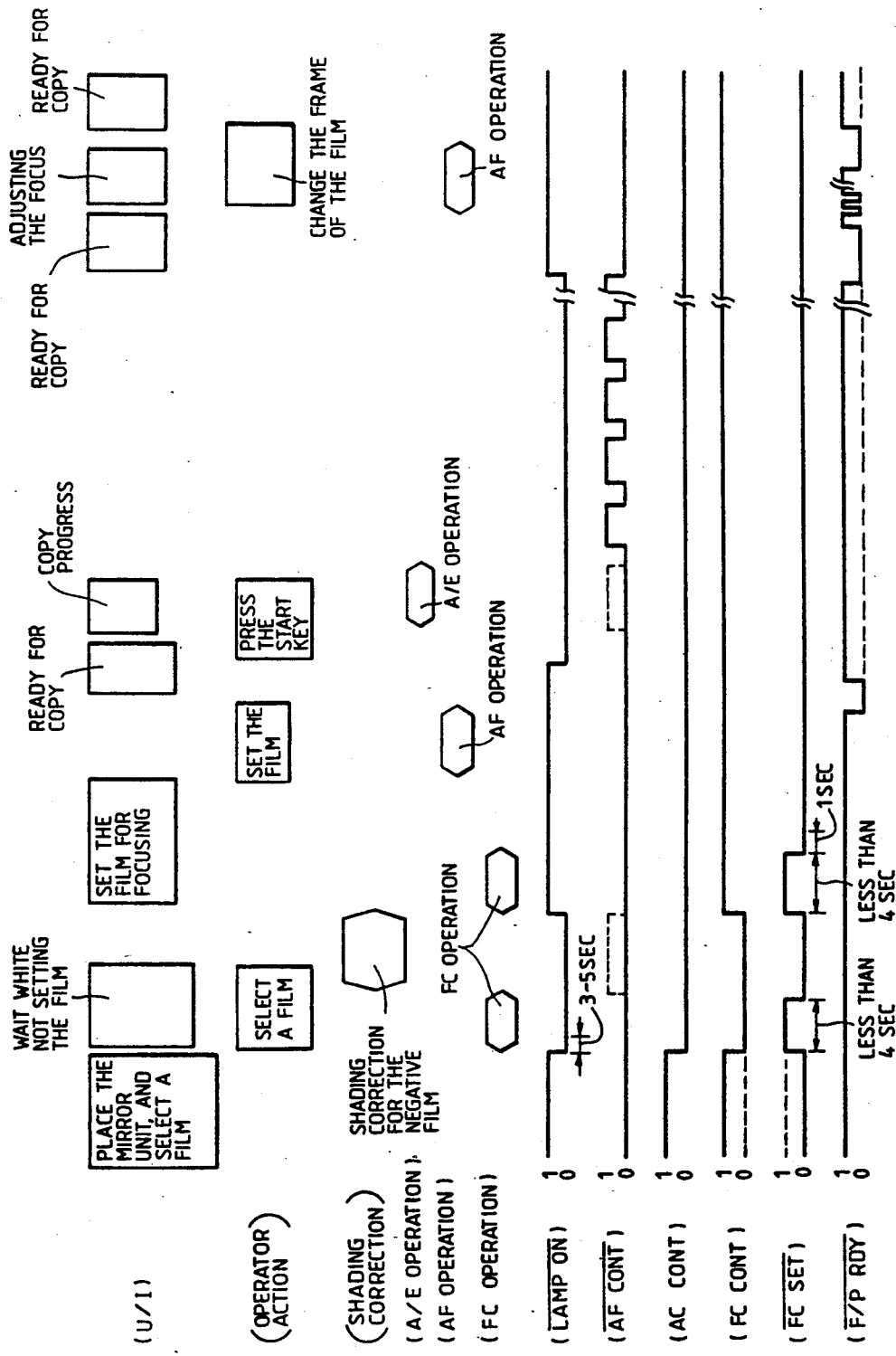
FIG. 30 shows an operation procedure and a timing chart of the operation.

The operation procedure and signal timing will be described with reference to FIG. 30. In the figure, broken lines indicating signals indicate that the signals indicated by the broken lines may be used.

The operation of the F/P 64 is executed by the U/I 36 of the base machine 30. Specifically, by operating the F/P operation key displayed on the U/I display, the base machine 30 is placed into the F/P mode. It is assumed now that the original film is any of the three types of films and the registered films. As shown in FIG. 30, the display of the U/I 36 presents a message "Place the mirror unit, and select a film". After seeing this, an operator opens the M/U 65, and sets it at a position preset for use on the platen glass 31.

When the film select key is touched, a message "Wait while not setting the film". At the same time, the lamp 613 lights up, and the correction filter control (FC CONT) signal becomes (0, 0), and the FC operation starts. More specifically, the automatic filter exchanger operates to set the posi. correction filter at a preset position. When the correction filter is set, a correction filter exchange end signal ($\overline{\text{FC SET}}$) goes LOW.

When the $\overline{\text{FC SET}}$ signal goes LOW and after 3 to 5 seconds elapse from the lighting of the lamp 613, the shading data collection starts for shading correction. After the shading data collection ends, the $\overline{\text{FC SET}}$ signal goes (0, 1) in logical state, and the automatic filter exchanger starts to operate and set the film correction filter at the preset position. With trigger of the shading correction, the display presents a message "Set the film for focusing". At this time, the lamp 613 lights off. After seeing this message, the operator loads the film holder 607 containing the document film 633 into the F/P 64. The light from the photo diode 623 is reflected by the film, and the reflected light is received by the photo sensor 624.

When the difference between the amounts of the received lights by the two elements of the photo sensor 624 is not 0, the motor 625 of the AF unit operates for focusing. That is, the AF operation is performed. After the focusing operation, an F/P ready ($\overline{\text{F/P RDY}}$) signal goes LOW. Following this, the $\overline{\text{FC SET}}$ signal goes LOW, and after one minute, the display presents a message "Ready for copy". When the start key of the U/I 36 is pushed, the display gives a message "Copy progresses". The lamp 613 lights on. When the lamp settles down in lighting, the collection of data for the automatic density adjustment starts. Specifically, the imaging unit 37 scans the film one time to read a part or the entire of the projection image, for density adjustment, color balance adjustment, and Γ correction.

In the full color mode, the imaging unit scans four times for copying operation. In this case, the shading correction and the density adjustment are carried out the basis of the shading data and the automatic density adjustment data. When the copy operation ends, the lamp 613 lights off and the display displays a message "Ready for copy". Accordingly, a new copy may be made by operating the start key. To copy another image, another frame of the film is set. When the frame of the film is changed, the $\overline{F/P\ RDY}$ signal goes HIGH, and the display gives a message "Adjust the focus". When the new frame is set, the AF operation is performed. At the same time, the signal $\overline{F/P\ RDY}$ goes LOW, and a message "Ready for copy" is displayed. Then, the start key is pushed and the copying operation starts.

(III) IMAGE INPUT TERMINAL (IIT)

(III—1) Imaging Unit Drive Mechanism

Figure 31:
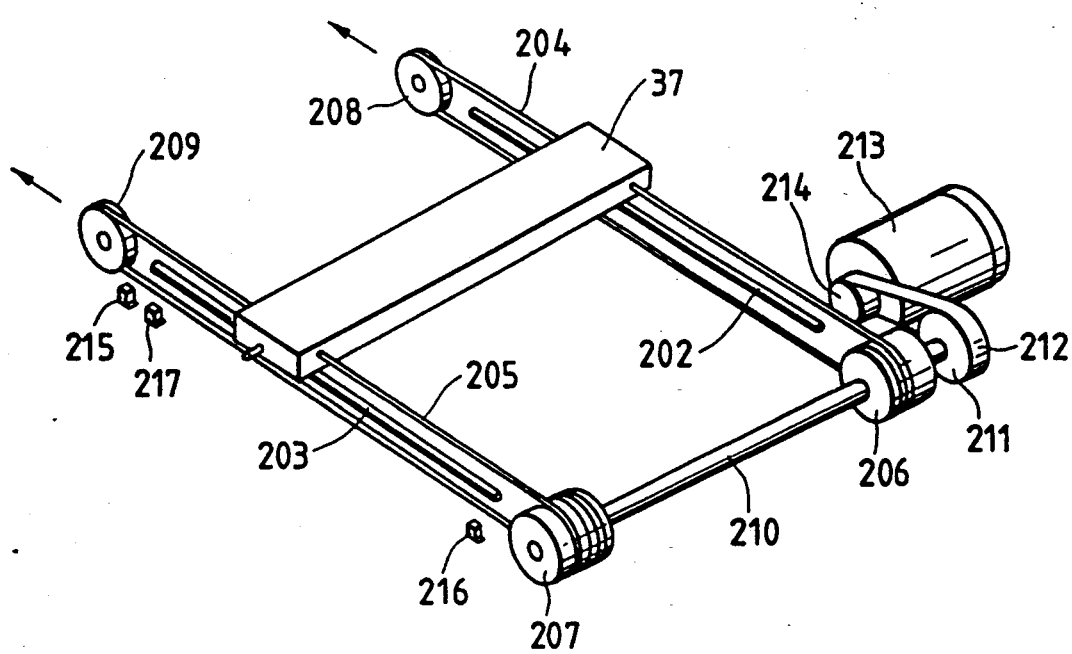
FIG. 31 is a perspective view showing an original scanning mechanism.

In FIG. 31 perspectively showing an imaging unit drive mechanism used in the color copying machine according to the present invention, the imaging unit 37 is removably placed on a pair of slide shafts 202 and 203, and the both ends of the imaging unit 37 is fixed to wires 204 and 205. These wires 204 and 205 are wound around drive pulleys 206 and 207 and tension pulleys 208 and 209, respectively. The tension pulleys 208 and 209 are pulled in the direction of arrows. The paired drive pulleys 206 and 207, and a reduction pulley 211 are mounted to a drive shaft 210, as shown. The reduction pulley 211 is connected to an output shaft 214 of a stepping motor 213 through a timing belt 212. Limit switches 215 and 216 are sensors for sensing an excessive movement of the imaging unit 37. A regi. sensor 217 senses a document read start position.

To make a sheet of 4-pass color copy, the imaging unit 37 must repeat the scan four times. It is an important problem to reduce an out-of-synchronization of the scan and a displacement from the document read start position in the four-time scan. In order to solve the problem, servo motor is used, it is necessary to minimize a variation of the stop position of the imaging unit 37, a variation of the time taken for the imaging unit 37 to travel from the home position to the regi. position and a variation of the scan speed. That is the reason why the stepping motor 213 is used.

Figure 32:
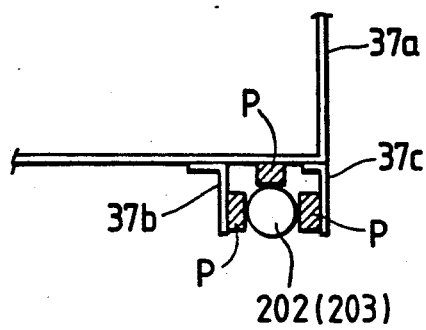
FIG. 32 shows a sectional view of a major portion of FIG. 31.

The instant embodiment employs an assembly consisting of steel plates sandwiching a vibration deadening material for the frame supporting the document scanning mechanism. With this assembly, when a vibration is generated by the motor and transferred to the frame, it will never resonate with the frame, thereby to limit the vibration and to suppress generation of noise. An oil immersed pad P supported by an angle plate 37b and a plate spring 37c is disposed between the housing 37a of the imaging unit and the slide shaft 202 (203), as shown in FIG. 32.

(III—2) Control System for the Stepping Motor

Figure 33A:
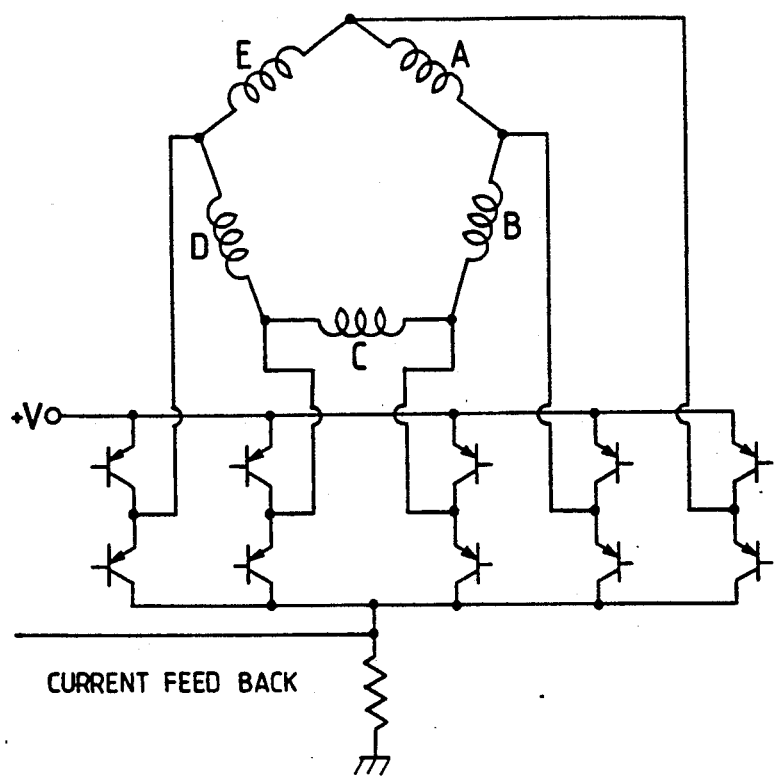
FIG. 33(a) shows circuit arrangement of a drive circuit of a stepping motor.
Figure 33B:
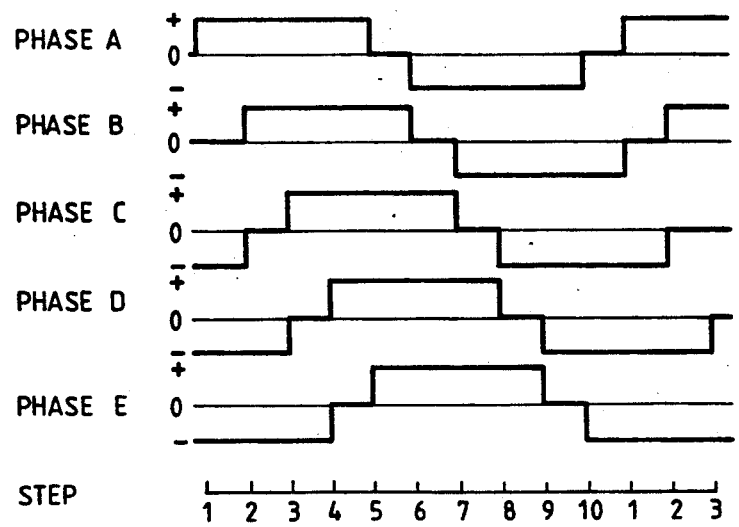
FIG. 33(b) shows an exciting sequence.

FIG. 33(a) shows a drive circuit of the stepping motor 213. The stepping motor 213 is arranged such that a motor winding is wired in a pentagon fashion, its connection points are connected through pairs of transistors to the positive and the negative terminals of a power supply. The motor is driven in a bipolar mode using ten transistors. The motor current is fed back so as to make the current supplied to the motor constant. In the exciting sequence, as shown in FIG. 33(b), when the four phases are excited, the remaining one phase is set at the positive or negative equal potential.

Figure 34A:
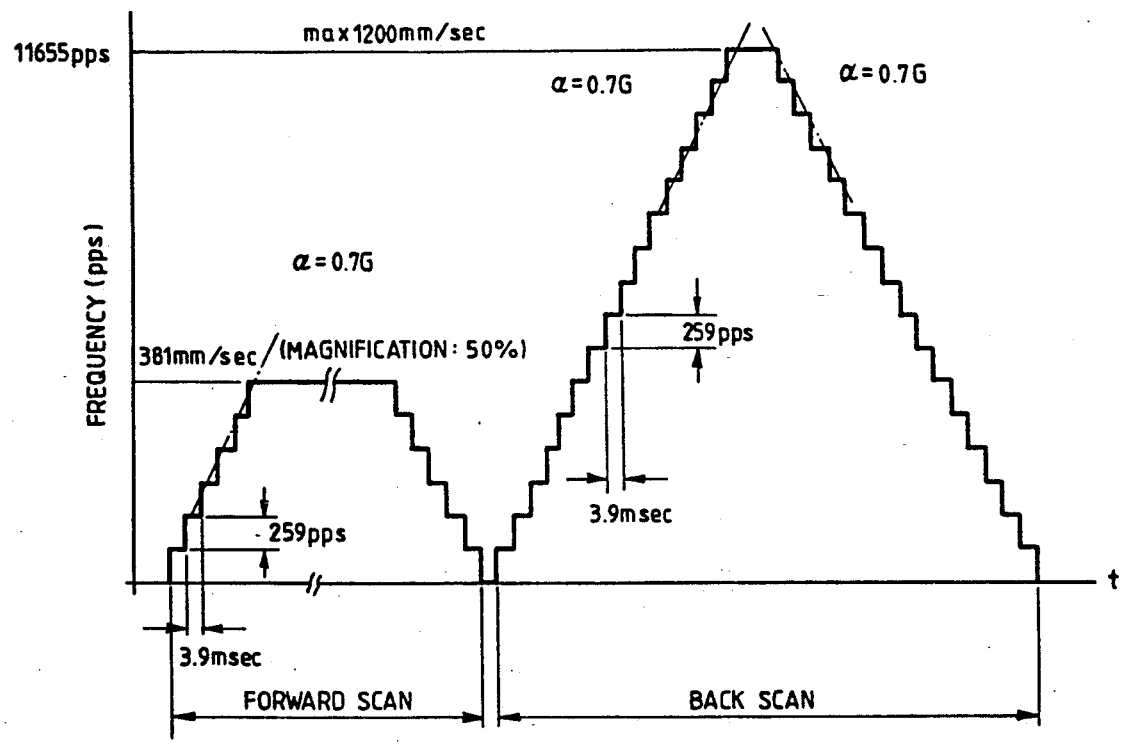
FIGS. 34(a) and 34(b) show diagrams for explaining a scan cycle by the imaging unit.
Figure 34B:
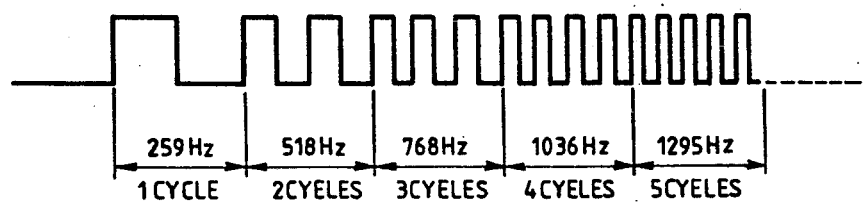

FIG. 34(a) shows a scan cycle of the imaging unit 37 driven by the stepping motor 213. More specifically, the figure also shows a relationship between a speed of the imaging unit 37, viz., a frequency of a signal applied to the stepping motor, and time, when the imaging unit executes a forward scan and a back scan at the 50% magnification, or the maximum speed. In an acceleration mode, as shown in FIG. 34(b), the frequency is increased up to approximately 11 to 12 kHz with the steps of 259 Hz. Putting a rule into a train of pulses makes the pulse generation easy. A trapezoidal profile of speed variation is formed by increasing the signal frequency at the rate of 259 pps/3.9 ms (FIG. 34(a)). A rest period the forward scan and the back scan. During this rest period, a vibration in the IIT mechanism system settles down, and the synchronization of the imaging unit operation with the image outputting in the IOT is secured. In the instant embodiment, the scanning cycle time is reduced by using an acceleration of 0.7 G that is larger than that of the conventional machine.

Figure 35A:
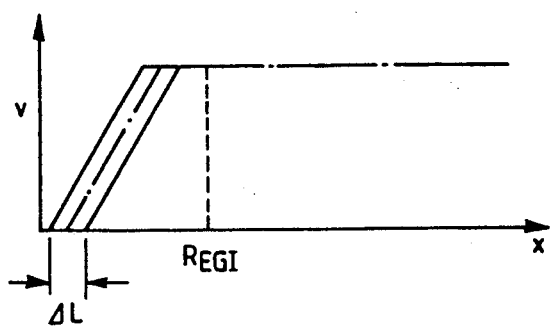
FIGS. 35(a) to 35(c) show explanatory diagrams for explaining the cause of the color displacement in the color copy.
Figure 35B:
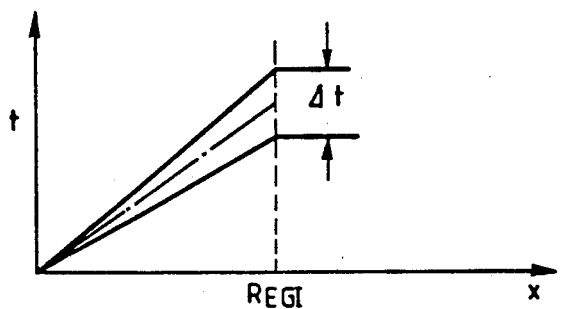
Figure 35C:
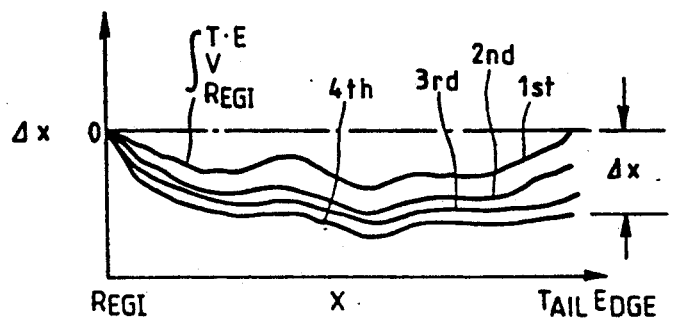

In reading a color document, asynchronization and/or the out-of-registration of the imaging unit, which would occur during the four scanning operations, will cause color displacement. FIGS. 35(a) to 35(c) show diagrams useful in explaining the color displacement. FIG. 35(a) shows the fact that the imaging unit after scanned stops at a position displaced by ΔL from a correct stop position. In this case, in the subsequent scanning, the time for the imaging unit to reach the regi. position is different from the correct time, so that the subsequent colors will be successively and accumulatedly printed at locations on a paper which are displaced from correct locations. In the case of FIG. 35(b), with a transient vibration of the stepping motor (speed fluctuation till the motor speed settles down at a steady speed) during the 4-scan period, the time taken for the imaging unit to reach the regi. position becomes different from a predetermined time, and consequently causes a color displacement. FIG. 35(c) shows different variations of the constant speed scan characteristic of the imaging unit between the regi. position and the tail edge when the imaging unit is moved for scanning four times. As seen, the speed of the imaging unit in the first scan greatly varies than that in the second to fourth scans. For this reason, the instant color copier is designed so that the toner color Y of which displacement is indistinctive is developed for the first scan.

The color displacement may be caused by mechanical instable factors, such as aging of the timing belt 212, wires 204 and 205, viscosity resistance existing between the slide pad and the slide rails 202 and 203.

(III—3) Imaging Unit

Figure 36:
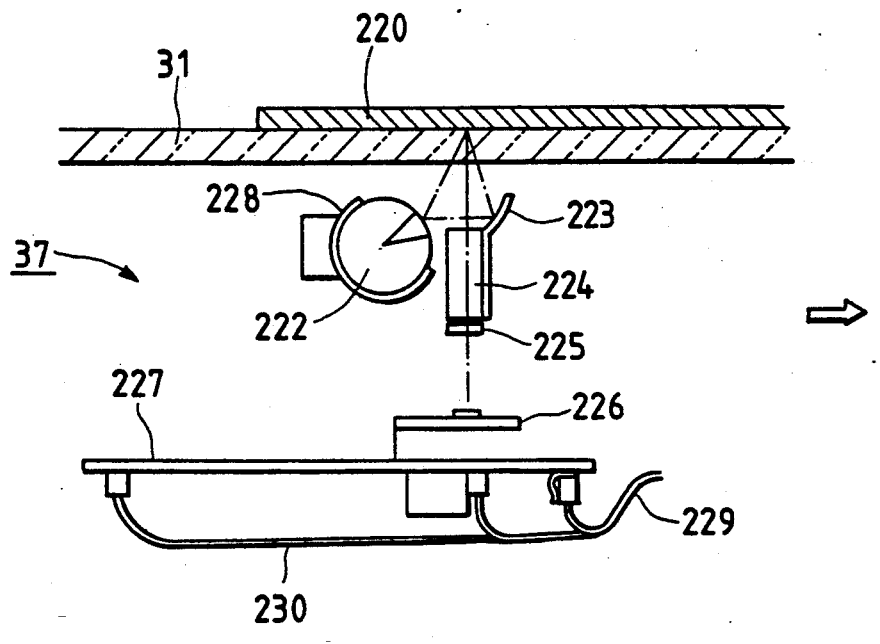
FIG. 36 is a sectional view showing an imaging unit.

FIG. 36 shows a sectional view of the imaging unit 37. An original 220 is set on the platen glass 31, with its image surface facing down. The imaging unit 37 moves under the platen glass in the direction of arrow. Throughout the movement of the imaging unit, the image surface of the original placed on the platen glass is illuminated with the combination of a daylight fluorescent lamp 222 and a reflecting mirror 223. The light reflected from the original 220 passes through a selfoc lens 224 and a cyan filter 225 and forms a normal equal-size image on the light receiving surface of a CCD sensor array 226. The selfoc lens 224 is a compound eye lens consisting of four rows of fiber lens. This lens is bright and has a high resolution. This lens is advantageous in that a power consumption of the light source is reduced and the imaging unit is made compact. The imaging unit 37 is provided with a circuit board 227 containing a CCD line sensor drive circuit, a CCD line sensor output buffer circuit, and the like. In the figure, reference numeral 228 designates a lamp heater; 229 a flexible cable for the illumination power source; 230 a flexible cable for control signals.

Figure 37:
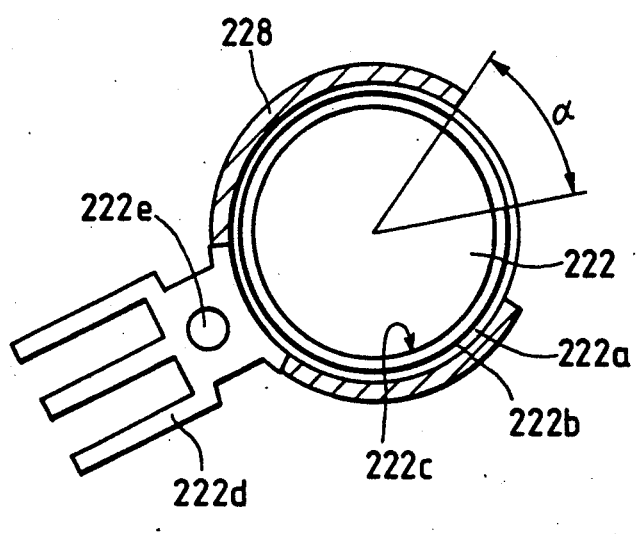
FIG. 37 shows a sectional view of a fluorescent lamp.

FIG. 37 illustrates the details of the fluorescent lamp 222. A reflecting film 222b is formed over the inner surface of a glass tube 222a except the surface portion as defined by an aperture angle "a" (about 50°). A fluorescent film 222c further lies on the surface of the reflecting film. With this structure of the lamp, the light of the lamp 222 can be effectively projected to the original and the electric power is saved. The structure that the fluorescent film 222c is applied to the entire inner surface of the lamp and that the reflecting film 222b is formed on the inner surface except the portion defined by the aperture angle was employed for reducing the peaks of emission lines of mercury. In this case, the light emitted from the lamp is reduced somewhat. A lamp heater 228, and a heat sink (radiating member) 222d are disposed on the outer surface of the lamp 222. A thermistor 222e provided gathers temperature data for controlling the lamp heater 228 and the cooling fan.

Figure 38A:
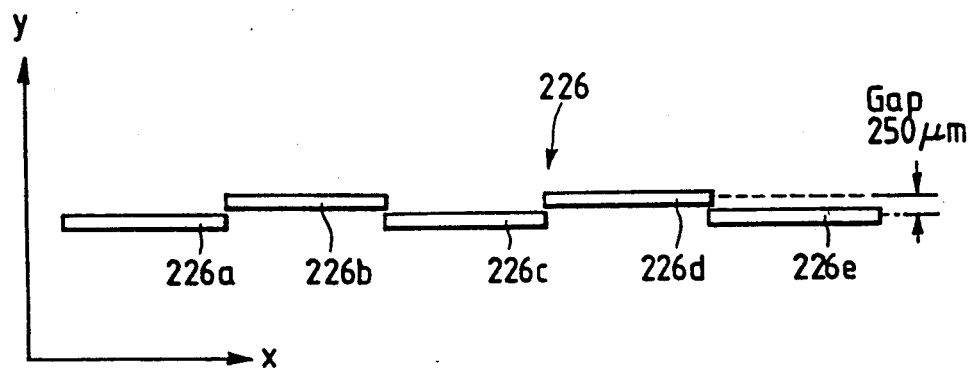
FIG. 38(a) shows a layout of CCD line sensors.

FIG. 38(a) shows a configuration of the CCD line sensor array 226. As shown in FIG. 38(a), five CCD line sensors 226a to 226e are laid out in a zig-zag fashion in the main scan direction X. The reason why such a layout of the CCD sensors is used is that it is difficult for a single CCD line sensor to array a number of photo detecting elements without any drop of element and to obtain a uniform sensitivity, and that when a plurality of CCD line sensors are arrayed in a line, it is difficult to form pixels in the CCD line sensor up to both end portions, and hence light insensitive portions are present in the CCD sensor.

Figure 38B:
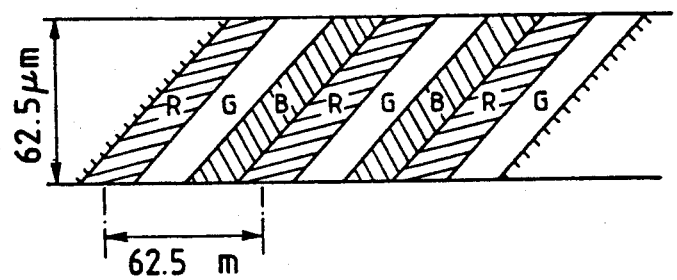
FIG. 38(b) shows a layout of color filters.

As shown in FIG. 38(b), in the sensor portion of the CCD line sensor array 226, trios of color filters R, G and B are laid repeatedly in this order, and the adjacent three bits form one pixel at the time of reading. When a read pixel density of each color is 16 dots/mm and the number of pixels of each chip is 2928, the length of one chip is: 2928/(16×3)=61 mm and hence a total length of five chips is: 61×5=305 mm. Accordingly, a CCD line sensor of the equal-size type capable of reading an original of A3 can be obtained. The respective pixels of R, G and B are slanted by 45°, to reduce moire.

When a plurality of CCD line sensors 226a to 226e are disposed in a zig-zag fashion as in the above case, the adjacent CCD line sensors scan different portions on the original surface. When the original is scanned by moving the CCD line sensors in the vertical scan direction Y orthogonal to the main scan direction X, there is a time lag between the signals derived from the CCD line sensors 226b and 226d of the first row that precedingly scan the original and the signals derived from the CCD line sensors 226a, 226c and 226e of the second row that succeedingly scan the original. The time lag corresponds to a difference between the positions where the CCD line sensors of the first and second rows are located.

To obtain a continuous signal of one line from the image signals dividedly read by the plurality of CCD line sensors, the signals from the first row CCD line sensors 226b and 226d that precedingly scan the original are stored, and the stored signals must be read out in synchronism with the outputting of the signals from the second row CCD line sensors 226a, 226c and 226e that scan the original succeeding to the first row CCD line sensors. In this case, if the position difference is 250 μm and the resolution is 16 dots/mm, a delay of 4 lines is required.

In the image reader, the reduction/enlargement is carried out in such a manner that increase and decrease processings and other processings in the video circuit are used for the reduction/enlargement in the main scan direction, and that the increase or decrease of the moving speed of the imaging unit 37 are used for the reduction/enlargement in the vertical scan direction. Accordingly, the resolution in the vertical scan direction is changed by changing the moving speed of the imaging unit 3, while the reading speed (the number of read lines per unit time) of the image reader is fixed. If the resolution is 6 dots/mm at the 100% magnification, the magnification percentage, speed, resolution and the number of zig-zag correction lines are as shown in the following table.

| Magnification % | Speed times | Resolution dots/mm | No. of zig-zag correction lines |
| --- | --- | --- | --- |
| 50 | 2 | 8 | 2 |
| 100 | 1 | 16 | 4 |
| 200 | ½ | 32 | 8 |
| 400 | ¼ | 64 | 16 |

Figure 39:
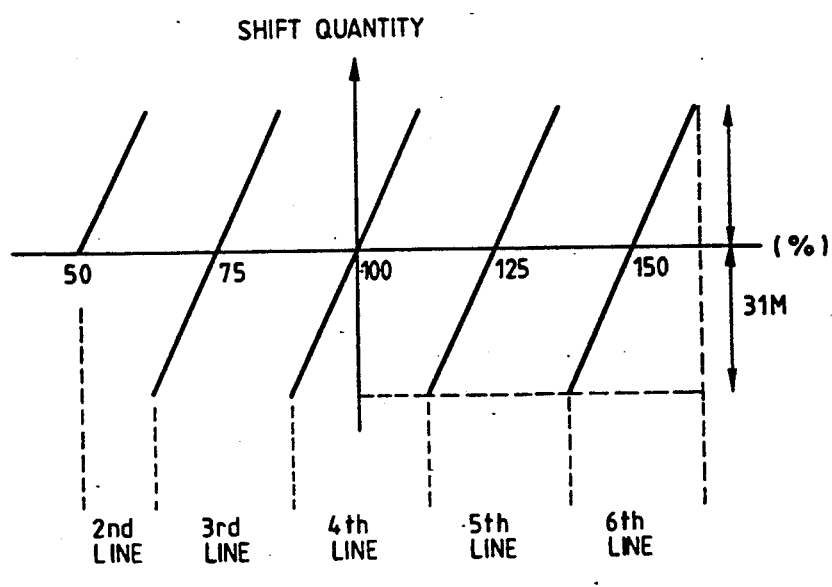
FIG. 39 shows a relationship between the magnification vs. read displacement.

As seen from the above table, as the magnification percentage increases, the resolution increases, and hence the number of necessary line memories for correcting the difference of 250 μm in the zig-zag layout of the CCD line sensors is also increased. FIG. 39 shows a relationship between a shift quantity vs. magnification. Correction of one line is made every one-pixel displacement by the change of the magnification. A shift quantity of at most 31 μm of is generated every one-line correction. This figure, however, is negligible in practical use.

(III—4) Video signal Processing Circuit

Figure 40:
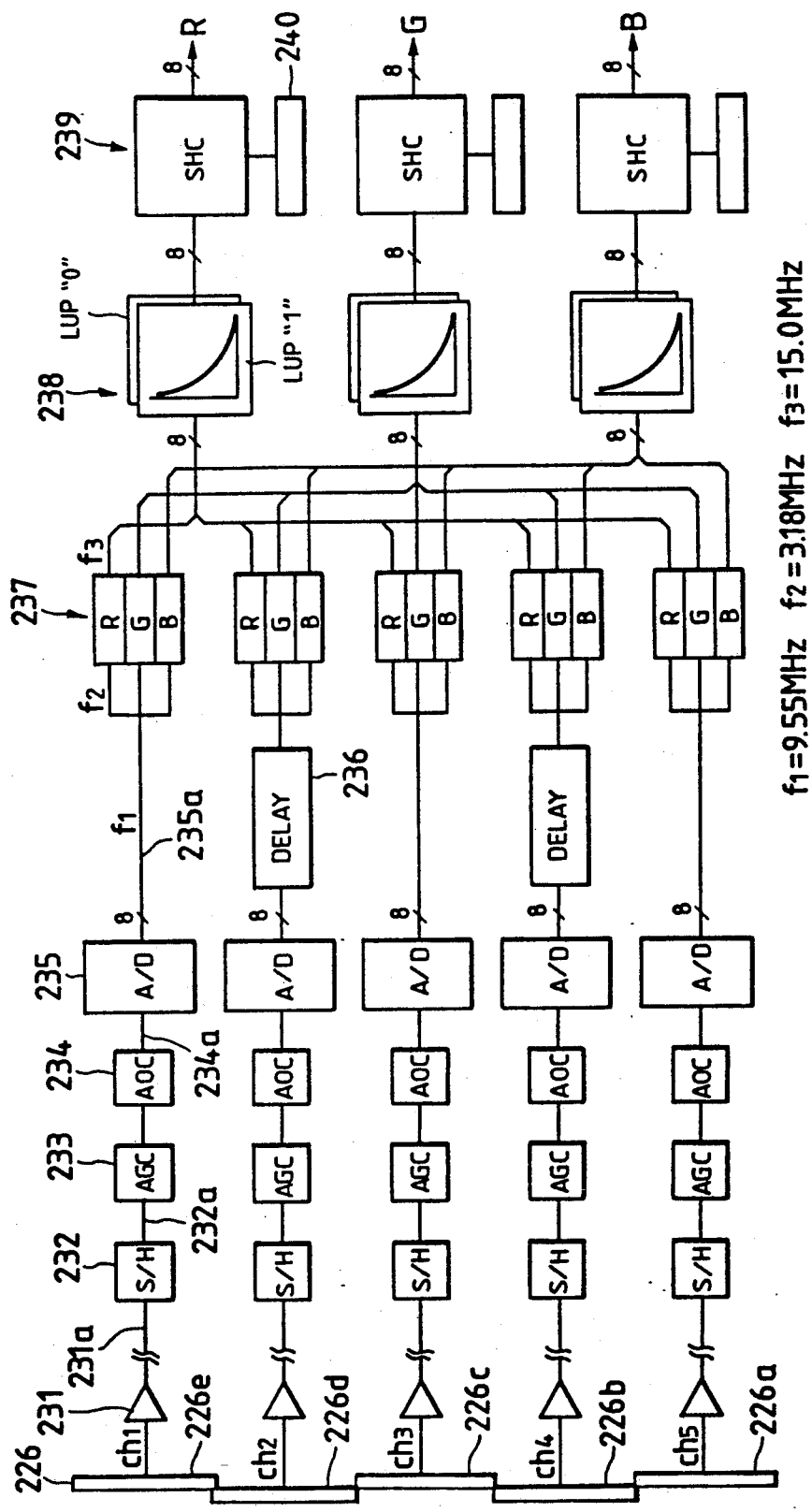
FIG. 40 is a block diagram showing a video signal processing circuit.

Description to be given below with reference to FIG. 40 is elaboration of a video signal processing circuit for reading a color original form each trio of colors, R, G and B in terms of reflectivity signals by using the CCD line sensor array 226, and the reflectivity signal is converted into a digital signal as a density signal.

Figure 41:
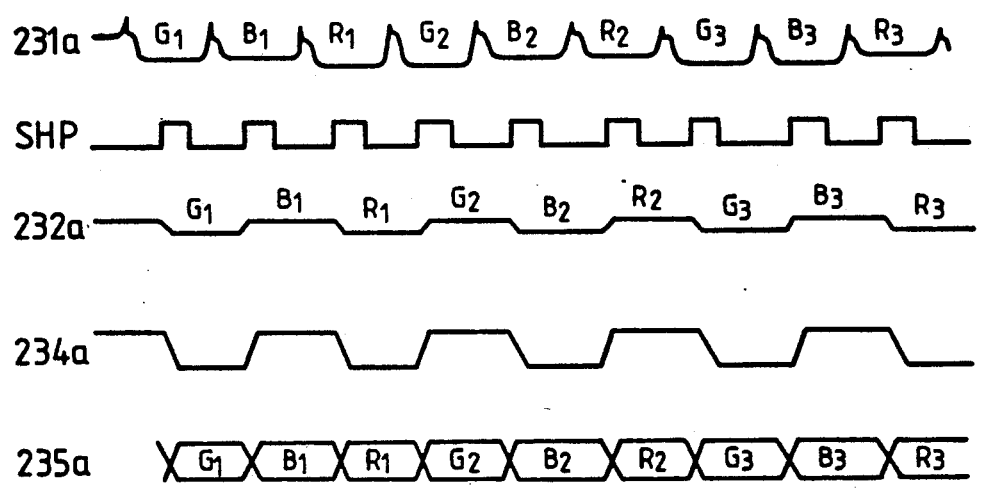
FIG. 41 shows output waveforms of the video signal processing circuit.

An image of an original is ready by using the CCD line sensor array 226 consisting of five CCD line sensors in the imaging unit 37. In the image reading, the CCD line sensor array divides the original image into five portions and reads these portions through five channels. Further, in reading the segmented image, the image light reflected from the image is separated into trios of colors R, G and B. The color signals (in a channel typically used for ease of explanation) are amplified to a predetermined level by a amplifier 231. The amplifier color signals are transmitted to the circuit of the base machine through a transmission cable connecting the imaging unit to the base machine (FIG. 41, 231a). Then, in a sample hold circuit SH232, by a sample hold pulse SHP, noise of the color signals is removed and wave shaped (FIG. 41, 232a).

Figure 42:
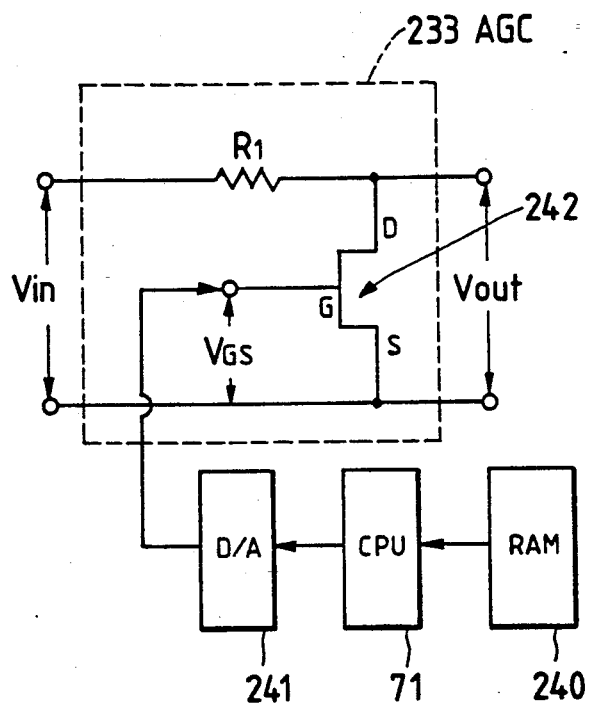
FIG. 42 shows a circuit diagram of an AGC circuit.

An automatic gain control (AGC) circuit 233 amplifies the output signal of each sensor to an amplitude comparable with the input signal range of the A/D converter 235. This control is called a white level adjustment. To this end, reference data of white is collected by each sensor before reading of the original data, is digitized, and is stored into the shading RAM 240. The data of one line is compared with preset reference data in the CPU 71, as shown in FIG. 42. A digital value providing a gain as predetermined is converted into an analog signal by a D/A converter 241, and is applied to the AGC 233. In this way, its gain is changed in 256 steps. The AGC 233 has a voltage control type variable resistive element 242. A drain-source resistance $R_2$ is the resistive element 242 is changed by controlling the gate voltage $V_{GS}$ of the element. The gain is given by the following equation.

$$V_{OUT}/V_{IN} = R_2/(R_1+R_2)$$

Figure 43:
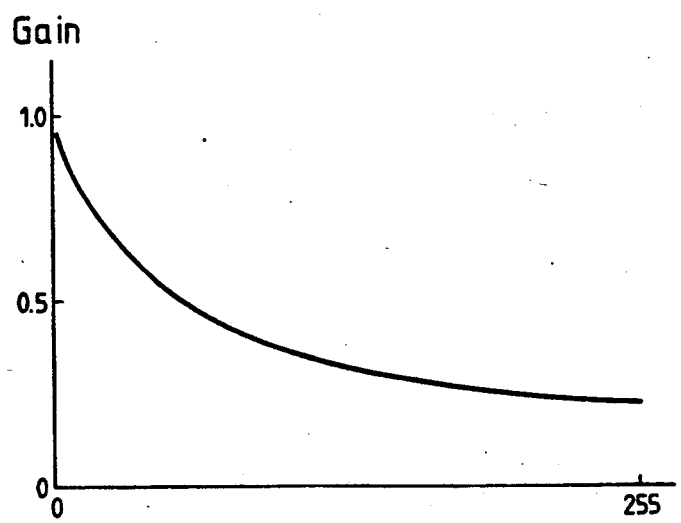
FIG. 43 shows a relationship between the digital gain set value vs. gain.

By the gate voltage $V_{GS}$ as an analog voltage derived from the D/A converter 241, the AGC233 varies the gain in 256 steps, as shown in FIG. 43.

Figure 44:
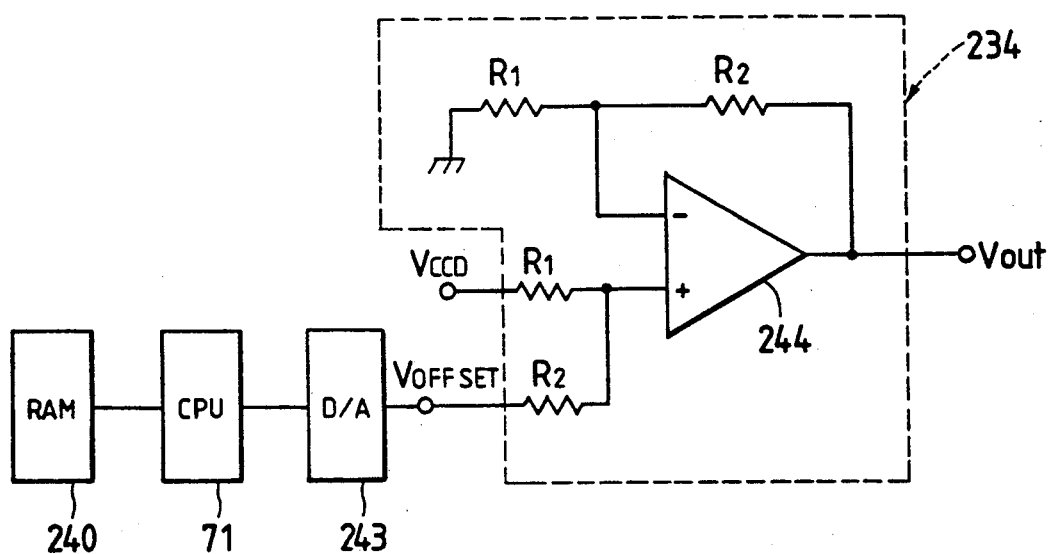
FIG. 44 shows a circuit diagram of an AOC circuit.

An automatic offset control (AOC) circuit 234 controls a dark voltage outputted from each sensor. This control is called a black level adjustment. For the adjustment, the fluorescent light is turned off, and under this condition, the output voltage of each sensor is measured. These output voltages are digitized and stored into the shading RAM 240. The data of one line as read out is compared with a predetermined reference value by the CPU 71, as shown in FIG. 44. An offset value is outputted to a D/A converter 243. The AOC circuit 234 contains an operational amplifier 244. The noninverting terminal of the operational amplifier is coupled with the video signal $V_{CCD}$ and the offset value $V_{OFFSET}$ derived from the D/A converter 243, through resistors $R_1$ and $R_2$ respectively. The output voltage of the AOC is $$V_{OUT} = (R_2/R_1) V_{CCD} + V_{OFFSET}$$

Figure 45:
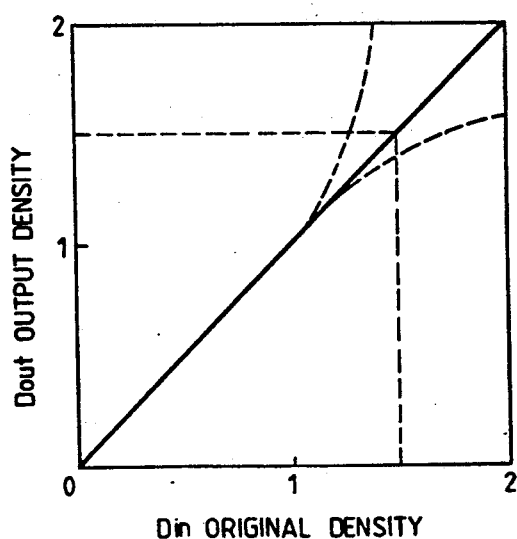
FIG. 45 is a graph showing a relationship between the sensor output density vs. original density.

The AOC amplifies the video signal at a fixed magnification and at the same time is capable of adjusting the offset voltage in 256 steps. The output voltage is outputted with a variation as shown in FIG. 41, 234a. Finally, as shown in FIG. 45, for a density of an original to be read, an output density is controlled so as to set at a predetermined density.

The data thus digitized by the A/D converter 235 (FIG. 41, 235a) is outputted in the form of a stream of 8-bit data of GBRGBR .... A delay circuit 236 is a memory of the FIFO type capable of storing the data of a plurality of lines. The delay circuit 236 stores the data signals derived from the preceding scan, 1st row CCD line sensor 226b and 226d, and outputs the data in synchronism with the outputting of the data signals from the succeeding scan, 2nd row CCD line sensors 226a, 226c and 226e.

Figure 46A:
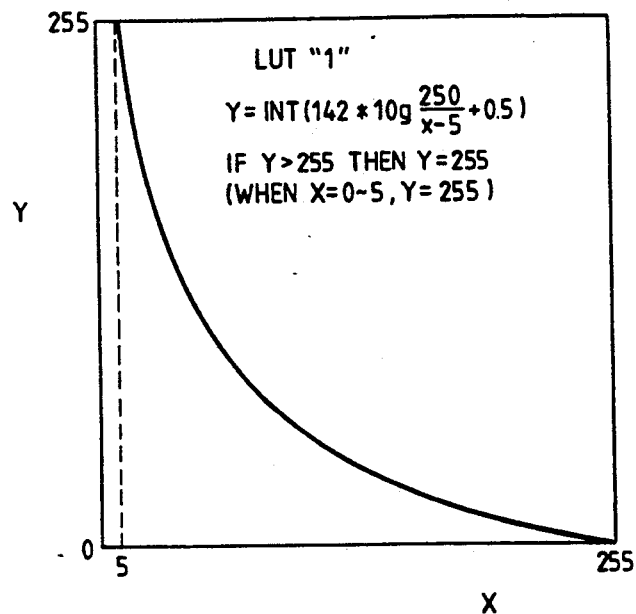
FIGS. 46(a) and 46(b) show conversion tables.

A separate/compose circuit 237 separates the R, G and B data for each CCD line sensor, and composes these items of data into serial data for each color, R, G and B and for each line. A converter 238 as a ROM stores a logarithm converting table LUT"1" as shown in FIG. 46(a). In the table, the received digital data is used as addresses to access the table stored in the ROM. The table converts the reflectivity data of R, G and B into density data.

A shading correction circuit 239 will be described. Before the shading correction, the pixel displacement correction is performed. The signal processing circuit fetches the data of R, G and B in parallel. Since the R, G and B color filters are arrayed dislocated, as shown in FIG. 38(b), the output signals of R, G and B in the same pixel are displaced as shown in FIG. 47(a), and when a black line K is read, it is displaced as shown. To remove the displacement of the black line K, a weighted averaging process is used to shift the data R to the right by the ⅔ pixel, and to shift the data B to the right by ⅓ pixel, as shown in FIG. 47(b).

The shading correction corrects, on the basis of the reference value of the white data, variance in the optical system and variances in the sensitivities of bits of each line sensor that stem from variances of the light distribution characteristics of the light source, and smear on the reflecting mirror, and the like.

To correct the shading, at the start of the shading correction, the light reflected from a white plate, that is to be used as reference density data for shading correction, is applied to the CCD line sensor. The output signal from the line sensor is subjected to the A/D conversion and the logarithm conversion in the signal processing circuit. The reference density data log $(R_i)$ thus obtained is stored into the line memory 240. Then, the reference density data log $(R_i)$ is subtracted from the image data log $(D_i)$ read from the original through the scanning operation. That is, $$\log (D_i) - \log (R_i) = \log (D_i/R_i)$$

In this way, the logarithmic values of the pixel data that are shading corrected are obtained. With the above approach that the shading correction follows the logarithm conversion, satisfactorily necessary logic operation can be realized by using an ordinary full adder IC, although the conventional technique requires a hard logic divider of an intricate and large scale circuit.

Detailed description of the black level adjustment according to the present invention will be given hereinafter.

Figure 49:
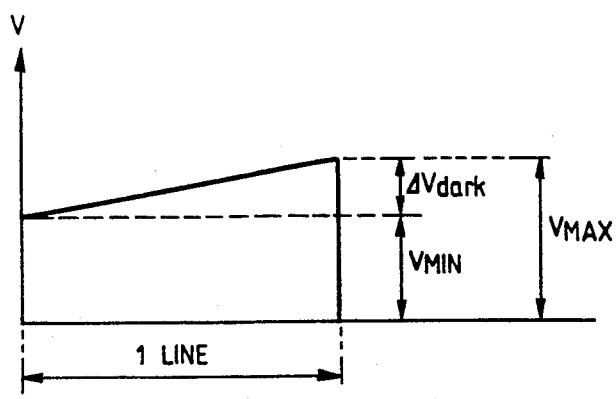
FIG. 49 is a graph showing a variation of the dark output derived from the sensors of one line.
Figure 50:
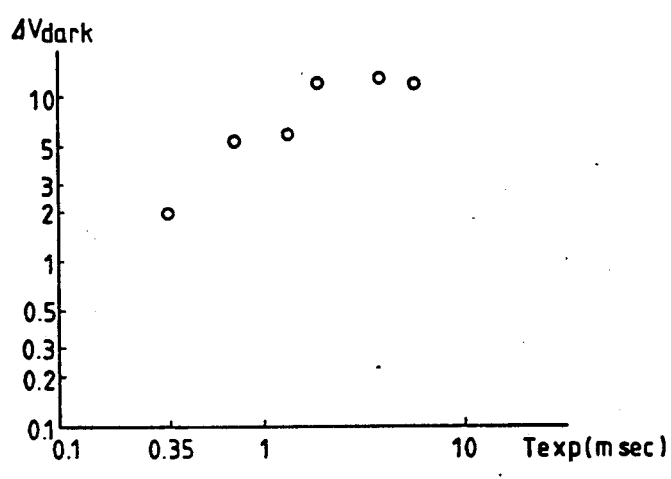
FIG. 50 shows a relationship between the difference of the dark output levels between both ends of a sensor chip, vs. exposure time.

A dark voltage of one line outputted from a line sensor chip, when measured, may be plotted as shown in FIG. 49. As seen, the dark voltage is not uniform over the line. In the figure, the maximum value of the dark voltage is denoted as $V_{MAX}$, the minimum value, as $V_{MIN}$, a difference between them, $\Delta V_{dark}$. An example of the measurements of the relationship between the difference $\Delta V_{dark}$ and exposure time $T_{exp}$ is illustrated in FIG. 50. The figure shows that the difference $\Delta V_{dark}$ is about 2 mV even when $T_{exp}=350$ μsec.

Figure 48A:
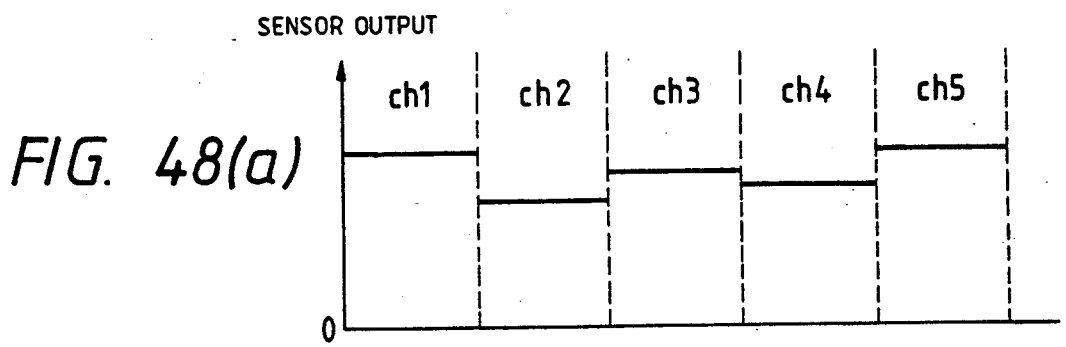
FIGS. 48(a) to 48(d) show graphs useful in explaining the dark output levels of the five sensor chips at the respective channels which are assembled into a linear array.
Figure 48B:
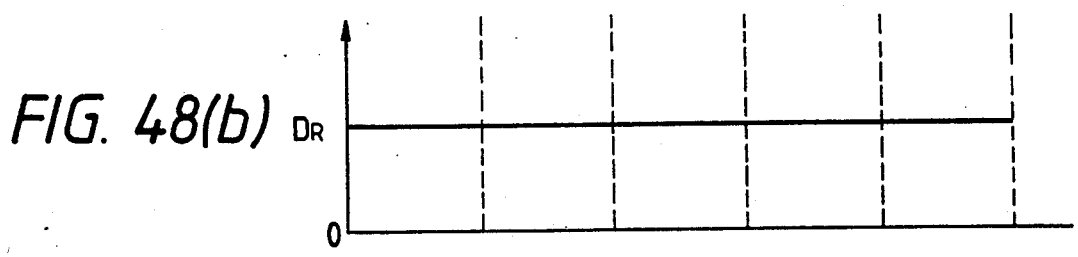
Figure 48C:
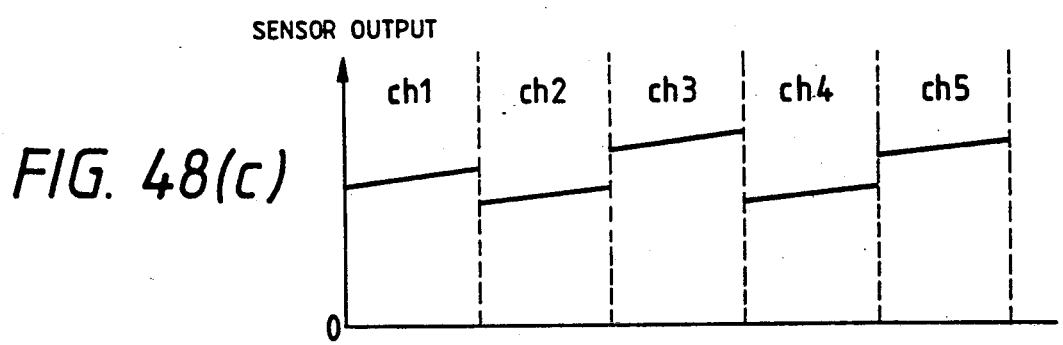
Figure 48D:
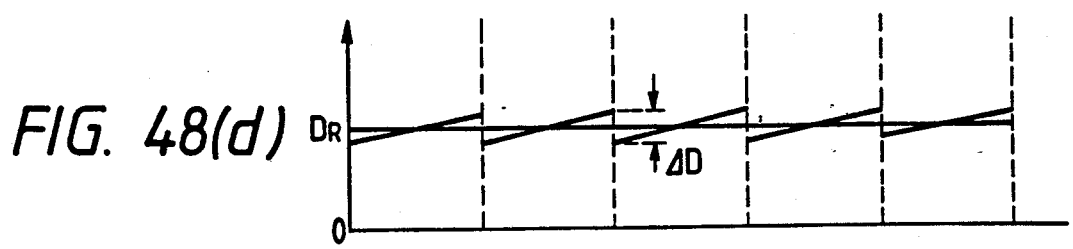
Figure 51:
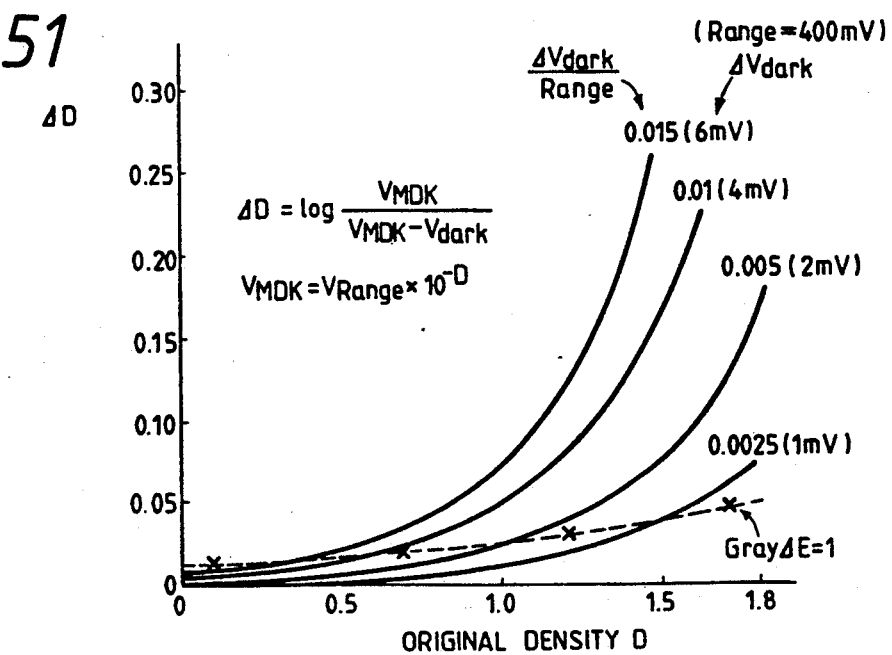
FIG. 51 is a graph showing a relationship between an original density vs. a density variation of one sensor chip.

The larger the difference $\Delta V_{dark}$ is, the higher the density of the original is and the lower the amount of the illumination light or hence the white level is. The result is a gentle inclination of density over the width of 61 mm for one line sensor chip. A calculation of the above relationship results in a graph of FIG. 51. In the graph, a variation of the density difference or an offset value $\Delta D$ between both ends of one chip as is read by the line sensor with respect to a density D on an original is illustrated with parameters of ratios of the density difference $\Delta V_{dark}$ to white level "Range". As seen from the graph, in the case that the density difference $\Delta V_{dark}$ is about 2 mV at 400 mV of the white level, the offset value $\Delta D$ of 0.75 is generated at 1.5 of the original density D. When it is converted int a color difference $\Delta E$, the level of about 2 in gray level is obtained. A reproduced image based on the image data containing the offset value or level difference $\Delta D$ at the boundary between the adjacent channels (see FIG. 48(d)) suffers from stripes or density irregularity. To obtain the color difference $\Delta E$ below 1 or less in gray level in order to solve the problem, it is necessary to set the density difference $\Delta V_{dark}$ below 1 mV or to double the amount of the light and hence to increase the white level up to 800 mV.

To solve such a problem, it is necessary to reduce the density difference at the channel boundary. A density difference adjusting process to realize this will be described with reference to FIGS. 52 to 55.

Figure 46B:
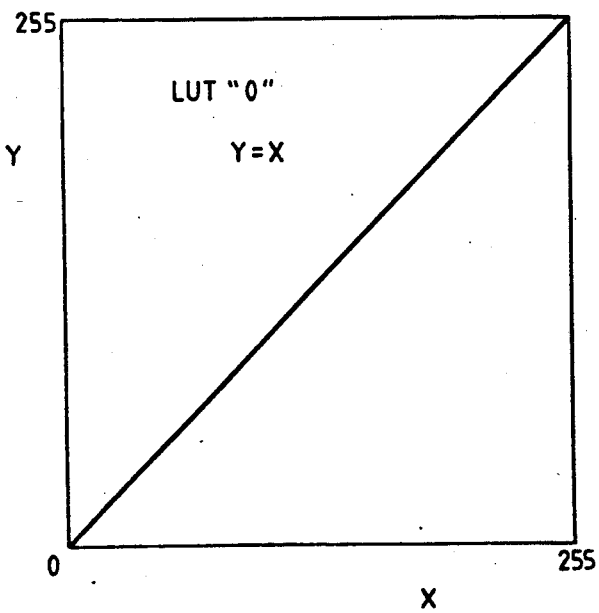
Figure 52A:
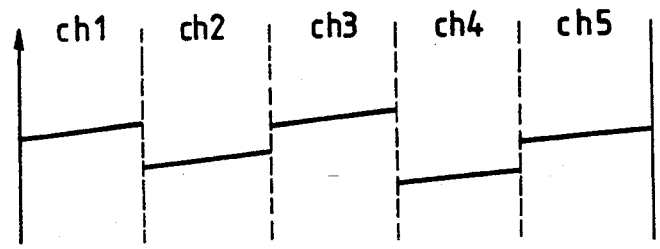
FIGS. 52(a) to 52(f) show graphs for explaining a process of black level adjustments employed in the image reading apparatus according to the present invention.

FIG. 52(a) shows a variation of the density difference in a range between both ends of the chip of each channel before the density difference is adjusted. Firstly, the adjustment is applied to the channel 3 which is located at the center of the sensor array. In this step of the adjustment, the imaging unit is set at the home position, and the illumination lamp is turned off (see step 1201 in FIG. 53). In the next step 1202, the conversion table of the converter 238 (see FIG. 40) is changed from the table LUT "1" to the table LUT "0" (FIGS. 46(a) and 46(b)). The conversion table LUT "0" is so designed that it produces a signal in proportion to the digital input signal of 0 to 255, to increase a dark output outputted from the line sensor.

Figure 52B:
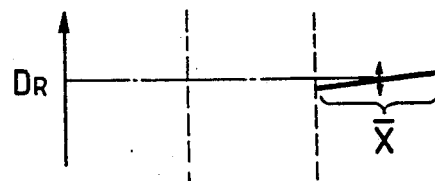

Under this condition, the image information on an original area read by the line sensor of the channel 3. The image data obtained are stored into the shading RAM (line memory) 240. Then, control computes an average value X of the signals at several tens points, for example, which are outputted from the channel 3 sensor. Control checks whether or not the average value X is within a preset range (steps 1205 to 1206). If the value X is outside the preset range, control increments or decrements an offset value AOC in step 1207 or 1208, and returns to step 1204 to repeat the above check process. If the average value X is within the preset range, the present offset value is stored into the memory. As a result, the average value X of the channel 3 is adjusted to be equal to a reference value $D_R$ of the black level as shown in FIG. 52(b).

Figure 52C:
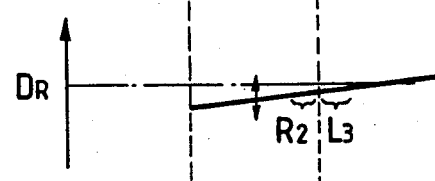
Figure 52D:
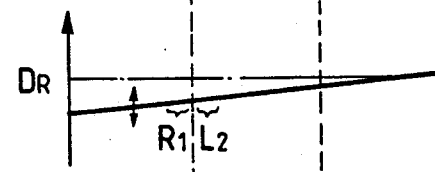
Figure 52E:
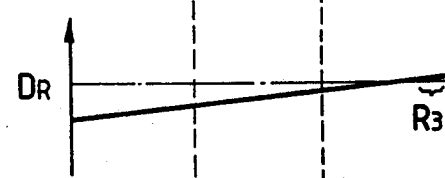
Figure 52F:
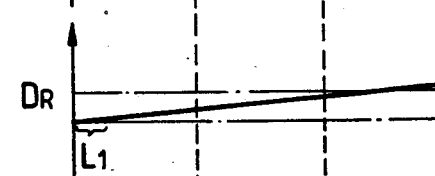
Figure 53:
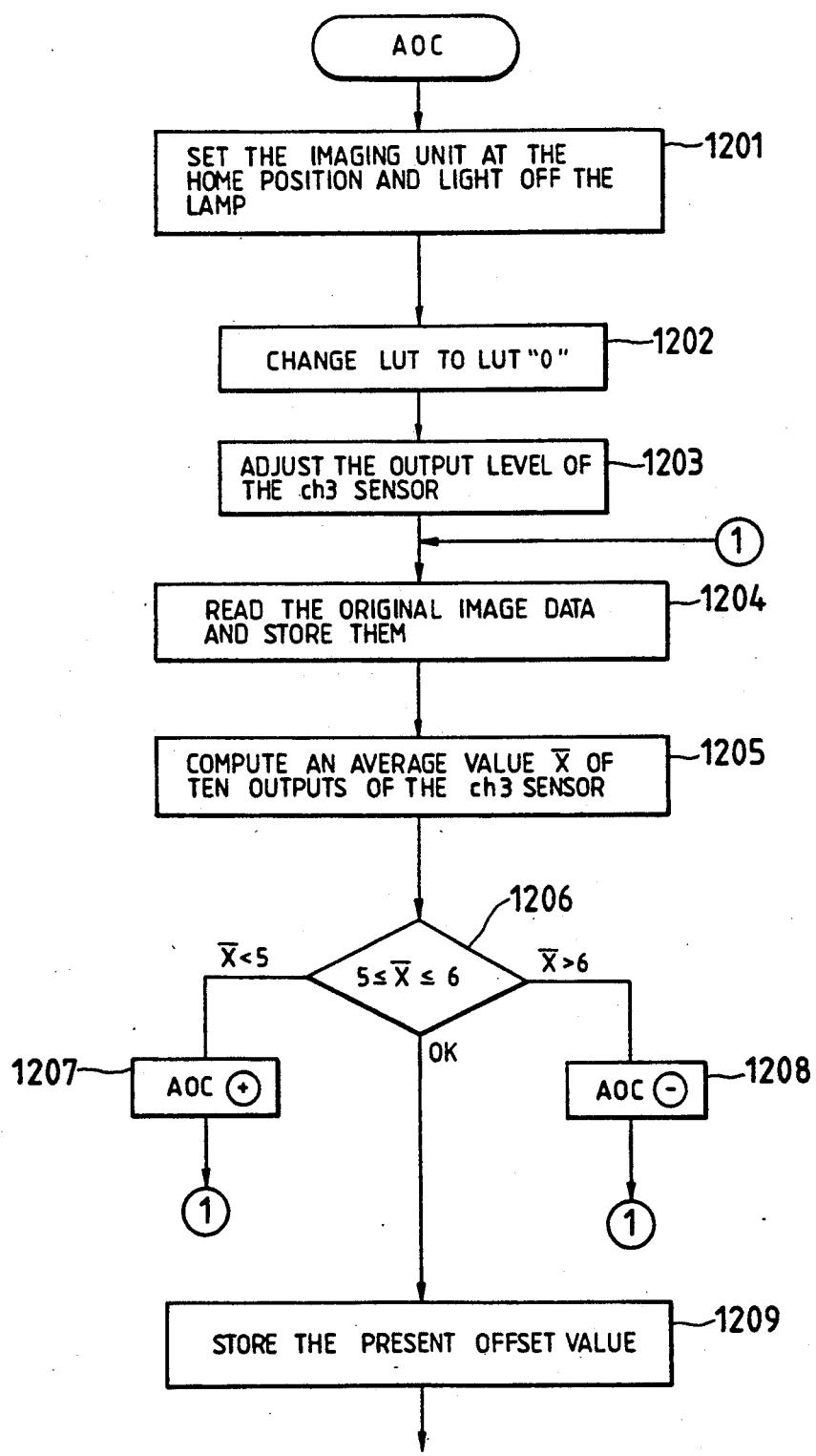
Figure 54:
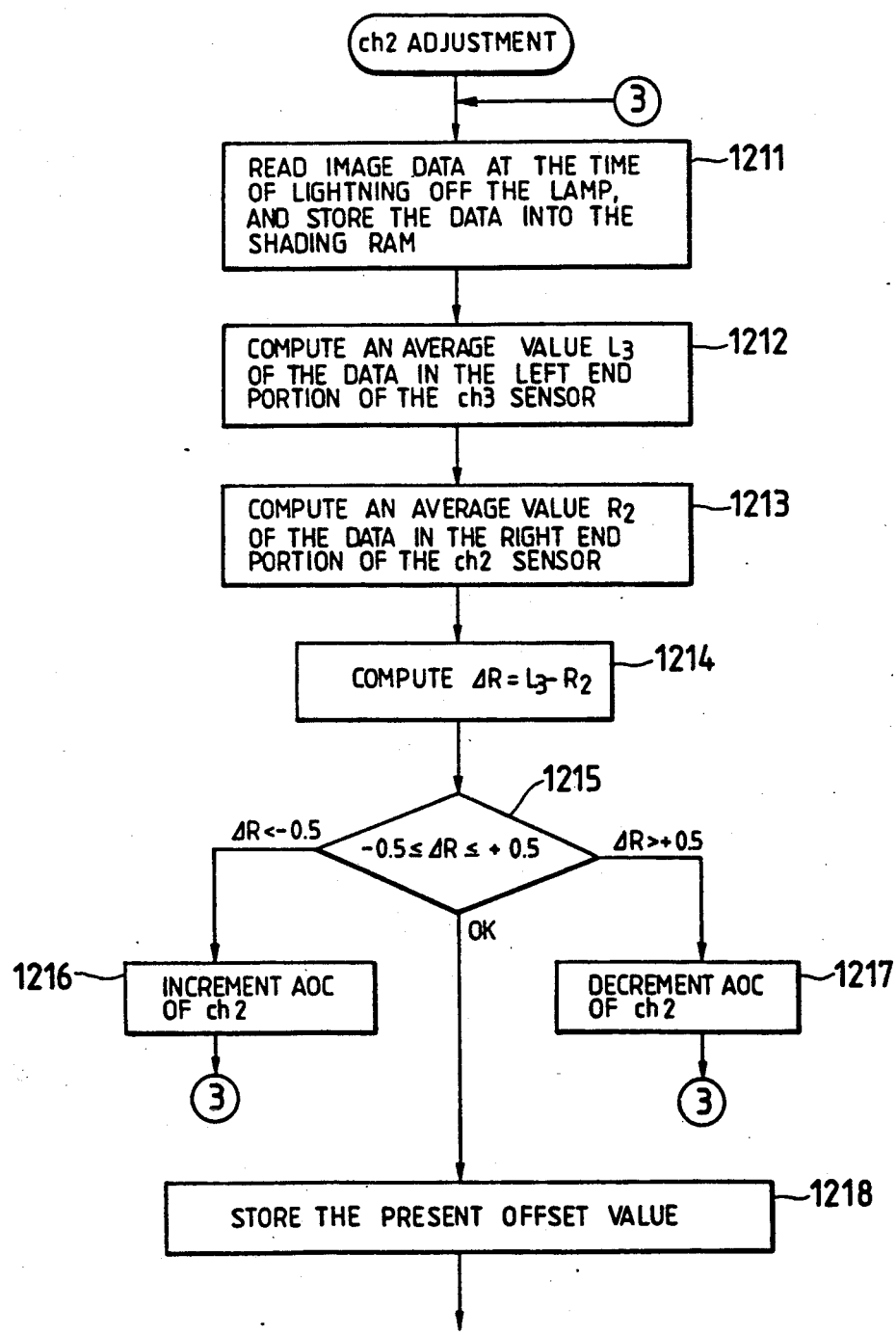

Subsequently, the adjustment of the channel 2 starts. As shown in FIG. 54, firstly, the image data are read when the lamp is turned off, and the read data are stored into the shading RAM (line memory) 240. Then, control computes an average value $L_3$ of the data in the left end portion of the channel 3 sensor, and an average value $R_2$ in the right end portion of the channel 2 sensor. Control computes a difference $\Delta R$ $L_3$ and $R_2$ (steps 1212 to 1214). The lengths of the right and left end portions are appropriately selected. In step 1215, control checks whether or not the difference $\Delta R$ is within a preset range. If it is outside the preset range, the offset value AOC is incremented or decremented in step 1216 or 1217, and the above process is repeated. If the difference $\Delta R$ is within the preset range, the present offset value is stored into the memory. As a result, the sensor output level at the left end portion of the channel 3 sensor and that the right end portion of the channel 2 sensor are adjusted to be substantially equal to each other, as shown in FIG. 52(c). In a similar way, control computes an average value $L_2$ of the data in the left end portion of the channel 2 sensor, and an average value $R_1$ of the data in the right end portion of the channel 1 sensor. As a result, the sensor output level of the left end portion of the channel 2 sensor and that of the right end portion of the channel 1 sensor are adjusted to be substantially equal to each other, as shown in FIG. 52(d). Subsequently, the adjustment of the sensor output level is applied to the channels 4 and 5 in successive order. Finally, the sensor output level is adjusted as shown in FIG. 52(f). Thus, the level difference $\Delta D$ of the boundary for each channel is substantially zeroed. After completion of the sensor output level adjustment, control in step 1229 (FIG. 55) check a difference between an average value $R_5$ of the data in the right end portion of the channel 5 sensor and an average value $L_1$ of the data in the left end portion of the channel 1 sensor. If the difference is in excess of a preset value, an alarm is issued. In step 1230, control changes the conversion table from the table LUT "0" to the table LUT "1".

It should be understood that the present invention is not limited to the embodiment as mentioned above, but may variously be changed and modified within the scope of the invention.

In the black level adjustment, the above-mentioned embodiment uses the conversion table LUT "0" in the converter 238, thereby to increase the dark output level. The same effect may be attained by increasing a gain for the dark output signal or appropriately adjusting the offset value, in place of using that table.

In the above-mentioned embodiment, the dark output level of the center channel sensor is first adjusted to the reference level. If necessary, such as adjustment may be started from any desired channel sensor, for example, the first or fifth channel sensor.

While in the embodiment as described, the dark level is obtained under the condition that the lamp is turned off, it may be obtained in a manner that a black board providing a reference of the black level is illuminated with the light from the lamp.

As seen from the foregoing description, even when a linear array of a plurality of line sensors is used, the resultant image is free from stripes or density irregularity, because the density differences at the channel boundaries are adjusted to be zeroed. Further, the black level adjustments of a plurality of line sensors can automatically be performed, resulting in reduction of the total number of adjusting steps. Additionally, the selection work to select the line sensors is simplified, so as to prevent the cost from increasing.

What is claimed is:

1. An image reading apparatus for supplying image reading signals from a plurality of colinear line sensors into a signal processing circuit comprising: reference level adjusting means for adjusting a level of dark output from any of said line sensors to a set reference level obtained by averaging dark output levels at at least two points on the respective line sensors, and level difference adjusting means for adjusting to a minimum, by a linear approximation with respect to the set reference level, a difference of dark output levels between said line sensor being adjusted to the set reference level and a second line sensor adjacent to said line sensor being adjusted to the set reference level and for similarly adjusting to a minimum a difference of dark output levels between said second line sensor and a third line sensor adjacent to said second line sensor.

2. The image reading apparatus according to claim 1, having at least three line sensors to establish at least one central line sensor, and a level of a dark output outputted from said at least one central line sensor is adjusted to the reference level.

3. The imaging reading apparatus according to claim 1, having at least three line sensors, and a level of a dark output outputted from one of the line sensors which is located at an end of said at least three line sensors is adjusted to the reference level.

4. The image reading apparatus according to claim 1, further comprising a first conversion table for converting read data from said line sensors into a density value, and a second conversion table for outputting said read data in proportion to said dark output level.

5. The image reading apparatus according to claim 1, further comprising a first conversion table for converting read data from said line sensors into a density value, and a means for adjusting a gain for said dark output.

6. The image reading apparatus according to claim 1, further comprising a first conversion table for converting read data from said line sensors into a density value, and a means for adjusting an offset of said dark output.

7. The image reading apparatus according to claim 1, in which said dark output is outputted when an illumination lamp is turned off.

8. The image reading apparatus according to claim 1, in which when a difference of the dark output level between both ends of a sensor array of said plurality of line sensors is in excess of a preset value, an alarm is issued.

9. An image reading apparatus for supplying image reading signals from a plurality of colinear line sensors into a signal processing circuit comprising: reference level adjusting means for adjusting a level of dark output from any of said line sensors to a set reference level obtained by averaging dark output levels at at least two points on the respective line sensors, and level difference adjusting means for adjusting to a minimum, by a linear approximation with respect to the set reference level, a difference of dark output levels between said line sensor being adjusted to the set reference level and a line sensor adjacent to said line sensor being adjusted to the set reference level and for similarly adjusting to a minimum a difference of dark output levels between a line sensor proximate to said line sensor being adjusted to the set reference level and a line sensor adjacent to said line sensor approximate to said line sensor being adjusted to the set reference level.

* * * * *